United States Patent
Wu et al.

(10) Patent No.: US 8,227,392 B2
(45) Date of Patent: *Jul. 24, 2012

(54) BASE STOCKS AND LUBRICANT BLENDS CONTAINING POLY-ALPHA OLEFINS

(75) Inventors: Margaret M. Wu, Skillman, NJ (US);
Ernestine W. Hill, Piscataway, NJ (US);
Liehpao Oscar Farng, Lawrenceville, NJ (US); Andrew Jackson, Pennington, NJ (US)

(73) Assignee: Exxonmobil Research and Engineering Company, Annandale, NJ (US)

( * ) Notice: Subject to any disclaimer, the term of this patent is extended or adjusted under 35 U.S.C. 154(b) by 1096 days.

This patent is subject to a terminal disclaimer.

(21) Appl. No.: 12/152,223

(22) Filed: May 13, 2008

(65) Prior Publication Data
US 2010/0323937 A1   Dec. 23, 2010

Related U.S. Application Data

(60) Provisional application No. 61/062,312, filed on Jan. 25, 2008.

(51) Int. Cl.
*C10M 143/04* (2006.01)
*C10M 143/06* (2006.01)
*C10M 143/08* (2006.01)

(52) U.S. Cl. .................................................. 508/591
(58) Field of Classification Search ............... 508/591
See application file for complete search history.

(56) References Cited

U.S. PATENT DOCUMENTS

| | | |
|---|---|---|
| 3,149,178 A | 9/1964 | Hamilton et al. |
| 3,382,291 A | 5/1968 | Brennan et al. |
| 3,742,082 A | 6/1973 | Brennan |
| 3,769,363 A | 10/1973 | Brennan |
| 3,780,128 A | 12/1973 | Shubkin |
| 3,876,720 A | 4/1975 | Heilman et al. |
| 4,172,855 A | 10/1979 | Shubkin et al. |
| 4,239,930 A | 12/1980 | Allphin et al. |
| 4,367,352 A | 1/1983 | Watts, Jr. et al. |
| 4,413,156 A | 11/1983 | Watts, Jr. et al. |
| 4,434,408 A | 2/1984 | Baba et al. |
| 4,704,491 A | 11/1987 | Tsutsui et al. |
| 4,827,064 A | 5/1989 | Wu |
| 4,827,073 A | 5/1989 | Wu |
| 4,910,355 A | 3/1990 | Shubkin et al. |

(Continued)

FOREIGN PATENT DOCUMENTS

EP   0 613 873   9/1994

(Continued)

OTHER PUBLICATIONS

Song et al., "New High Performance Synthetic Hydrocarbon Base Stocks", Lubrication Eng., 58/6 (29-33); Jun. 2002.

*Primary Examiner* — Jim Goloboy
(74) *Attorney, Agent, or Firm* — Robert A. Migliorini

(57) ABSTRACT

This disclosure relates to substantially atactic polymers of at least one of propylene, 1-butene or 1-pentene, processes for making such polymers and compositions including the polymers. The polymers may be used as lubricants or may be combined with low viscosity base stocks to form lubricants. The polymers may be made in the presence of a metallocene catalyst with a non-coordinating anion activator and optionally with hydrogen.

36 Claims, 5 Drawing Sheets

VI of POB vs. PIB blends for different blend viscosities at 100°C

U.S. PATENT DOCUMENTS

| | | | |
|---|---|---|---|
| 4,914,254 | A | 4/1990 | Pelrine |
| 4,926,004 | A | 5/1990 | Pelrine et al. |
| 4,956,122 | A | 9/1990 | Watts et al. |
| 4,967,032 | A | 10/1990 | Ho et al. |
| 5,068,487 | A | 11/1991 | Theriot |
| 5,087,788 | A | 2/1992 | Wu |
| 5,578,743 | A * | 11/1996 | Ho et al. ................ 585/530 |
| 5,596,052 | A * | 1/1997 | Resconi et al. ............... 526/127 |
| 5,672,668 | A * | 9/1997 | Winter et al. ................ 526/127 |
| 5,688,887 | A | 11/1997 | Bagheri et al. |
| 5,770,664 | A * | 6/1998 | Okumura et al. ............ 526/127 |
| 5,859,159 | A | 1/1999 | Rossi et al. |
| 6,043,401 | A | 3/2000 | Bagheri et al. |
| 6,084,048 | A * | 7/2000 | Hozumi et al. ............ 526/348.6 |
| 6,133,209 | A | 10/2000 | Rath et al. |
| 6,414,090 | B2 | 7/2002 | Minami et al. |
| 6,414,091 | B2 | 7/2002 | Moritomi et al. |
| 6,706,828 | B2 | 3/2004 | DiMaio |
| 6,713,438 | B1 | 3/2004 | Baillargeon et al. |
| 6,872,692 | B2 | 3/2005 | Wu et al. |
| 2003/0055184 | A1 | 3/2003 | Song et al. |
| 2004/0229760 | A1 * | 11/2004 | Oldiges et al. ................ 508/154 |
| 2006/0135699 | A1 | 6/2006 | Li et al. |
| 2007/0043248 | A1 | 2/2007 | Wu et al. |
| 2007/0142242 | A1 | 6/2007 | Gleeson et al. |
| 2007/0298990 | A1 * | 12/2007 | Carey et al. ................... 508/591 |

FOREIGN PATENT DOCUMENTS

| | | |
|---|---|---|
| WO | WO 96/23751 | 8/1996 |
| WO | WO 99/67347 | 6/1999 |
| WO | WO 02/14384 | 2/2002 |
| WO | WO 03/020856 | 3/2003 |
| WO | WO 2007/011459 | 1/2007 |
| WO | WO 2007011459 A1 * | 1/2007 |
| WO | WO 2007011462 | 1/2007 |

* cited by examiner

Figure 1. VI of POB vs. PIB blends for different blend viscosities at 100°C
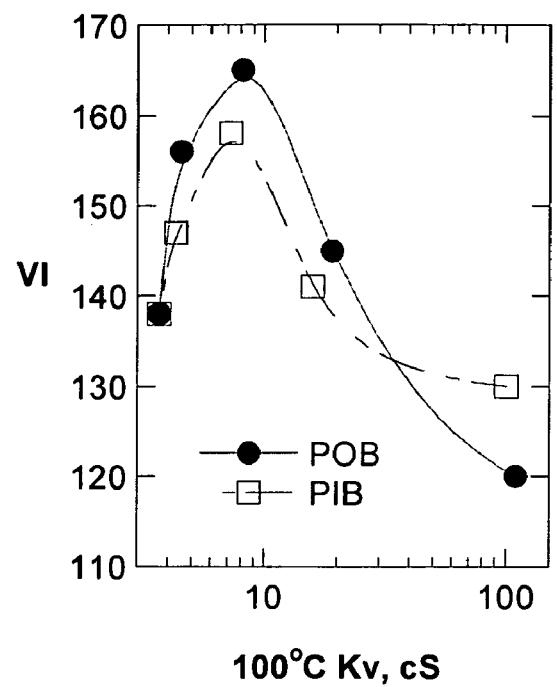

Figure 2. VI of POB vs. PIB blends for different blend viscosities at 40°C
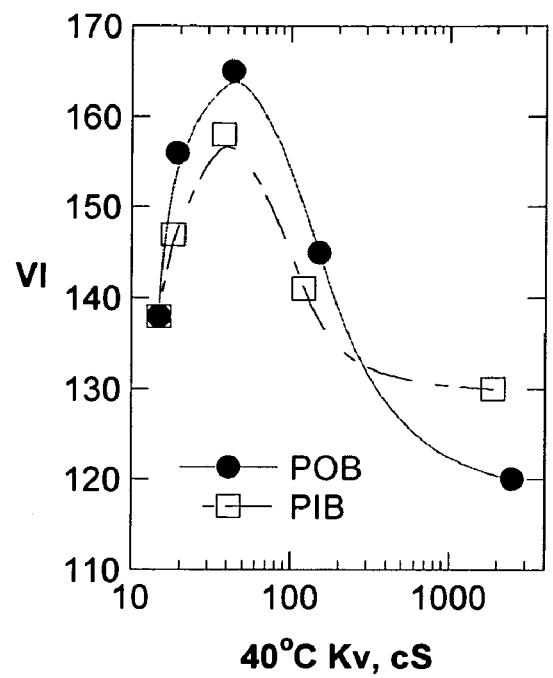

Figure 3. TGA Noack volatility of POB and PIB in GTL4 blends vs. 100°C viscosity
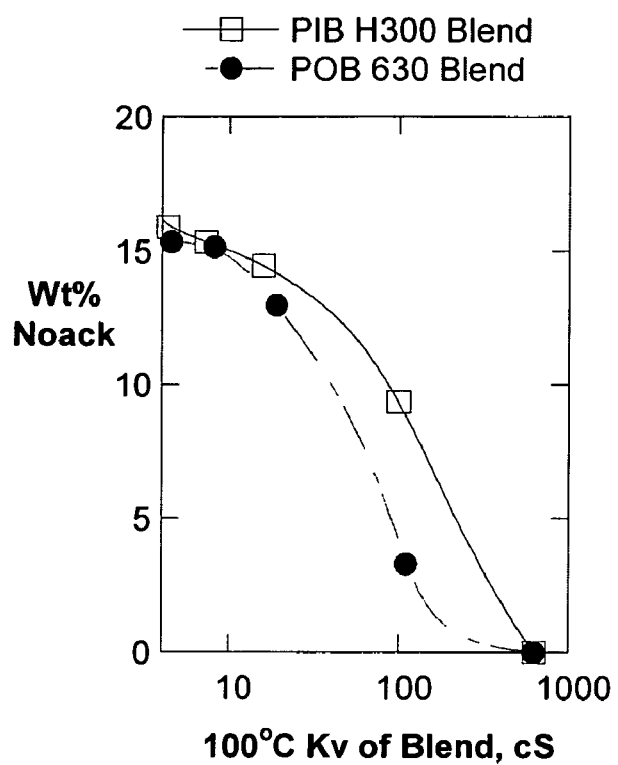

Figure 4. Noack volatility of POB and PIB in GTL4 blends vs. 100°C viscosity
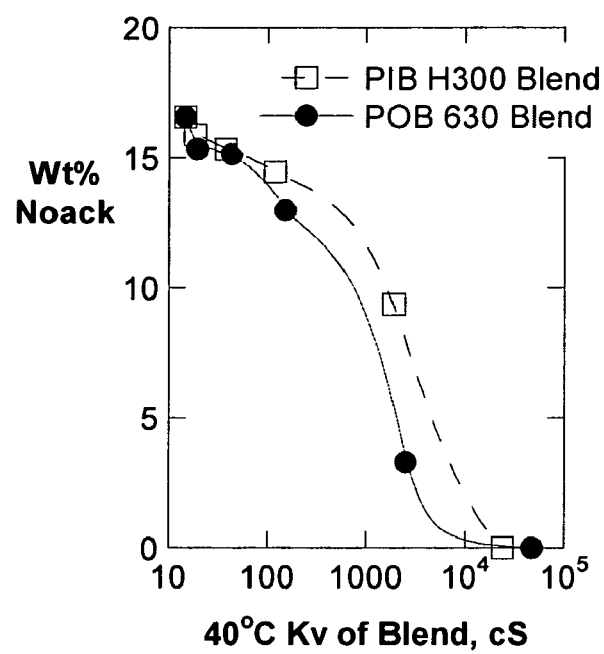

Figure 5. C13 NMR spectra of a substantially atactic poly-1-butene (Fig. 5 a) and of poly-1-butene with a substantial amount of isotacticity (Fig. 5 b)
Figure 5a. C13 NMR Spectra of Example No. 11
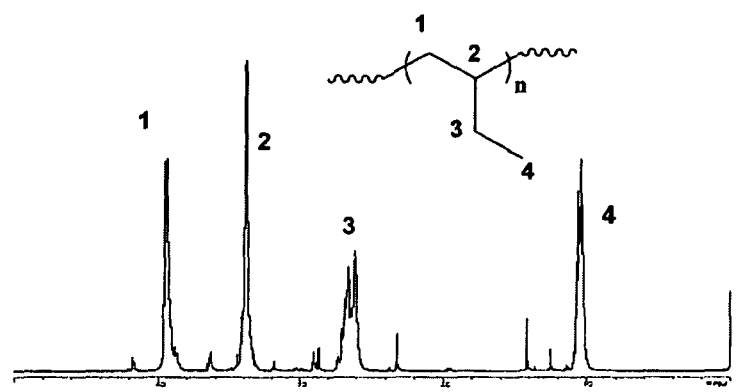
Figure 5b. C13 NMR Spectra of Comparative Example A
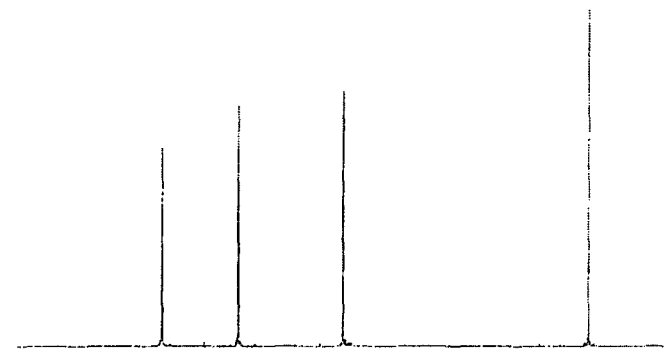

BASE STOCKS AND LUBRICANT BLENDS CONTAINING POLY-ALPHA OLEFINS

CROSS-REFERENCE TO RELATED APPLICATIONS

This application claims the benefit of U.S. provisional application No. 61/062,312, filed on Jan. 25, 2008, herein incorporated by reference.

FIELD

This disclosure relates to poly-alpha-olefins (PAOs) made from selected lower alpha-olefins and lubricant blends containing lubricant base stocks and such PAOs and to a process for the production thereof in the presence of a metallocene catalyst with a non-coordinating anion activator and optionally with hydrogen.

BACKGROUND

Description of Related Art

Efforts to improve upon the performance of natural mineral oil-based lubricants by the synthesis of oligomeric hydrocarbon fluids have been the subject of important research and development in the petroleum industry for at least fifty years. These efforts have led to the relatively recent market introduction of a number of synthetic lubricants. In terms of lubricant property improvement, the thrust of the industrial research efforts involving synthetic lubricants has been towards fluids exhibiting useful viscosities over a wide temperature range, i.e., improved viscosity index (VI), while also showing lubricities, thermal stabilities, oxidative stabilities, pour points and low temperature viscometric properties equal to or better than those for mineral oil.

The viscosity-temperature relationship of a lubricating oil is one of the main criteria considered when selecting a lubricant for a particular application. The mineral oils commonly used as a base for single and multigrade lubricants exhibit a relatively large change in viscosity with a change in temperature. Fluids exhibiting such a relatively large change in viscosity with temperature are said to have a low viscosity index (VI). VI is an empirical, unitless number which indicates the rate of change in the viscosity of an oil with a temperature change. A high VI oil, for example, will thin out at elevated temperatures less than a low VI oil. Usually, a high VI oil is more desirable because it has higher viscosity at higher temperature, which translates into better lubrication and better protection of the contacting machine elements, especially at high temperatures and/or at temperatures over a wide range. VI is calculated according to ASTM method D 2270.

Good low temperature properties of a lubricant are also important if the lubricant is expected to provide lubrication at low temperature environment. These low temperature properties can be measured by pour points of pure fluids according to ASTM D 97, by low temperature Brookfield viscosities of pure or blended fluids according to ASTM D 2983, or other appropriate method such as Cold Cranking Simulator viscosity (CCS). Good shear stability of a lubricant is also becoming more important as newer equipment or engines are often operated under more severe conditions. Shear stability of a pure fluid or lubricant blends can be measured by many methods, such as sonic shear test according to ASTM D 2603 method or tapered roller bearing (TRB) shear test according to CEC L-45-T/A to D methods, etc.

Heretofore known PAOs comprise a class of hydrocarbons manufactured by the catalytic oligomerization (polymerization to low-molecular-weight products) of linear α-olefin (LAO) monomers. These typically range from 1-octene to 1-dodecene, with 1-decene being a preferred material, although oligomeric copolymers of lower olefins such as ethylene and propylene may also be used, including copolymers of ethylene with higher olefins as described in U.S. Pat. No. 4,956,122 and the patents referred to therein. Some PAO products have achieved importance in the lubricating oil market. Typically there are two classes of synthetic hydrocarbon fluids (SHF) produced from linear alpha-olefins, denoted as PAO and HVI-PAO (high viscosity index PAOs). PAOs of different viscosity grades are typically produced using promoted $BF_3$ or $AlCl_3$ catalysts.

Specifically, PAOs may be produced by the polymerization of olefin feed in the presence of a catalyst such as $AlCl_3$, $BF_3$, or promoted $AlCl_3$, $BF_3$. Processes for the production of PAOs are disclosed, for example, in the following patents: U.S. Pat. Nos. 3,149,178; 3,382,291; 3,742,082; 3,769,363; 3,780,128; 4,172,855 and 4,956,122, which are incorporated by reference. PAOs are also discussed in: Will, J. G. Lubrication Fundamentals, Marcel Dekker: New York, 1980. Subsequent to polymerization, the PAO lubricant range products are typically hydrogenated in order to reduce the residual unsaturation, generally to a level of greater than 90% of hydrogenation. PAOs may be conveniently made by the polymerization of an alpha-olefin in the presence of a polymerization catalyst such as Friedel-Crafts catalysts. These include, for example, boron trifluoride, aluminum trichloride, or boron trifluoride, promoted with water, with alcohols such as ethanol, propanol, or butanol, with carboxylic acids, or with esters such as ethyl acetate or ethyl propionate or ether such as diethyl ether, diisopropyl ether, etc. (See for example, the methods disclosed by U.S. Pat. Nos. 4,149,178 or 3,382,291.) Other descriptions of PAO synthesis are found in the following U.S. Pat. No. 3,742,082 (Brennan); U.S. Pat. No. 3,769,363 (Brennan); U.S. Pat. No. 3,876,720 (Heilman); U.S. Pat. No. 4,239,930 (Allphin); U.S. Pat. No. 4,367,352 (Watts); U.S. Pat. No. 4,413,156 (Watts); U.S. Pat. No. 4,434,408 (Larkin); U.S. Pat. No. 4,910,355 (Shubkin); U.S. Pat. No. 4,956,122 (Watts); and U.S. Pat. No. 5,068,487 (Theriot).

Another class of HVI-PAOs may be prepared by the action of a supported, reduced chromium catalyst with an alpha-olefin monomer. Such PAOs are described in U.S. Pat. No. 4,827,073 (Wu); U.S. Pat. No. 4,827,064 (Wu); U.S. Pat. No. 4,967,032 (Ho et al.); U.S. Pat. No. 4,926,004 (Pelrine et al.); and U.S. Pat. No. 4,914,254 (Pelrine). Commercially available PAOs include SpectraSyn™ 2, 4, 5, 6, 8, 10, 40, 100 and SpectraSyn Ultra™ 150, SpectraSyn Ultra™ 300, SpectraSyn Ultra™ 1000, etc. (ExxonMobil Chemical Company, Houston, Tex.).

Synthetic PAOs have found wide acceptance and commercial success in the lubricant field for their superiority to mineral based lubricants. In terms of lubricant property improvement, industrial research efforts on synthetic lubricants have led to PAO fluids exhibiting useful viscosities over a wide range of temperature, i.e., improved viscosity index, while also showing lubricity, thermal stability, oxidative stability and pour point equal to or better than mineral oil. These relatively new synthetic lubricants lower mechanical friction, enhancing mechanical efficiency over the full spectrum of mechanical loads and do so over a wider range of operating conditions than mineral oil lubricants.

Performance requirements of lubricants are becoming increasingly stringent. New PAOs with improved properties, such as high viscosity index (VI), low pour point, reduced volatility, high shear stability, improved wear performance, increased thermal stability, oxidative stability, and/or wider viscosity range, are desired to meet new performance requirements for lubricants. New methods to provide such new PAOs with improved properties are also desired.

Efforts have been made to prepare various PAOs using metallocene catalyst systems. Examples include U.S. Pat. No. 6,706,828 (equivalent to US Patent Publication 2004/0147693), which discusses production of PAOs in the presence of meso-forms of certain metallocene catalysts under high hydrogen pressure with methyl alumoxane as an activator. WO 02/14384 and WO 99/67347 discuss similar topics.

Others have made various PAOs, such as polydecene, using various metallocene catalysts not typically known to produce polymers or oligomers with any specific tacticity. Examples include WO 96/23751, EP 0 613 873, U.S. Pat. Nos. 5,688,887, 6,043,401, WO 03/020856 (equivalent to US 2003/0055184), U.S. Pat. Nos. 5,087,788, 6,414,090, 6,414,091, 4,704,491, 6,133,209, and 6,713,438.

Recently, there has been a greater demand for high viscosity blend stocks. This is believed to have been caused by a number of factors, including limitations of production by many lubricant base stock manufacturers or announced plans to put into production new hydro-process capacity to produce low viscosity 4 to 6 centistoke (cS) base stocks, including Group III base stocks from conventional slack wax feed or from wax derived from Gas-to-Liquid process (GTL lube). These hydro-processes are believed not to be suitable for production of higher viscosity base stocks such as those greater than 8 cS. Also, the extra capacity for low viscosity hydro-processed base stocks, especially the emergence of large volume of GTL lube, may induce the closing of Group I base stock facilities which co-produce high viscosity bright stock (35-40 cS), creating a decrease in the bright stock supply. Thus, there is an increased need to supply high viscosity base stocks to blend with low viscosity base stocks, including Groups I to VI base stocks, especially with low viscosity Groups II, III and GTL lube fluids.

Presently three major types of high viscosity base stocks are available for blending with low viscosity base stocks to increase viscosities of the low viscosity stocks and still maintain good properties. The three high viscosity base stocks are: bright stock derived from Group I facility; poly-alpha-olefins (PAOs) produced from $C_8$-$C_{12}$ linear alpha-olefins (LAO or LAOS) and poly-isobutylenes (PIB). Each of these high viscosity base stocks has disadvantages. The bright stocks usually have poor quality. The PAOs are usually more expensive because of the expensive LAO raw material and limited availability of the LAOS. The PIB does not have sufficiently good blend properties and the resulting blends do not always meet performance criteria.

Several publications propose polymerization of various alpha-olefins, at least some in the presence of metallocene catalyst systems, to provide polymers having various utilities, such as lubricant components. For example, WO 2007/011462 discusses a process for producing poly-alpha-olefins (PAOs) of high viscosity index (HVI)-PAOs, including contacting a feed comprising a mixture of LAOs with an activated metallocene catalyst to produce liquid polymers for use in lubricant components or as functional fluids. The copolymer composition may be made from at least two different alpha-olefins of $C_3$ to $C_{30}$ range, with monomers randomly distributed in the polymers. In an embodiment one of the monomers is a higher alpha-olefin, such as one chosen from $C_{12}$ to $C_{18}$ alpha-olefins, and the second one or more alpha-olefin is, e.g., chosen from $C_3$ to $C_7$ alpha-olefins. In another embodiment there are used propylene or 1-butene as one of the feed components, as they are readily available from refinery or petrochemical plants. The resulting copolymers are said to have useful lubricant properties, including excellent VI, pour point, low temperature viscometrics by themselves or as a blend fluid with other lubricants or polymers.

U.S. Pat. No. 5,859,159 is directed to a dilute process for the polymerization of non-ethylene, alpha-olefin homopolymers and copolymers in the presence of metallocene catalyst systems. The alpha-olefin feed stream used in the process comprises at least one alpha-olefin, such as propylene, 1-butene, pentene-1,4-methyl-pentene-1, hexene-1, octene-1 and higher alpha-olefins up to and including nanodecene-1, e.g., mixtures of propylene and butene-1. The polymers of most of the examples have isotactic index of at least 80%. The product can be used as a backbone for production of lubricants, or oil dispersants and viscosity modifiers.

U.S. Patent Publication 2007/0043248 is directed to a process for producing low viscosity poly-alpha-olefins comprising contacting one or more alpha-olefin monomers of 3-24 carbon atoms with a catalyst which may include metallocene catalyst compounds. The PAOs used in the process are typically dimers, trimers, tetramers, or higher oligomers having weight average molecular weight of 100,000 or less.

U.S. Patent Publication 2003/0055184 is directed to non-isomerized oligomers, which comprise repeating units of olefin monomers, where the oligomers have molecular weight of about 10,000 or less, and are prepared in the presence of a single site catalyst, such as metallocene catalyst. The olefin monomer may be chosen from aliphatic olefins, aromatic olefins or cyclic olefins. Suitable alpha-olefins may include propylene, 1-butene, 1-pentene, 1-hexene, 1-heptene, 1-octene, 1-decene and 1-tetradecene. The PAOs of at least some of the embodiments may be hydrogenated to formulate lubricant oils. Some exemplified oligomers of 1-decene and 1-tetradecene were reported to have kinematic viscosity (Kv) at 100° C. of 1.8 to 9.2, Kv at 40° C. of 5.3 to 50.3 and VI of about 130 to 166.

Song et al., New High Performance Synthetic Hydrocarbon Base Stocks, Lubrication Engineering, 58/6, 29-33 (June 2002) is directed to polymerization of inexpensive olefin monomers, such as ethylene, propylene and butene, to produce Ethylene-alpha-Olefin Polymer (EOP) apparently from ethylene at least one of propylene and butene. A single site catalyst is used in the polymerization reaction to produce a synthetic fluid which is said to have performed similarly to commercial PAO and could be used as a synthetic base stock in applications requiring premium lubricants. The EOPs had Kv at 100° C. of 1.9 to 11.4, and at 40° C. of 5.5 to 66.1 cSt and $M_w/M_n$, of 1.04 to 1.34.

PCT/US06/21231 filed Jun. 2, 2006, claiming the benefit of U.S. Ser. No. 60/700,600, filed Jul. 19, 2005, describes the production of liquids from monomers having 5 to 24 carbon atoms using racemic metallocenes and non-coordinating anion activators.

To date however, PAOs made with metallocenes have not found wide application in the marketplace, particularly the lubricant marketplace, due to a variety of factors, such as inadequate manufacturing processes, high costs and/or their property concerns. In this disclosure we address such and other needs by providing new PAOs having excellent property combinations.

SUMMARY

The disclosure is directed to a substantially atactic poly-alpha olefin polymer made of at least one of propylene, 1-butene or 1-pentene monomer and/or its lubricant blend composition with another base stock preferably of lower viscosity. The polymer may be used as a lubricant base stock, and it has viscosity index (VI) of about 50 to about 250, $Kv_{100}$ of about 8 to about 5,000 cSt, and $Kv_{40}$ of about 60 to about 80,000 cSt and pour point of less than about 10° C.

The disclosure is also directed to a blend composition comprising the substantially atactic poly-alpha olefin polymer made of at least one of propylene, 1-butene or 1-pentene monomer. The polymer has viscosity index (VI) of about 50 to about 250, $Kv_{100}$ of about 8 to about 5,000 cSt, $Kv_{40}$ of about 60 to about 80,000 cSt and pour point of less than about 10° C. The composition may include a second lubricant base stock. This second lubricant base stock usually has 100° C. kinematic viscosity of about 20 or less than about 20, such as about 15 or less than about 15 cSt and can comprise at least one of API Group I to VI base stocks and a lube base stock produced from gas-to-liquid conversion process (GTL lube), or a mixture of these lower viscosity base stocks. The blend composition comprises about 0.1 to about 90 wt % of the substantially atactic polymer and has viscosity index of greater than about 100, $Kv_{100}$ of about 3 to about 1,000 cSt, and $Kv_{40}$ of about 6 to about 30,000 cSt, and a significantly improved low temperature properties, e.g., Brookfield viscosity than a single base stock of comparable 100° C. kinematic viscosity.

The substantially atactic polymer has $M_w$ (weight average molecular weight) of less than 300,000, such as between about 300 and about 300,000, and $M_n$ (number average molecular weight) of less than 100,000, such as between about 280 and about 100,000. Molecular weight distribution ($M_w/M_n$) of the polymer is greater than 1 and less than 5.

The substantially atactic polymer has a kinematic viscosity (Kv) at 100° C. of about 8, or from greater than about 8 to about 5,000 cSt, and at 40° C. from about 60 to about 80,000 cSt, and viscosity index (VI) greater than about 50.

BRIEF DESCRIPTION OF THE DRAWINGS

To assist those of ordinary skill in the relevant art in making and using the subject matter hereof, reference is made to the appended drawings, wherein:

FIG. 1 shows comparison of Viscosity Index (VI) as a function of 100° C. kinematic viscosity (Kv) for a blend of poly-1-butene (POB) of this disclosure in 4 cS GTL lube base stock to a blend of poly-isobutylene (PIB) H300 in 4 cS GTL lube base stock. PIB H300 is available commercially from Eneos Chemical Co.

FIG. 2 shows comparison of VI as a function of 40° C. Kv for a blend of POB of this disclosure in 4 cS GTL lube to a blend of PIB H300 in 4 cS GTL lube.

FIG. 3 shows comparison of the Noack volatility predicted from TGA measurement as a function of 100° C. Kv for a blend of 630 POB of this disclosure in 4 cS GTL lube to a blend of PIB H300 in 4 cS GTL lube. 630 POB is an abbreviation for Poly-1-Butene (POB) described in this disclosure with 100° C. Kv of 630 cSt.

FIG. 4 shows comparison of the Noack volatility predicted from TGA measurement as a function of 40° C. Kv for a blend of 630 POB of this disclosure in 4 cS GTL lube to a blend of PIB H300 in 4 cS GTL lube.

FIGS. 5a and 5b show C13 NMR spectra of a substantially atactic poly-1-butene (FIG. 5 a) and of poly-1-butene with a substantial amount of isotacticity (FIG. 5b).

DETAILED DESCRIPTION

As used herein, the new numbering scheme for the Periodic Table of the Elements is used as set out in CHEMICAL AND ENGINEERING NEWS, 63(5), 27 (1985). Unless otherwise stated all pressures in psi are psig. All numerical values in this disclosure are understood as being modified by "about". All singular forms of monomers, polymers or other components described herein including (without limitations) components of the compositions are understood to include plural forms thereof and vice versa.

For purposes of this disclosure and the claims, when a polymer or oligomer is referred to as comprising an olefin, the olefin present in the polymer or oligomer is the polymerized or oligomerized form of the olefin, respectively. Likewise the use of the term polymer is meant to encompass homopolymers and copolymers, where copolymers include any polymer having two or more chemically distinct monomers. Likewise the use of the term oligomer is meant to encompass homooligomers and cooligomers, where cooligomers include any oligomer having two or more chemically distinct monomers.

For the purposes of this disclosure and the claims the term "Polyalpha-olefin," "polyalphaolefin," or "PAO" are synonymous and include homooligomers, cooligomers, homopolymers and copolymers of $C_3$-$C_5$ alpha-olefin monomers, i.e., at least one of propylene, 1-butene or 1-pentene. Thus, the term "$C_3$-$C_5$ alpha-olefin monomers" as used in this disclosure means propylene, 1-butene, 1-pentene or a mixture or mixtures thereof.

The PAOs of the present disclosure can include oligomers, polymers or combinations of both. The PAO compositions of this disclosure (whether it be oligomers, polymers or combinations thereof) described herein are liquids and have a $M_w$ of 300,000 or less.

For the purposes of this disclosure and the claims the active species in a catalytic cycle may comprise the neutral or ionic forms of the catalyst.

The term "catalyst system" is defined to mean a catalyst precursor/activator pair, such as a metallocene/activator pair. When "catalyst system" is used to describe such a pair before activation, it means the unactivated catalyst (precatalyst) together with an activator and, optionally, a co-activator (such as a trialkylaluminum compound). When it is used to describe such a pair after activation, it means the activated catalyst and the activator or other charge-balancing moiety. Additionally, the activated catalyst system may optionally comprise a co-activator and/or other charge-balancing moiety.

"Catalyst precursor" is also often referred to as precatalyst, catalyst, catalyst compound, precursor, metallocene, transition metal compound, unactivated catalyst, or transition metal complex. These terms are used interchangeably. Activator and cocatalyst are also used interchangeably. A scavenger is a compound that is typically added to facilitate oligomerization or polymerization by scavenging impurities. Some scavengers may also act as activators and may be referred to as co-activators. A co-activator which is not a scavenger may also be used in conjunction with an activator in order to form an active catalyst with a transition metal compound. In some embodiments, a co-activator can be pre-mixed with the transition metal compound to form an alkylated transition metal compound, also referred to as an alkylated catalyst compound or alkylated metallocene.

For purposes of this disclosure and the claims noncoordinating anion (NCA) is defined to mean an anion which either does not coordinate to the catalyst metal cation or that coordinates only weakly to the metal cation. An NCA coordinates weakly enough that a neutral Lewis base, such as an olefinically or acetylenically unsaturated monomer, can displace it from the catalyst center. Any metal or metalloid that can form a compatible, weakly coordinating complex with the catalyst metal cation may be used as or be contained in the noncoordinating anion. Suitable metals include, but are not limited to, aluminum, gold, and platinum. Suitable metalloids include, but are not limited to, boron, aluminum, phosphorus, and silicon. A subclass of non-coordinating anions comprises stoichiometric activators, which can be either neutral or ionic. The terms ionic activator, and stoichiometric ionic activator can be used interchangeably. Likewise, the terms neutral stoichiometric activator and Lewis acid activator can be used interchangeably.

In addition, a reactor is any container(s) in which a chemical reaction occurs.

"Isoalkyl" is a branched alkyl group or radical having at least one tertiary or quaternary carbon atom and which possesses at least one $C_1$ to $C_{18}$ alkyl branch along at least a portion of each chain.

In this application, whenever a composition or a group of elements is preceded with the transitional phrase "comprising", it is understood that we also contemplate the same composition or group of elements with transitional phrases "consisting essentially of", "consisting", "selected from the group of consisting of", or "is" preceding the recitation of the composition or elements and vice versa.

Polyalpha-Olefins

The substantially atactic poly-alpha olefin polymer (which also may be referred to herein as "substantially atactic polymer") is made from relatively low cost alpha-olefins, i.e., propylene, 1-butene, 1-pentene or mixtures thereof, or from any feed streams containing these low cost alpha-olefins or their mixture or mixtures.

Commercial production facilities, such as oil refineries, have process streams which include alpha-olefins, which can be used as starting materials for the production of substantially atactic polymers discussed herein. For example, mixed aliphatic $C_4$ streams, usually present in refineries, can be used as feed streams for polymerization of 1-butene to obtain the substantially atactic polymers discussed herein. The mixed $C_4$ streams may include mixed n-butanes, isobutene 1-butene, cis and trans 2-butenes and iso-butylenes. The process, utilizing a catalyst described herein, substantially selectively polymerizes 1-butene from such mixed aliphatic $C_4$ streams.

The substantially atactic polymers may be blended with low viscosity base stocks to produce lubricating blends which have improved properties, such as viscometric, including viscosity and viscosity index, thermal, oxidative, shear stability and volatility properties, than blends from poly-isobutylene or bright stock. Properties of the blends of this disclosure are comparable to or even better than those of the blends made from significantly more costly poly-alpha-olefins (PAO) produced from $C_8$-$C_{12}$ linear alpha-olefins (LAO).

All processes described herein can be used to produce all of the substantially atactic polymers of this disclosure.

The polymers discussed herein, which may also be referred to as poly-alpha-olefins (PAOs) of this disclosure, are made in a process which produces a polyalpha-olefin having a $KV_{100}$ of about 8 or greater than about 8 cSt to about 5,000 cSt and all the other properties of the PAOs of this disclosure, comprising:

contacting one or more alpha-olefin monomers having 3 to 5 carbon atoms with an unbridged substituted bis(cyclopentadienyl) transition metal compound represented by the formula:

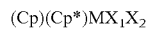

(Cp)(Cp*)MX$_1$X$_2$ wherein:

M is the metal center, and is a Group 4 metal;

Cp and Cp* are 1) the same or different cyclopentadienyl rings that are each bonded to M, and both Cp and Cp* are substituted with at least one non-hydrogen substituent R group or 2) Cp is substituted with from two to five substituent R groups, each substituent group R being, independently, a radical group which is a hydrocarbyl, substituted hydrocarbyl, halocarbyl, substituted halocarbyl, silylcarbyl or germylcarbyl, or Cp and Cp* are the same or different cyclopentadienyl rings in which any two adjacent R groups are optionally joined to form a substituted or unsubstituted, saturated, partially unsaturated, or aromatic cyclic or polycyclic substituent;

$X_1$ and $X_2$ are, independently, hydrogen, halogen, hydride radicals, hydrocarbyl radicals, substituted hydrocarbyl radicals, halocarbyl radicals, substituted halocarbyl radicals, silylcarbyl radicals, substituted silylcarbyl radicals, germylcarbyl radicals, or substituted germylcarbyl radicals; or both X are joined and bound to the metal atom to form a metallacycle ring containing from about 3 to about 20 carbon atoms; or both together can be an olefin, diolefin or aryne ligand; and a non-coordinating anion activator, and optionally an alkyl-aluminum compound, where the molar ratio of the transition metal compound to the activator is 10:1 to 0.1:1, and if the alkyl aluminum compound is present, then the molar ratio of the alkyl-aluminum compound to the transition metal compound is 1:4 to 4000:1, under polymerization conditions wherein:

i) optionally hydrogen is present at a partial pressure of 0.1 to 300 psi, based upon the total pressure of the reactor or the concentration of the hydrogen is from 1 to 30,000 ppm or less by weight;

ii) wherein the alpha-olefin monomer(s) having 3 to 5 carbon atoms are present at 10 wt % or more based upon the total wt. of the catalyst/activator/alkylaluminum compound solutions, monomers, and any diluents or solvents present in the reaction.

In one embodiment, this disclosure relates to liquid poly-alpha-olefins (PAOs) comprising more than 50 mole % of one or more $C_3$ to $C_5$ alpha-olefin monomers, e.g., 55 mole % or more, preferably 60 mole % or more, such as 65 mole % or more, 70 mole % or more, such as 75 mole % or more, 80 mole % or more, 85 mole % or more, 90 mole % or more, 95 mole % or more, or 100 mole % based on the total moles of monomers present in the polyalpha-olefin, as measured by carbon-13 NMR and/or by H-1 NMR method.

For purposes of this disclosure and the claims, a liquid is defined to be a material that flows at room temperature, has a pour point of less than 25° C.

In a further embodiment, any of the polyalpha-olefins described herein have an $M_w$ (weight average molecular weight) of about less than 300,000, such as between about 300 and about 300,000, between about 300 and about 250,000, between about 400 and about 200,000, between about 600 to about 150,000, between about 800 to about 100,000, or between about 1,000 and about 8,000 g/mol.

In another embodiment, any of the polyalpha-olefins described herein have an $M_n$ (number average molecular weight) of less than about 200,000 such as less than about 100,000, between about 280 and about 100,000, between about 250 about 10,000, between about 500 and about 5,000 or between about 280 and about 4,000 g/mol.

In another embodiment, any of the polyalpha-olefins described herein have an $M_w/M_n$ of greater than about 1 and less than about 5, such as less than about 4, less than about 3, less than about 2.5 or less than about 2.3. Alternatively, any of the polyalpha-olefins described herein have an $M_w/M_n$ of between about 1 and about 3.5, such as between about 1 and about 2.5, between about 1.1 and about 2.5 or between about 1.2 and about 2.3.

For purposes of this disclosure and the claims herein, molecular weight distribution (MWD) is equal to $M_w/M_n$.

For many applications when superior shear stability, thermal stability or thermal/oxidative stability is desired, it is advantageous to have the polyalpha-olefins of this disclosure i.e., discussed herein, made with the narrowest possible MWD. PAO fluids with different viscosities, but made from the same feeds or catalysts, usually have different MWDs. In other words, MWDs of PAO fluids are dependent on fluid viscosity. Usually, lower viscosity fluids have narrower MWDs (smaller MWD value) and higher viscosity fluids have broader MWDs (larger MWD value). For most fluids with 100° C. Kv of less than 1000 cSt, the MWD is usually less than 2.5, and typically about 1.6 to about 2.2. Fluids with 100° C. viscosity greater than 1000 cSt, usually have broader MWDs, usually greater than 2.5. Usually, the narrower a fluid's MWD, the better its shear stability. Such narrow MWD fluids will exhibit less viscosity loss due to high stress or shear in the TRB (Tapered Roller Bearing) test, and will have higher high-temperature, high-shear rate (HTHSR) viscosity under more severe conditions, providing a thicker lubricant film and concomitantly better lubrication and wear protection. In certain applications, when operational condition is not so severe, for example under low shear stress or low load, or when shear stability or HTHSR viscosity is not so critical, fluids with broader MWD may provide better blending property or other advantages.

The $M_w$, $M_n$, and MWD are measured by size exclusion chromatography (SEC), also known as gel permeation chromatography (GPC) method using a column for medium- to low-molecular weight polymers, with tetrahydrofuran as solvent and polystyrene as calibration standard. Unless otherwise indicated, the Mn and Mw values reported herein are measured GPC values and not calculated from kinematic viscosity at 100° C.

In one embodiment, any PAO described herein may have a pour point of less than about 10° C. (as measured by ASTM D 97), such as less than about 0° C., less than about –10° C., less than about –20° C., less than about –25° C., less than about –30° C., less than about –35° C., less than about –40° C., less than about –55° C., between about –10 and about –80° C., between about –15° C. and about –70° C. or between about –5 and about –50° C.

In an embodiment, any polyalpha olefin described herein may have a kinematic viscosity at 100° C. of about 8 or greater than about 8 to about 5,000, about 8 or greater than about 8 to about 10,000, such as about 20 to about 10,000, about 30 to about 7,500, about 40 to about 5,000, about 8 to about 1,000, from greater than about 8 to about 5,000 cSt, such as greater than about 20 to about 4,800 cSt, greater than about 20 cSt to about 1,600 cSt. In another embodiment, any PAO described herein may have a kinematic viscosity at 40° C. as measured by ASTM D 445 from about 60 to about 80,000 cSt, such as about 80 cSt to about 70,000 cSt at 40° C., or from about 90 to about 47,000 cSt.

In another embodiment, the polyalpha-olefin fluid described herein may have a viscosity index (VI) of greater than 50. VI is determined according to ASTM Method D 2270-93 [1998]. VI of a fluid is usually dependent on the viscosity and feed composition. Higher VI is more desirable. A fluid with high viscosity usually has higher VI than a fluid of the same feed composition and lower viscosity. The typical VI range for fluids made from $C_3$ or $C_4$ or $C_5$ linear alpha-olefin (LAO) or a combination thereof, discussed herein, is about 50 to about 250, such as about 60 to about 220 or about 50 to about 200, depending on fluid viscosity and feed olefin composition.

In another embodiment, it is preferable that the PAO fluid of this disclosure does not contain a very light fraction. These light fractions contribute to high volatility, unstable viscosity, poor oxidative and thermal stability. They are usually removed in the final product. It is generally preferable to have less than 1 wt % fluid with $C_{20}$ or lower carbon numbers (i.e., less than 20 or lower carbon units in the product oligomer molecules), such as less than 1 wt % fluid with $C_{24}$ or lower carbon numbers or less than 1 wt % fluid with $C_{26}$ or lower carbon numbers. It is desirable to have less than 0.5 wt % fluid with $C_{20}$ or lower carbon numbers, such as less than 0.5 wt % fluid with $C_{24}$ or lower carbon numbers or less than 0.5 wt % fluid with $C_{26}$ or lower carbon numbers. $C_{20}$ or lower carbon atoms, $C_{24}$ or lower carbon atoms etc., can also be referred to herein interchangeably as $C_{20}$ or lower "carbons, $C_{24}$ or lower carbons" etc. Sometimes, these fractions are also referred to as light ends. Also, the lower the amount of any of these light hydrocarbons, the better the fluid property as can be determined by Noack volatility testing. Usually, the fluid volatility depends strongly on the fluid viscosity or fluid molecular weight. Higher viscosity or higher molecular weight fluid will have lower volatility and lower viscosity or lower molecular weight fluid will have higher volatility. For most viscosity grades e.g., the PAO fluid has a Noack volatility of less than 15 wt %, such as less than 10 wt % and/or less than 5 wt %.

In another embodiment any polyalpha olefin described herein may have a flash point of 150° C. or more, as measured by ASTM D 56.

In an alternative embodiment any polyalpha olefin described herein may have a specific gravity of 0.75 gram/$cm^3$ to 0.9 g/$cm^3$, such as 0.78 to 0.85 g/$cm^3$.

The PAOs prepared herein, particularly those of moderate to high viscosity (such as those with a $Kv_{100}$ of greater than about 8 cSt), are especially suitable for use in the formulation of high performance automotive engine oils, general industrial lubricants, grease, various types of automotive or industrial gears oils, aviation lubricants, hydraulic fluids or lubricants, heat transfer fluids, etc. They can be used by themselves or by blending 0.1 up to 95 wt % of the PAOs with other fluids, such as Group I, II, Group II+, Group III, Group III+ base stocks or lube base stocks derived from hydroisomerization of wax fractions from Fischer-Tropsch hydrocarbon synthesis from CO/$H_2$ syn gas (GTL lube base stock), or other Group IV or Group V or Group VI base stocks. General description of these base stocks can be found in Chapter 18 and 19 of the book, "Synthetics, Mineral Oils, and Bio-Based Lubricants, Chemistry and Technology, ed. L. R. Rudnick, published in 2006 by CRC Press, Taylor & Francis Group of Boca Raton, Fla. 22487-2742, incorporated herein by reference. These blend stocks, when combined with additives known in the art, are used to formulate into full synthetic lubricants, partial synthetics, or used as special additive components with other base stocks. These additives include, but are not limited to, ashless dispersants, metal or overbased metal detergent additives, anti-wear additives, viscosity index improvers, antioxidants, rust inhibitors, pour point depressants, friction reducing additives, and the like.

The PAOs obtained in accordance with embodiments of this description may be hydrogenated to formulate lubricant oils in amounts from about 0.1 wt % to about 90 wt %.

All kinematic viscosity values reported for fluids herein are measured at 100° C. unless otherwise noted. Dynamic viscosity can then be obtained by multiplying the measured kinematic viscosity by the density of the liquid. The units for kinematic viscosity are in $m^2/s$, commonly converted to cSt or centistokes (1 cSt=$10^{-6}$ $m^2$/s or 1 cSt=1 $mo^m$/sec).

The PAOs described herein are typically dimers, trimers, tetramers, or higher oligomers of one or more $C_3$ to $C_5$ alpha-olefin monomers. Typically, the PAOs described herein are usually a mixture of many different oligomers. In one embodiment, smallest oligomers from these alpha-olefins have carbon numbers ranging from $C_{10}$ to $C_{20}$. These small oligomers are usually separated from the higher oligomers with carbon number of greater than $C_{20}$, for example $C_{24}$ and higher which are typically used as high performance fluids. These separated $C_{10}$ to $C_{20}$ oligomer olefins or the corresponding paraffins after hydrogenation can be used in specialty applications, such as drilling fluids, solvents, paint thinner, etc with excellent biodegradability, toxicity, viscosities, etc. Sometimes, the smaller oligomers up to $C_{40}$ are separated from the residual lube fraction to give products with most desirable properties. The high performance fluid fraction in the $C_{20}$, or $C_{30}$ and higher fractions, after hydrogenation to remove unsaturation, typically have lower viscosities making them beneficial for some applications, such as better fuel economy, better biodegradability, better low temperature flow properties, or lower volatility. These smaller oligomer fractions from $C_{10}$ to $C_{30}$ or $C_{40}$ fractions, if not hydrogenated, have high degree of unsaturation. They can be used as starting material for further functionalization with aromatics, hydroxyaromatics, maleic anhydride, or used as starting material for chemical synthesis. The higher oligomerization fraction, $C_{20}$ and higher, or $C_{24}$ and higher or $C_{28}$ and higher, or $C_{30}$ and higher fractions, after hydrogenation, can be used as lubricant base stocks by itself or as a blend component. These higher oligomerization fractions, if not hydrogenated, can be used as starting materials for further functionalization with aromatics, hydroxyaromatics, maleic anhydride, or used as starting material for chemical synthesis.

The oligomerization or polymerization process described herein is typically carried out in a manner to produce a final product with 100° C. Kv of greater than about 8 cSt. The process and catalyst employed to produce these fluids are unique in that they produce polymers which are substantially atactic and have molecular weight distribution, $M_w/M_n$, of about 1 to about 5, such as about 1.1 to about 2.5. Because of this feature, the polymerization process produces very high selectivity to lube fraction product with a relatively low amount of light fraction of $C_{20}$ or $C_{24}$ or $C_{28}$ or $C_{30}$ or lower fractions, depending on feed types. Furthermore, because of this molecular weight distribution, the final lube fraction does not contain excessive high molecular weight fractions, which may contribute to the instability under shear, thermal, and oxidative stress.

The PAOs described herein can be utilized as lubricants.

Alternatively, the PAOs may be blended with other base stocks (Gr I to VI) and used as lubricants. To be used as lubricants, the PAOs alone or blended with the other base stocks are preferably combined with suitable additives, including antioxidants, antiwear additives, friction modifiers, dispersants, detergents, corrosion inhibitors, defoamants, extreme pressure additives, seal swell additives, and optionally viscosity modifiers, etc. Description of typical additives, formulation and application can be found in the book "Synthetics, Mineral Oils, and Bio-Based Lubricants, Chemistry and Technology", Ed. L. R. Rudnick, CRC Press, Taylor & Francis Group, Boca Raton, Fla. and in "Lubricant Additives" Chemistry and Applications, ed. L. R. Rudnick, Marcel Dekker, Inc., New York, 2003, which are incorporated herein by reference.

In another embodiment, the PAOs described herein have a volatility as measured by the Noack Volatility test (ASTM D5800) of 20 wt % or less, such as 15 wt % or less, 10 wt % or less, 5 wt % or less, less than 2 wt % or less, or less than 1 wt % or less. Often, the PAOs have Noack volatility of less than 5 wt %.

In another embodiment, the PAOs produced directly from the oligomerization or polymerization process are unsaturated olefins. The amount of unsaturation can be quantitatively measured by bromine number measurement according to the ASTM D 1159, or by proton or carbon-13 NMR. Proton NMR spectroscopic analysis can also differentiate and quantify the types of olefinic unsaturation: vinylidene, 1,2-disubstituted, trisubstituted, or vinyl. Carbon-13 NMR spectroscopy can confirm the olefin distribution calculated from the proton spectrum.

Both proton and carbon-13 NMR spectroscopy can quantify the extent of short chain branching (SCB) in the olefin oligomer, although carbon-13 NMR can provide greater specificity with respect to branch lengths. In the proton spectrum, the SCB branch methyl resonances falls in the 1.05-0.7 ppm range. SCBs of sufficiently different length will give methyl peaks that are distinct enough to be integrated separately or deconvoluted to provide a branch length distribution. The remaining methylene and methine signals resonate in the 3.0-1.05 ppm range. In order to relate the integrals to CH, $CH_2$, and $CH_3$ concentrations, each integral must be corrected for the proton multiplicity. The methyl integral is divided by three to derive the number of methyl groups; the remaining aliphatic integral is assumed to comprise one CH signal for each methyl group, with the remaining integral as $CH_2$ signal. The ratio of $CH_3/(CH+CH_2+CH_3)$ gives the methyl group concentration.

Similar logic applies to the carbon-13 NMR analysis, with the exception that no proton multiplicity corrections need be made. Furthermore, the enhanced spectral/structural resolution of $^{13}C$ NMR vis a vis $^1H$ NMR allows differentiation of ions according to branch lengths. Typically, the methyl resonances can be integrated separately to give branch concentrations for methyls (20.5-15 ppm), propyls (15-14.3 ppm), butyl-and-longer branches (14.3-13.9 ppm), and ethyls (13.9-7 ppm).

Olefin analysis is readily performed by proton NMR, with the olefinic signal between 5.9 and 4.7 ppm subdivided according to the alkyl substitution pattern of the olefin. Vinyl group CH protons resonate between 5.9-5.7 ppm, and the vinyl $CH_2$ protons between 5.3 and 4.85 ppm. 1,2-disubstituted olefinic protons resonate in the 5.5-5.3 ppm range. The trisubstituted olefin peaks overlap the vinyl $CH_2$ peaks in the 5.3-4.85 ppm region; the vinyl contributions to this region are removed by subtraction based on twice the vinyl CH integral. The 1,1-disubstituted—or vinylidene—olefins resonate in the 4.85-4.6 ppm region. The olefinic resonances, once corrected for the proton multiplicities can be normalized to give a mole-percentage olefin distribution, or compared to the multiplicity-corrected aliphatic region (as was described above for the methyl analysis) to give fractional concentrations (e.g. olefins per 100 carbons).

Generally, the amount of unsaturation strongly depends on the fluid viscosity or fluid molecular weight. Lower viscosity fluid has higher degree of unsaturation and higher bromine number. Higher viscosity fluid has lower degree of unsaturation and lower bromine number. If a large amount of hydrogen or high hydrogen pressure is applied during the polymerization step, the bromine number maybe lower than without the hydrogen presence. Typically, for greater than 20 to 5000 cSt polyalpha-olefin produced in this inventive process, the as-synthesized PAO will have bromine number of from 50 to less than 1, depending on fluid viscosity.

The types of olefinic unsaturations in the PAO fluids produced by this inventive process are unique, as confirmed by $^1$H and $^{13}$C-NMR. They contain a very high amount of vinylidene olefins, $CH_2=CR^1R^2$, and much less of the other types of unsaturation, including trisubstituted or di-substituted olefins. The vinylidene content is preferably also much higher than the vinylidene content of the polyalpha-olefins produced in prior art cases based on metallocene used with MAO promoters. In the present invention, the vinylidene content is more than 65 mole %, or more than 70% or more than 80%. A higher amount of vinylidene unsaturation is usually more desirable because these types of olefins are much more reactive for further hydrogenation or for further functionalization. There are many methods described to maximize the amount of vinylidene olefins, such as those disclosed in U.S. Pat. No. 5,286,823, incorporated herein by reference.

Vinylidene olefins usually react faster with maleic anhydride in an ene reaction. They are much more readily hydrogenated to give fully saturated hydrocarbons for high performance base stocks. Usually, the degree of hydrogenation affects the oxidative stability of the fluid. Fluids with a higher degree of hydrogenation, and concomitantly lower bromine number, usually have better oxidative stability. The PAO or PAOs of this disclosure have high vinylidene content and are therefore more amenable to hydrogenation, to provide the formation of low bromine number fluids. The bromine number after hydrogenation is preferably less than 5, more preferably less than 3, more preferably less than 2, more preferably less than 1, more preferably less than 0.5, more preferably less than 0.1. Generally, the lower the bromine number, the better the oxidative stability.

In one embodiment, the PAOs described herein contain a substantial amount of atactic polymer structure. In other words, the PAOs have mostly atactic arrangements of the monomer units. This atactic polymer is beneficial for the lubricant applications. The atactic component can be defined by the amount of mr triads as determined by C13-NMR method, as described in the publication, "Syntheses of Multi-stereoblock Polybutene-1 Using Novel Monocyclopentadienyl Titanium and Modified Methylaluminoxane Catalysts" Journal of Polymer Science: Part A: Polymer Chemistry Vol. 37, page 4497-4501 (1999). In this patent application, we define a substantially atactic PAO as a polymer containing at least about 30%, such as more than about 30 mole % mr triads by C13 NMR analysis. In one embodiment, a desirable atactic PAO has at least about 50, such as about 50 mole % mr triads. In embodiments, the PAOs have an atactic polymer structure as determined by the amount of mr triads of at least about 30 mole % mr triad, such as at least about 50 mole %, at least about 60 mole %, at least about 70 mole %, or at least about 75 mole %, as determined by carbon-13 NMR described below.

In another embodiment this disclosure further relates to PAOs comprising mm triads of 70 mole % or less, 60 mole % or less, 50 mole % or less, 40 mole % or less, 30 mole % or less, 20 mole % or less, as determined by Carbon-13 Nuclear Magnetic Resonance (NMR) spectroscopy according to the procedure below.

In another embodiment, the PAOs described herein include rr triads, in the amount of about 80 mole % or less, such as about 70 mole % or less, about 60 mole % or less, about 50 mole % or less, about 40 mole % or less, about 30 mole % or less, about 20 mole % or less, about 10 mole % or less, or about 5 mole % or less as determined by Carbon-13 Nuclear Magnetic Resonance (NMR) spectroscopy according to the procedure below.

In another embodiment this disclosure further relates to PAOs having the ratio of mm/mr of less than about 5, such as less than about 4, less than about 3, less than about 2, less than about 1, as determined by Carbon-13 Nuclear Magnetic Resonance (NMR) spectroscopy according to the procedure below.

As noted above, Carbon-13 NMR is used to determine tacticity of the polyalphaolefins of the present disclosure—quantitatively in some cases, and qualitatively in others. Carbon-13 NMR can be used to determine the concentration of the triads, denoted mm (meso, meso), mr (meso, racemic) and rr (racemic, racemic), as well as molar composition of the sample. The concentrations of these triads define whether the polymer is isotactic, atactic or syndiotactic. Spectra for a PAO sample are acquired in the following manner. Approximately 100-1000 mg of the PAO sample is dissolved in 2-3 ml of chloroform-d for Carbon 13 analysis. Approximately 10 mg/ml (solvent basis) of chromium acetylacetonate relaxation agent, Cr(acac)3, is added to the sample to enhance the data acquisition rate. Analysis of the spectra is performed according to the paper by Kim, I.; Zhou, J.-M.; and Chung, H. *Journal of Polymer Science: Part A: Polymer Chemistry* 2000, 38 1687-1697, augmented by the identification and integration of end group resonances, and removal of their contributions to the peaks used in the analysis. The deconvolutions are executed with Acorn NMR Inc.'s NutsPro NMR data analysis software, using an 85/15 Lorentzian/Gaussian line shape. The component peaks are lumped together into clusters according to the mm, mr, and rr triad assignments, and fit with a Bernoullian distribution. The adjustable parameter for these fits is Pr, the fraction of monomer added with racemic stereochemistry. For details of going from a set of triad measurements (such as described by Kim above) to a statistical model (such as the Bernoullian) see "Polymer Sequence Determination, James C. Randall, Academic Press, New York, 1977". For examples of measurements of tacticity of polydecene and polydodecene please see the examples section of PCT patent application PCT/US2006/021231, filed Jun. 2, 2006.

In an embodiment, the product described herein is produced in a selectivity of 70% or more for $C_{20}$ and greater hydrocarbons, preferably 80% or more, preferably 90% or more, more preferably 95% or more, preferably 98% or more, preferably 99% or more for $C_{20}$ and greater hydrocarbons.

In one embodiment, the productivity of the process is at least 1.5 kg of total product per gram of transition metal compound, such as at least 2 kg of total product per gram of transition metal compound, at least 3 kg of total product per gram of transition metal compound, at least 5 kg of total product per gram of transition metal compound, at least 7 kg of total product per gram of transition metal compound, at least 10 kg of total product per gram of transition metal compound, or at least 20 kg of total product per gram of transition metal compound.

In another embodiment, the productivity of the process is at least 1.5 kg of total product per gram of the non-coordinating anion activator compound, such as at least 2 kg of total product per gram of the non-coordinating anion activator compound, at least 3 kg of total product per gram of non-coordinating anion activator compound, at least 5 kg of total product per gram of non-coordinating anion activator compound, at least 7 kg of total product per gram of non-coordinating anion activator compound, preferably at least 10 kg of total product per gram of non-coordinating anion activator compound, or at least 20 kg of total product per gram of non-coordinating anion activator compound.

It is of interest to have high productivity for the metallocene or non-coordinating anion activator, as these components are usually the more expensive components than other components in the catalyst system. For an economical operation, it is important to have productivity of at least 1.5 kg/g of transition metal compound or non-coordinating anion activator.

In one embodiment, the product produced herein has a selectivity of 60% or less for $C_{24}$ or less hydrocarbons, such as 50% or less, 40% or less, more 20% or less, preferably 10% or less, 5% or less, 1% or less for $C_{24}$ or less hydrocarbons (% by weight unless otherwise noted).

In one embodiment, the lube or high-performance fluid produced herein has a selectivity of 10% or more, preferably 20% or more, preferably 40% more, more preferably 50% or more, preferably 70% or more, preferably 80% or less, preferably 90% or more, or preferably 95% or more. (% by weight unless otherwise noted).

Process

The process described herein to produce the poly-alpha-olefins employs metallocene catalysts together with one or more non-coordinating anion activators and optionally with one or more co-activator or poison scavenger. The metallocene catalysts are unbridged, substituted bis(cyclopentadienyl) transition metal compounds. One class of catalysts comprises highly substituted metallocenes that give high catalyst productivity and produce a product having kinematic viscosities of greater than 8 cSt as measured at 100° C. Another class of metallocenes is unbridged and substituted cyclopentadienes, including unbridged and substituted or unsubstituted indenes and or flourenes. One aspect of the processes described herein also includes treatment of the feed olefins and solvents (if used), or purging nitrogen gas stream to remove catalyst poisons, such as peroxides, oxygen-, sulfur-, and nitrogen-containing organic compounds, and/or acetylenic compounds. This treatment is believed to increase catalyst productivity, typically by more than 30% increase in catalyst productivity, such as more than 50% increase in catalyst productivity, more than 100% increase in catalyst productivity, more than 200% increase in catalyst productivity, more than 500% increase in catalyst productivity, more than 1000% increase in catalyst productivity, or more than 2000% increase in catalyst productivity. In many cases, without purification of feed olefins, solvents if used, or purging gas stream, one may obtain no conversion or very low conversion (e.g. less than 5%).

One process (preferably a continuous or semi-continuous or batch process) to produce a polyalpha-olefin described herein, having a KV at 100° C. of greater than about 8 cSt to about 10,000, such as about 20 to about 10,000 cSt, or about 30 to about 7,500 cSt, or about 40 to about 5,000 cSt, or about 8 to about 1,000 cSt or any other PAO described herein comprises:

contacting one or more alpha-olefin monomers having 3 to 5 carbon atoms with an unbridged substituted bis cyclopentadienyl transition metal compound having the structure:

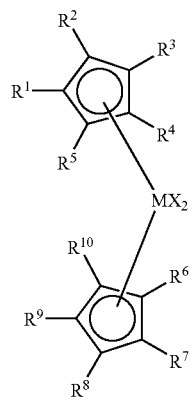

where M is a Group 4 metal;

each X is, independently, hydrogen, halogen, hydride radicals, hydrocarbyl radicals, substituted hydrocarbyl radicals, halocarbyl radicals, substituted halocarbyl radicals, silylcarbyl radicals, substituted silylcarbyl radicals, germylcarbyl radicals, or substituted germylcarbyl radicals; or both X are joined and bound to the metal atom to form a metallacycle ring containing from about 3 to about 20 carbon atoms; or both X together can be an olefin, diolefin or aryne ligand;

$R^1$ to $R^{10}$ are each independently, a radical group which is a hydrogen, a heteroatom, hydrocarbyl, substituted hydrocarbyl, halocarbyl, substituted halocarbyl, silylcarbyl or germylcarbyl, provided that at least one of $R^1$ to $R^5$ is not hydrogen and at least one of $R^6$ to $R^{10}$ is not hydrogen and where any two adjacent R groups are optionally joined to form a substituted or unsubstituted, saturated, partially unsaturated, or aromatic cyclic or polycyclic substituent; and a non-coordinating anion activator, and optionally an alkylaluminum compound, where the molar ratio of transition metal compound to activator is 10:1 to 0.1:1, and when the alkyl aluminum compound is present, the molar ratio of alkyl aluminum compound to transition metal compound is 1:4 to 4000:1, under polymerization conditions wherein:

i) hydrogen is present at a partial pressure of 0.1 to 100 psi, based upon the total pressure of the reactor or the concentration of the hydrogen is from 1 to 30,000 ppm or less by weight;

ii) wherein the alpha-olefin monomer(s) having 3 to 5 carbon atoms are present at 10 volume % or more based upon the total volume of the catalyst/activator/alkylaluminum compound solutions, monomers, and any diluents or solvents present in the reaction.

In one embodiment, a process to produce a liquid poly-alpha-olefin having a $KV_{100}$ of greater than about 8 cSt or more comprises:

a) contacting in a reaction zone, in the presence of hydrogen (preferably from 10 to 10,000 ppm by weight of hydrogen), one or more $C_3$ to $C_5$ alpha-olefin monomers, with a non-coordinating anion activator and a transition metal compound represented by the formula:

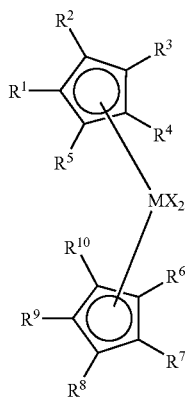

where M is a Group 4 metal;

each X is, independently, a hydrogen, halogen, hydride radicals, hydrocarbyl radicals, substituted hydrocarbyl radicals, halocarbyl radicals, substituted halocarbyl radicals, silylcarbyl radicals, substituted silylcarbyl radicals, germylcarbyl radicals, or substituted germylcarbyl radicals, or both X are joined and bound to the metal atom to form a metallacycle ring containing from about 3 to about 20 carbon atoms, or both together can be an olefin, diolefin or aryne ligand; and $R^1$ to $R^{10}$ are each independently, a radical group which is a hydrogen, a heteroatom, hydrocarbyl, substituted hydrocarbyl, halocarbyl, substituted halocarbyl, silylcarbyl or germylcarbyl, provided that: 1) at least one of $R^1$ to $R^5$ is not hydrogen or an iso-alkyl group and at least one of $R^6$ to $R^{10}$ is not hydrogen or an isoalkyl or 2) at least two of $R^1$ to $R^5$ are not hydrogen, or 3) at least two of $R^1$ to $R^5$ are not hydrogen and at least two of $R^6$ to $R^{10}$ are not hydrogen, and where any two adjacent $R^1$ to $R^5$ groups may form a $C_4$ to $C_{20}$ cyclic or poly-cyclic moiety, where any two adjacent $R^6$ to $R^{10}$ groups may form a $C_4$ to $C_{20}$ cyclic or poly-cyclic moiety, and optionally a co-activator, $R^1R^2R^3M$, where M is aluminum or boron and $R^1$, $R^2$ and $R^3$ can be the same or different $C_1$ to $C_{24}$ hydrocarbyl radicals, including trialkylaluminum, a trialkylboron compound, or a mixture of different compounds.

By continuous is meant a system that operates (or is intended to operate) without interruption or cessation. For example a continuous process to produce a polymer would be one where the reactants (such as monomers and catalyst components and/or poison scavengers) are continually introduced into one or more reactors and polymer product is continually withdrawn. By semi-continuous is meant a system that operates (or is intended to operate) with periodic interruption. For example a semi-continuous process to produce a polymer would be one where the reactants (such as monomers and catalyst components and/or scavengers) are continually introduced into one or more reactors and polymer product is intermittently withdrawn.

A batch process is not continuous or semi-continuous.

In one embodiment, the oligomerization reaction temperature is controlled by several means, such as continuous or semi-continuous operation, by heat removal, rate of catalyst or feed addition or solvent addition. Since catalyst solution, feed olefins and/or solvents and/or scavengers are usually added at room or ambient temperature or can be pre-cooled to a desired temperature, their addition to the reactor can mitigate the heat of reaction and can help maintain constant reaction temperature. This mode of operation can control the temperature to within 20° C. of the desired reaction temperature, usually to within 10° C. of the desired temperature, within 5° C. of the desired temperature, within 3° C. of the desired temperature, or within 1° C. of the desired temperature over a 30 minute period, and usually for the entire reaction.

Usually, a reactor, containing a small amount of starting liquid is pre-heated to within 10° C. of the desired reaction temperature in a semi-continuous run. This starting liquid can be feed olefins, catalyst components, solvents or polyalpha-olefins heels from previous runs, or polyalpha-olefin products from previous runs or any other appropriate liquids. Usually, a part of the feed olefins, solvent or PAO heels from previous runs or PAO products from previous runs are a more preferred starting liquid. When the reactor is at a desired temperature, feed olefins, catalyst components, hydrogen of a selected amount, solvents and other components can be added continuously at selected rates. The co-activator(s) or scavenger(s), part of all of or all of the intended amount, can be added to the starting liquid. Optionally, part or all of the co-activator(s) or scavenger(s) can be added to the feed olefins or solvent streams to maximize the effectiveness of the reaction. As the polymerization reaction starts at the reaction temperature, heat is released. In order to maintain a reaction temperature to be as constant as possible, heat is removed by one or more of several methods as mentioned in the text, or as generally known in the art. One possible method for heat removal is to continuously circulate a stream of the reactor contents through a heat exchanger by pumping this side stream through a heat exchanger to cool the side stream slightly and then pumping it back into the reaction zone. The rate of this circulation and the degree of cooling of this side stream can be used to effectively control the reaction zone temperature. Alternatively, if the reaction rate is not high enough to maintain the reaction temperature, external heating is supplied to the reactor to maintain a desired temperature. Another method to maintain a constant reaction temperature is by controlling the addition rate of feed olefin or solvent and the temperature of the feed olefin or solvent. Alternatively, the heat of the reaction can be removed to maintain constant reaction temperature by boiling a portion of the solvent or other inerts in the reactor and condensing the vapor with a cooling condenser, as in a typical boiling reactor. This mode of operation sometimes is preferred when one of the feed is a mixed butene stream containing other non-reactive $C_4$ fractions such as n-butane, iso-butane, cis- and trans-2-butenes and isobutenes. After the addition of reactants is completed, the reaction is allowed to proceed for the desired amount of time to obtain highest feed olefin conversion.

In a continuous mode of operation, the operation is started in a similar manner to the semi-continuous run, except when the reactor is filled up to a pre-determined level, a pre-determined amount of reaction product mixture is withdrawn from the reactor while the addition of all components is continued. The rate of feed addition and the amount of reaction product withdrawn from the reactor determine the reaction time or residence time. This can be pre-determined to obtain high feed olefin conversion and high reactor throughput for economical operation.

In this process, several factors are balanced for optimum results. First is the choice of catalyst components. An unbridged, substituted metallocene activated by a non-coordinating anion (NCA) with a small amount of trialkylaluminum as a co-activator and poison scavenger is an effective catalyst. The metallocene components can be dihalide or dialkyls. But, usually, the dialkyl form of the metallocene is the active chemical component to interact with an NCA activator to give the active catalyst. When the metallocene di-halide is used, it typically requires addition of tri-alkylaluminum or other alkylating reagents to convert the dihalide form into dialkyl form. In this case the molar ratio of tri-alkylaluminum to metallocene is anywhere from 4 to 4000, preferably 8 to 500. When the metallocene dialkyls are used, (such as bis(tetrahydroindenyl) zirconium dimethyl, bis(1,2-dimethylcyclopentadienyl) zirconium dimethyl, bis(1,3-dimethylcyclopentadienyl) zirconium dimethyl, bis(1,2,4-trimethylcyclopentadienyl) zirconium dimethyl, bis (tetramethylcyclopentadienyl)zirconium dimethyl or bis (methyl-3-n-butycyclopentadienyl)zirconium dimethyl, or many other dialkyl metallocenes, etc.), a small amount of tri-alkylaluminums is used to give the optimum catalyst productivity. In this case the molar ratio of trialkylaluminum to metallocene is typically 2 to 500, preferably 3 to 200, more preferably 3 to 100 or 3 to 10. The amount of the NCA used is also important. The molar ratio of the metallocene to the NCA can range from 10 to 0.1, such as 1 to 1 or 0.5 to 2.

In addition, the amount of metallocene concentration is important. In order to achieve the highest catalyst productivity, highest selectivity to lube range product and best temperature control and operability, an advantageous amount of metallocene per gram of olefin feeds ranges from 1 microgram (or 0.001 milligram)/gram to 1 milligram/gram of olefins. When amounts of catalyst components used are too high, the temperature control can become difficult, product selectivity can suffer and catalyst cost can become uneconomical.

The amount of hydrogen present in the reactor is also important. Usually smaller amounts of hydrogen can be used. The hydrogen head pressure is usually maintained at or below 300 psi, such as below 50 psi, below 30 psi, below 20 psi, or below 10 psi. Alternatively, the amount of hydrogen in the feed composition is present in a concentration of 1 ppm to 30,000 ppm, such as 10 to 10,000 ppm, or 10 to 1,000 ppm. Usually, lower hydrogen pressure is maintained to boost activity. Surprisingly, it has been found that hydrogen present in the reaction medium does not readily hydrogenate the starting alpha-olefin feeds into corresponding alkanes at low levels of hydrogen pressure or hydrogen concentration. In fact, when hydrogen is present in the reaction mixture, it has been found that the catalyst productivity increases significantly. This is also desirable in that the presence of low levels of hydrogen leads to olefinic polymers with high vinylidene content which can later be functionalized by known methods, such as those disclosed in U.S. Pat. No. 6,043,401 Therefore, it is preferred to maintain reactor hydrogen pressure below 300 psi, such as below 100 psi, less than 50 psi, less than 25 psi, less than 10 psi. Low pressure of hydrogen is not only advantageous for producing unsaturated polymers, it is also important to minimize the hydrogenation of feed stock into low value alkanes. Likewise a minimum amount of hydrogen is desired, e.g., the hydrogen is present at the level of at least 1 psi, or at least 5 psi. Usually, it is practical to add 5 to 100 psi hydrogen to the reactor.

The reaction time or residence time also influences the extent of conversion of the feed olefins. Usually, longer reaction time or residence time favors higher feed olefin conversion. However, to balance high conversion and the high reactor throughput, the reaction time or residence time is usually between 1 minute to 30 hours, such as 5 minutes to 16 hours, or 10 minutes to 10 hours. This total residence time can be achieved by using a single reactor or a series of cascading or parallel reactors or by controlling the reactant feed rates.

By selective choice of metallocenes, activated with NCA. and/or co-activator, and by selective choice of reaction operation conditions, including the amount of catalyst used, and with the right amount of trialkylaluminum as co-activator or scavenger, residence time or reaction time, and amount of hydrogen, polyalpha-olefins are produced with high catalyst productivity of more than 1.5 kilogram total product per gram of metallocene used. This high productivity makes the process economically and commercially attractive.

After the reaction is completed in the semi-continuous run or batch run or the product withdrawn from the continuous run, the crude product can be worked up by deactivating the catalyst by addition of a small amount of oxygen, carbon dioxide, air, water, alcohol, acids or any other catalyst poison agents; washing the product with a dilute aqueous sodium hydroxide or hydrochloric acid solution and water; and separating the organic layer. The organic layer typically contains un-reacted olefins, olefin oligomers and solvent. The product fractions can be separated from solvent and un-reacted starting olefins by distillation or other methods known in the art. The product fractions can be further fractionated into light fractions and residual fractions. These fractions typically have one unsaturated double bond per molecule when no or very low amount of hydrogen, such as below 10 psi of $H_2$ or less than 10 ppm $H_2$ is added to the reactor. The double bonds are mostly vinylidene, with some the balance of the olefins being 1,2-disubstituted olefins or tri-substituted olefins. These olefins are suitable for further functionalization into other functional fluids or performance additives according to well-known olefin functionalization reactions, such as alkylation with aromatic containing compounds, with maleic anhydrides, with $CO/H_2$ via hydroformylation reactions, etc. The residual fractions, which usually have little or no light hydrocarbons with less than 24 carbons can be used as lube base stock or high performance fluids if their bromine number is below 2. If the bromine number is above 2, it can be readily hydrogenated by conventional lube hydrofinishing processes and converted into fully saturated paraffin fluids with bromine number less than 2, usually significantly less than 2. Usually, lower bromine number is more preferred, as it indicates better oxidative stability. These hydrogenated, saturated hydrocarbon paraffins are used as high performance lubricant base stocks or used as high performance functional fluids after formulation. Description of the typical lubricant or functional fluids formulation can be found in the book and the 2nd references in "Synthetic Lubricants and High-Performance Functional Fluids", edition, ed. by L. R. Rudnick and R. L. Shubkin, Marcel Dekker, Inc., N.Y. 1999.

Alternatively, the crude product from the polymerization reactor can be worked up by absorbing the catalyst components and scavenger components and any other heteroatom-containing components using a solid sorbent. This is an advantageous method and is used in the examples below. In this method, a catalyst de-activator as described above is added to the crude reaction, followed by the addition of a solid absorbent. Or alternatively, a solid absorbent, such as alumina, acid clay, Celite®, or any known filter aid, is added to the crude product. The slurry is stirred for a pre-determined amount of time, usually greater than 5 minutes. Then the solid is filtered and the filtrate is ready for further distillation or fractionation. This method is described more fully in patent application U.S. Ser. No. 11/789,871, filed Apr. 26, 2007, incorporated herein by reference.

In another embodiment, the process further comprises contacting PAO produced herein with hydrogen under typical hydrogenation conditions with hydrogenation catalyst to give a mostly saturated paraffinic PAO.

Metallocene Catalyst Compounds

For purposes of this disclosure and the claims, the terms "hydrocarbyl radical," "hydrocarbyl," and hydrocarbyl group" are used interchangeably throughout this document. Likewise the terms "group," "radical," and "substituent" are also used interchangeably throughout this document. For purposes of this disclosure, "hydrocarbyl radical" is defined to be a $C_1$-$C_{100}$ radical and may be linear, branched, or cyclic. When cyclic, the hydrocarbon radical may be aromatic or non-aromatic. "Hydrocarbon radical" is defined to include substituted hydrocarbyl radicals, halocarbyl radicals, substituted halocarbyl radicals, silylcarbyl radicals, and germylcarbyl radicals as these terms are defined below. Substituted hydrocarbyl radicals are radicals in which at least one hydrogen atom has been substituted with at least one functional group such as $NR*_2$, $OR*$, $SeR*$, $TeR*$, $PR*_2$, $AsR*_2$, $SbR*_2$, $SR*$, $BR*_2$, $SiR*_3$, $GeR*_3$, $SnR*_3$, $PbR*_3$ and the like or where at least one non-hydrocarbon atom or group has been inserted within the hydrocarbyl radical, such as —O—, —S—, —Se—, —Te—, —N(R*)—, =N—, —P(R*)—, =P—, —As(R*)—, =As—, —Sb(R*)—, =Sb—, —B(R*)—, =B—, —Si(R*)$_2$—, —Ge(R*)$_2$—, —Sn(R*)$_2$—, —Pb(R*)$_2$— and the like, where R* is independently a hydrocarbyl or halocarbyl radical, and two or more R* may join together to form a substituted or unsubstituted saturated, partially unsaturated or aromatic cyclic or polycyclic ring structure.

Halocarbyl radicals are radicals in which one or more hydrocarbyl hydrogen atoms have been substituted with at least one halogen (e.g. F, Cl, Br, I) or halogen-containing group (e.g. $CF_3$).

Substituted halocarbyl radicals are radicals in which at least one halocarbyl hydrogen or halogen atom has been substituted with at least one functional group such as $NR*_2$, $OR*$, $SeR*$, $TeR*$, $PR*_2$, $AsR*_2$, $SbR*_2$, $SR*$, $BR*_2$, $SiR*_3$, $GeR*_3$, $SnR*_3$, $PbR*_3$ and the like or where at least one non-carbon atom or group has been inserted within the halocarbyl radical such as —O—, —S—, —Se—, —Te—, —N(R*)—, =N—, —P(R*)—, =P—, —As(R*)—, =As—, —Sb(R*)—, =Sb—, —B(R*)—, =B—, —Si(R*)$_2$—, —Ge(R*)$_2$—, —Sn(R*)$_2$—, —Pb(R*)$_2$— and the like, where R* is independently a hydrocarbyl or halocarbyl radical provided that at least one halogen atom remains on the original halocarbyl radical. Additionally, two or more R* may join together to form a substituted or unsubstituted saturated, partially unsaturated or aromatic cyclic or polycyclic ring structure.

Silylcarbyl radicals (also called silylcarbyls) are groups in which the silyl functionality is bonded directly to the indicated atom or atoms. Examples include $SiH_3$, $SiH_2R*$, $SiHR*_2$, $SiR*_3$, $SiH_2(OR*)$, $SiH(OR*)_2$, $Si(OR*)_3$, $SiH_2(NR*_2)$, $SiH(NR*_2)_2$, $Si(NR*_2)_3$, and the like where R* is independently a hydrocarbyl or halocarbyl radical and two or more R* may join together to form a substituted or unsubstituted saturated, partially unsaturated or aromatic cyclic or polycyclic ring structure.

Germylcarbyl radicals (also called germylcarbyls) are groups in which the germyl functionality is bonded directly to the indicated atom or atoms. Examples include $GeH_3$, $GeH_2R*$, $GeHR*_2$, $GeR^5_3$, $GeH_2(OR*)$, $GeH(OR*)_2$, $Ge(OR*)_3$, $GeH_2(NR*_2)$, $GeH(NR*_2)_2$, $Ge(NR*_2)_3$, and the like where R* is independently a hydrocarbyl or halocarbyl radical and two or more R* may join together to form a substituted or unsubstituted saturated, partially unsaturated or aromatic cyclic or polycyclic ring structure.

Polar radicals or polar groups are groups in which a heteroatom functionality is bonded directly to the indicated atom or atoms. They include heteroatoms of groups 1-17 of the periodic table (except carbon and hydrogen) either alone or connected to other elements by covalent bonds or other interactions such as ionic bonds, van der Waals forces, or hydrogen bonding. Examples of functional heteroatom containing groups include carboxylic acids, acid halides, carboxylic esters, carboxylic salts, carboxylic anhydrides, aldehydes and their chalcogen (Group 14) analogues, alcohols and phenols, ethers, peroxides and hydroperoxides, carboxylic amides, hydrazides and imides, amidines and other nitrogen analogues of amides, nitriles, amines and imines, azos, nitros, other nitrogen compounds, sulfur acids, selenium acids, thiols, sulfides, sulfoxides, sulfones, phosphines, phosphates, other phosphorus compounds, silanes, boranes, borates, alanes, aluminates. Functional groups may also be taken broadly to include organic polymer supports or inorganic support material such as alumina, and silica. Preferred examples of polar groups include $NR*_2$, $OR*$, $SeR*$, $TeR*$, $PR*_2$, $AsR*_2$, $SbR*_2$, $SR*$, $BR*_2$, $SnR*_3$, $PbR*_3$ and the like where R* is independently a hydrocarbyl, substituted hydrocarbyl, halocarbyl or substituted halocarbyl radical as defined above and two R* may join together to form a substituted or unsubstituted saturated, partially unsaturated or aromatic cyclic or polycyclic ring structure.

In using the terms "substituted or unsubstituted cyclopentadienyl ligand", "substituted or unsubstituted indenyl ligand", "substituted or unsubstituted fluorenyl ligand" and "substituted or unsubstituted tetrahydroindenyl ligand", the substitution to the aforementioned ligand may be hydrocarbyl, substituted hydrocarbyl, halocarbyl, substituted halocarbyl, silylcarbyl, or germylcarbyl. The substitution may also be within the ring giving heterocyclopentadienyl ligands, heteroindenyl ligands, heterofluorenyl ligands, or heterotetrahydroindenyl ligands, each of which can additionally be substituted or unsubstituted.

In some embodiments, the hydrocarbyl radical is independently selected from methyl, ethyl, ethenyl, and isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, propenyl, butenyl, pentenyl, hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, eicosenyl, heneicosenyl, docosenyl, tricosenyl, tetracosenyl, pentacosenyl, hexacosenyl, heptacosenyl, octacosenyl, nonacosenyl, triacontenyl, propynyl, butynyl, pentynyl, hexynyl, heptynyl, octynyl, nonynyl, decynyl, undecynyl, dodecynyl, tridecynyl, tetradecynyl, pentadecynyl, hexadecynyl, heptadecynyl, octadecynyl, nonadecynyl, eicosynyl, heneicosynyl, docosynyl, tricosynyl, tetracosynyl, pentacosynyl, hexacosynyl, heptacosynyl, octacosynyl, nonacosynyl, triacontynyl, butadienyl, pentadienyl, hexadienyl, heptadienyl, octadienyl, nonadienyl, and decadienyl. Also included are isomers of saturated, partially unsaturated and aromatic cyclic and polycyclic structures wherein the radical may additionally be subjected to the types of substitutions described above. Examples include phenyl, methylphenyl, dimethylphenyl, ethylphenyl, diethylphenyl, propylphenyl, dipropylphenyl, benzyl, methylbenzyl, naphthyl, anthracenyl, cyclopentyl, cyclopentenyl, cyclohexyl, cyclohexenyl, methylcyclohexyl, cycloheptyl, cycloheptenyl, norbornyl, norbornenyl, adamantyl and the like. For this disclosure, when a radical is listed, it indicates that radical type and all other radicals formed when that radical type is subjected to the substitutions defined above. Alkyl, alkenyl and alkynyl radicals listed include all isomers including where appropriate cyclic isomers, for example, butyl includes n-butyl, 2-methylpropyl, 1-methylpropyl, tert-butyl, and cyclobutyl (and analogous substituted cyclopropyls); pentyl includes n-pentyl, cyclopentyl, 1-methylbutyl, 2-methylbutyl, 3-methylbutyl, 1-ethylpropyl, and neopentyl (and analogous substituted cyclobutyls and cyclopropyls); butenyl includes E and Z forms of 1-butenyl, 2-butenyl, 3-butenyl, 1-methyl-1-propenyl, 1-methyl-2-propenyl, 2-methyl-1-propenyl and 2-methyl-2-propenyl (and cyclobutenyls and cyclopropenyls). Cyclic compound having substitutions include all isomer forms, for example, methylphenyl would include ortho-methylphenyl, meta-methylphenyl and para-methylphenyl; dimethylphenyl would include 2,3-dimethylphenyl, 2,4-dimethylphenyl, 2,5-dimethylphenyl, 2,6-diphenylmethyl, 3,4-dimethylphenyl, and 3,5-dimethylphenyl.

Examples of cyclopentadienyl and indenyl ligands are illustrated below as part of the ligands.

A "ring carbon atom" is a carbon atom that is part of a cyclic ring structure. By this definition, an indenyl ligand has nine ring carbon atoms; a cyclopentadienyl ligand has five ring carbon atoms and a flourenyl ligand has 13 carbon atoms. Thus an indene is equivalent to a Cp ring with two alkyl radical substituents and a fluorene is equivalent to a Cp ring with four alkyl radical substituents. In addition, the cyclic ring can also be hydrogenated, for example, di-hydro- or tetra-hydro-indenyl ligand, di-hydro, tetra-hydro or octa-hydro-fluororenyl ligands are suitable.

The metallocene compounds (pre-catalysts), useful herein are preferably cyclopentadienyl derivatives of titanium, zirconium and hafnium. In general, useful titanocenes, zirconocenes and hafnocenes may be represented by the following formulae:

$$(CpCp^*)MX_1X_2 \quad (2)$$

wherein:

M is the metal center, and is a Group 4 metal, preferably titanium, zirconium or hafnium, e.g., zirconium or hafnium;

Cp and Cp* are the same or different cyclopentadienyl rings that are each bonded to M, and 1) both Cp and Cp* are substituted with at least one non-isoalkyl substituent, or 2) Cp is substituted with from two to five substituents "R", preferably both Cp and Cp* are substituted with from two to five substituents "R", each substituent group R being, independently, a radical group which is a hydrocarbyl, substituted hydrocarbyl, halocarbyl, substituted halocarbyl, silylcarbyl or germylcarbyl, or Cp and Cp* are the same or different cyclopentadienyl rings in which any two adjacent R groups are optionally joined to form a substituted or unsubstituted, saturated, partially unsaturated, or aromatic cyclic or polycyclic substituent;

$X_1$ and $X_2$ are, independently, hydrogen, halogen, hydride radicals, hydrocarbyl radicals, substituted hydrocarbyl radicals, halocarbyl radicals, substituted halocarbyl radicals, silylcarbyl radicals, substituted silylcarbyl radicals, germylcarbyl radicals, or substituted germylcarbyl radicals; or both X are joined and bound to the metal atom to form a metallacycle ring containing from about 3 to about 20 carbon atoms; or both together can be an olefin, diolefin or aryne ligand.

Table A depicts representative constituent moieties for the metallocene components of formula 2. The list is for illustrative purposes only and should not be construed to be limiting in any way. A number of final components may be formed by permuting all possible combinations of the constituent moieties with each other. When hydrocarbyl radicals including alkyl, alkenyl, alkynyl, cycloalkyl, cycloalkenyl, cycloalkynyl and aromatic radicals are disclosed in this application the term includes all isomers. For example, butyl includes n-butyl, 2-methylpropyl, tert-butyl, and cyclobutyl; pentyl includes n-pentyl, 1-methylbutyl, 2-methylbutyl, 3-methylbutyl, 1-ethylpropyl, neopentyl, cyclopentyl and methylcyclobutyl; butenyl includes E and Z forms of 1-butenyl, 2-butenyl, 3-butenyl, 1-methyl-1-propenyl, 1-methyl-2-propenyl, 2-methyl-1-propenyl and 2-methyl-2-propenyl. This includes when a radical is bonded to another group, for example, propylcyclopentadienyl include n-propylcyclopentadienyl, isopropylcyclopentadienyl and cyclopropylcyclopentadienyl.

In general, the ligands or groups illustrated in Table A include all isomeric forms. For example, dimethylcyclopentadienyl includes 1,2-dimethylcyclopentadienyl and 1,3-dimethylcyclopentadienyl; methylindenyl includes 1-methylindenyl, 2-methylindenyl, 3-methylindenyl, 4-methylindenyl, 5-methylindenyl, 6-methylindenyl and 7-methylindenyl; methylethylphenyl includes ortho-methylethylphenyl, meta-methylethylphenyl and para-methylethylphenyl. To illustrate members of the transition metal component, select any combination of the species listed in Table A.

TABLE A

| M | Cp, Cp* |
|---|---------|
| titanium | methylcyclopentadienyl |
| zirconium | dimethylcyclopentadienyl |
| hafnium | trimethylcyclopentadienyl |
| | tetramethylcyclopentadienyl |
| | ethylcyclopentadienyl |
| | diethylcyclopentadienyl |
| | propylcyclopentadienyl |
| | dipropylcyclopentadienyl |
| | butylcyclopentadienyl |
| | dibutylcyclopentadienyl |
| | pentylcyclopentadienyl |
| | dipentylcyclopentadienyl |
| | hexylcyclopentadienyl |
| | dihexylcyclopentadienyl |
| | heptylcyclopentadienyl |
| | diheptylcyclopentadienyl |
| | octylcyclopentadienyl |
| | dioctylcyclopentadienyl |
| | nonylcyclopentadienyl |
| | dinonylcyclopentadienyl |
| | decylcyclopentadienyl |
| | didecylcyclopentadienyl |
| | undecylcyclopentadienyl |
| | dodecylcyclopentadienyl |
| | tridecylcyclopentadienyl |
| | tetradecylcyclopentadienyl |
| | pentadecylcyclopentadienyl |
| | hexadecylcyclopentadienyl |
| | heptadecylcyclopentadienyl |
| | octadecylcyclopentadienyl |
| | nonadecylcyclopentadienyl |
| | eicosylcyclopentadienyl |
| | heneicosylcyclopentadienyl |
| | docosylcyclopentadienyl |
| | tricosylcyclopentadienyl |
| | tetracosylcyclopentadienyl |
| | pentacosylcyclopentadienyl |
| | hexacosylcyclopentadienyl |
| | heptacosylcyclopentadienyl |
| | octacosylcyclopentadienyl |
| | nonacosylcyclopentadienyl |
| | triacontylcyclopentadienyl |
| | cyclohexylcyclopentadienyl |
| | phenylcyclopentadienyl |
| | diphenylcyclopentadienyl |
| | triphenylcyclopentadienyl |
| | tetraphenylcyclopentadienyl |
| | tolylcyclopentadienyl |
| | benzylcyclopentadienyl |
| | phenethylcyclopentadienyl |

TABLE A-continued

| M | Cp, Cp* |
|---|---------|
| | cyclohexylmethylcyclopentadienyl |
| | napthylcyclopentadienyl |
| | methylphenylcyclopentadienyl |
| | methyltolylcyclopentadienyl |
| | methylethylcyclopentadienyl |
| | methylpropylcyclopentadienyl |
| | methylbutylcyclopentadienyl |
| | methylpentylcyclopentadienyl |
| | methylhexylcyclopentadienyl |
| | methylheptylcyclpentadienyl |
| | methyloctylcyclopentadienyl |
| | methylnonylcyclopentadienyl |
| | methyldecylcyclopentadienyl |
| | vinylcyclopentadienyl |
| | propenylcyclopentadienyl |
| | butenylcyclopentadienyl |
| | indenyl |
| | methylindenyl |
| | dimethylindenyl |
| | trimethylindenyl |
| | tetramethylindenyl |
| | pentamethylindenyl |
| | methylpropylindenyl |
| | dimethylpropylindenyl |
| | methyldipropylindenyl |
| | methylethylindenyl |
| | methylbutylindenyl |
| | ethylindenyl |
| | propylindenyl |
| | butylindenyl |
| | pentylindenyl |
| | hexylindenyl |
| | heptylindenyl |
| | octylindenyl |
| | nonylindenyl |
| | decylindenyl |
| | phenylindenyl |
| | (fluorophenyl)indenyl |
| | (methylphenyl)indenyl |
| | biphenylindenyl |
| | (bis(trifluoromethyl)phenyl)indenyl |
| | napthylindenyl |
| | phenanthrylindenyl |
| | benzylindenyl |
| | benzindenyl |
| | cyclohexylindenyl |
| | methylphenylindenyl |
| | ethylphenylindenyl |
| | propylphenylindenyl |
| | methylnapthylindenyl |
| | ethylnapthylindenyl |
| | propylnapthylindenyl |
| | (methylphenyl)indenyl |
| | (dimethylphenyl)indenyl |
| | (ethylphenyl)indenyl |
| | (diethylphenyl)indenyl |
| | (propylphenyl)indenyl |
| | (dipropylphenyl)indenyl |
| | methyltetrahydroindenyl |
| | ethyltetrahydroindenyl |
| | propyltetrahydroindenyl |
| | butyltetrahydroindenyl |
| | phenyltetrahydroindenyl |
| | (diphenylmethyl)cyclopentadienyl |
| | trimethylsilylcyclopentadienyl |
| | triethylsilylcyclopentadienyl |
| | trimethylgermylcyclopentadienyl |
| | trifluromethylcyclopentadienyl |
| | cyclopenta[b]thienyl |
| | cyclopenta[b]furanyl |
| | cyclopenta[b]selenophenyl |
| | cyclopenta[b]tellurophenyl |
| | cyclopenta[b]pyrrolyl |
| | cyclopenta[b]phospholyl |
| | cyclopenta[b]arsolyl |
| | cyclopenta[b]stibolyl |
| | methylcyclopenta[b]thienyl |
| | methylcyclopenta[b]furanyl |
| | methylcyclopenta[b]selenophenyl |
| | methylcyclopenta[b]tellurophenyl |
| | methylcyclopenta[b]pyrrolyl |
| | methylcyclopenta[b]phospholyl |
| | methylcyclopenta[b]arsolyl |
| | methylcyclopenta[b]stibolyl |
| | dimethylcyclopenta[b]thienyl |
| | dimethylcyclopenta[b]furanyl |
| | dimethylcyclopenta[b]pyrrolyl |
| | dimethylcyclopenta[b]phospholyl |
| | trimethylcyclopenta[b]thienyl |
| | trimethylcyclopenta[b]furanyl |
| | trimethylcyclopenta[b]pyrrolyl |
| | trimethylcyclopenta[b]phospholyl |
| | ethylcyclopenta[b]thienyl |
| | ethylcyclopenta[b]furanyl |
| | ethylcyclopenta[b]pyrrolyl |
| | ethylcyclopenta[b]phospholyl |
| | diethylcyclopenta[b]thienyl |
| | diethylcyclopenta[b]furanyl |
| | diethylcyclopenta[b]pyrrolyl |
| | diethylcyclopenta[b]phospholyl |
| | triethylcyclopenta[b]thienyl |
| | triethylcyclopenta[b]furanyl |
| | triethylcyclopenta[b]pyrrolyl |
| | triethylcyclopenta[b]phospholyl |
| | propylcyclopenta[b]thienyl |
| | propylcyclopenta[b]furanyl |
| | propylcyclopenta[b]pyrrolyl |
| | propylcyclopenta[b]phospholyl |
| | dipropylcyclopenta[b]thienyl |
| | dipropylcyclopenta[b]furanyl |
| | dipropylcyclopenta[b]pyrrolyl |
| | dipropylcyclopenta[b]phospholyl |
| | tripropylcyclopenta[b]thienyl |
| | tripropylcyclopenta[b]furanyl |
| | tripropylcyclopenta[b]pyrrolyl |
| | tripropylcyclopenta[b]phospholyl |
| | butylcyclopenta[b]thienyl |
| | butylcyclopenta[b]furanyl |
| | butylcyclopenta[b]pyrrolyl |
| | butylcyclopenta[b]phospholyl |
| | dibutylcyclopenta[b]thienyl |
| | dibutylcyclopenta[b]furanyl |
| | dibutylcyclopenta[b]pyrrolyl |
| | dibutylcyclopenta[b]phospholyl |
| | tributylcyclopenta[b]thienyl |
| | tributylcyclopenta[b]furanyl |
| | tributylcyclopenta[b]pyrrolyl |
| | tributylcyclopenta[b]phospholyl |
| | ethylmethylcyclopenta[b]thienyl |
| | ethylmethylcyclopenta[b]furanyl |
| | ethylmethylcyclopenta[b]pyrrolyl |
| | ethylmethylcyclopenta[b]phospholyl |
| | methylpropylcyclopenta[b]thienyl |
| | methylpropylcyclopenta[b]furanyl |
| | methylpropylcyclopenta[b]pyrrolyl |
| | methylpropylcyclopenta[b]phospholyl |
| | butylmethylcyclopenta[b]thienyl |
| | butylmethylcyclopenta[b]furanyl |
| | butylmethylcyclopenta[b]pyrrolyl |
| | butylmethylcyclopenta[b]phospholyl |
| | cyclopenta[c]thienyl |
| | cyclopenta[c]furanyl |
| | cyclopenta[c]selenophenyl |
| | cyclopenta[c]tellurophenyl |
| | cyclopenta[c]pyrrolyl |
| | cyclopenta[c]phospholyl |
| | cyclopenta[c]arsolyl |
| | cyclopenta[c]stibolyl |
| | methylcyclopenta[c]thienyl |
| | methylcyclopenta[c]furanyl |
| | methylcyclopenta[c]selenophenyl |
| | methylcyclopenta[c]tellurophenyl |
| | methylcyclopenta[c]pyrrolyl |
| | methylcyclopenta[c]phospholyl |
| | methylcyclopenta[c]arsolyl |
| | methylcyclopenta[c]stibolyl |

TABLE A-continued

| M | Cp, Cp* |
|---|---|
| | dimethylcyclopenta[c]thienyl |
| | dimethylcyclopenta[c]furanyl |
| | dimethylcyclopenta[c]pyrrolyl |
| | dimethylcyclopenta[c]phospholyl |
| | trimethylcyclopenta[c]thienyl |
| | trimethylcyclopenta[c]furanyl |
| | trimethylcyclopenta[c]pyrrolyl |
| | trimethylcyclopenta[c]phospholyl |
| | ethylcyclopenta[c]thienyl |
| | ethylcyclopenta[c]furanyl |
| | ethylcyclopenta[c]pyrrolyl |
| | ethylcyclopenta[c]phospholyl |
| | diethylcyclopenta[c]thienyl |
| | diethylcyclopenta[c]furanyl |
| | diethylcyclopenta[c]pyrrolyl |
| | diethylcyclopenta[c]phospholyl |
| | triethylcyclopenta[c]thienyl |
| | triethylcyclopenta[c]furanyl |
| | triethylcyclopenta[c]pyrrolyl |
| | triethylcyclopenta[c]phospholyl |
| | propylcyclopenta[c]thienyl |
| | propylcyclopenta[c]furanyl |
| | propylcyclopenta[c]pyrrolyl |
| | propylcyclopenta[c]phospholyl |
| | dipropylcyclopenta[c]thienyl |
| | dipropylcyclopenta[c]furanyl |
| | dipropylcyclopenta[c]pyrrolyl |
| | dipropylcyclopenta[c]phospholyl |
| | tripropylcyclopenta[c]thienyl |
| | tripropylcyclopenta[c]furanyl |
| | tripropylcyclopenta[c]pyrrolyl |
| | tripropylcyclopenta[c]phospholyl |
| | butylcyclopenta[c]thienyl |
| | butylcyclopenta[c]furanyl |
| | butylcyclopenta[c]pyrrolyl |
| | butylcyclopenta[c]phospholyl |
| | dibutylcyclopenta[c]thienyl |
| | dibutylcyclopenta[c]furanyl |
| | dibutylcyclopenta[c]pyrrolyl |
| | dibutylcyclopenta[c]phospholyl |
| | tributylcyclopenta[c]thienyl |
| | tributylcyclopenta[c]furanyl |
| | tributylcyclopenta[c]pyrrolyl |
| | tributylcyclopenta[c]phospholyl |
| | ethylmethylcyclopenta[c]thienyl |
| | ethylmethylcyclopenta[c]furanyl |
| | ethylmethylcyclopenta[c]pyrrolyl |
| | ethylmethylcyclopenta[c]phospholyl |
| | methylpropylcyclopenta[c]thienyl |
| | methylpropylcyclopenta[c]furanyl |
| | methylpropylcyclopenta[c]pyrrolyl |
| | methylpropylcyclopenta[c]phospholyl |
| | butylmethylcyclopenta[c]thienyl |
| | butylmethylcyclopenta[c]furanyl |
| | butylmethylcyclopenta[c]pyrrolyl |
| | butylmethylcyclopenta[c]phospholyl |
| | pentamethylcyclopentadienyl |
| | tetrahydroindenyl |
| | methyltetrahydroindenyl |
| | dimethyltetrahydroindenyl |

In an embodiment of the disclosure, when used with an NCA, Cp is the same as Cp* and is a substituted cyclopentadienyl, indenyl or tetrahydroindenyl ligand.

Preferred metallocene compounds (pre-catalysts) which, according to the present invention, provide catalyst systems which are specific to the production of PAO of greater than 8 cSt include:

bis(cyclopentadienyl)zirconium dichloride
bis(methylcyclopentadienyl)zirconium dichloride
bis(ethylcyclopentadienyl)zirconium dichloride
bis(n-propylcyclopentadienyl)zirconium dichloride
bis(iso-propylcyclopentadienyl)zirconium dichloride
bis(n-butylcyclopentadienyl)zirconium dichloride
bis(iso-butylcyclopentadienyl)zirconium dichloride
bis(tertiary-butylcyclopentadienyl)zirconium dichloride
bis(n-pentylcyclopentadienyl)zirconium dichloride
bis(n-octylcyclopentadienyl)zirconium dichloride
bis(n-dodecylcyclopentadienyl)zirconium dichloride
bis(1,2-dimethylcyclopentadienyl)zirconium dichloride
bis(1,3-dimethylcyclopentadienyl)zirconium dichloride
bis(1,2,3-trimethylcyclopentadienyl)zirconium dichloride
bis(1,2,4-trimethylcyclopentadienyl)zirconium dichloride
bis(1,2,3,4-tetramethylcyclopentadienyl)zirconium dichloride
bis(1,2,3,4,5-pentamethylcyclopentadienyl)zirconium dichloride
bis(1-methyl-2-ethylcyclopentadienyl)zirconium dichloride
bis(1-methyl-2-n-propylcyclopentadienyl)zirconium dichloride
bis(1-methyl-2-n-butylcyclopentadienyl)zirconium dichloride
bis(1-methyl-3-ethylcyclopentadienyl)zirconium dichloride
bis(1-methyl-3-n-propylcyclopentadienyl)zirconium dichloride
bis(1-methyl-3-n-butylcyclopentadienyl)zirconium dichloride
bis(1-methyl-3-n-pentylcyclopentadienyl)zirconium dichloride
bis(1,2-dimethyl-4-ethylcyclopentadienyl)zirconium dichloride
bis(1,2-dimethyl-4-n-propylcyclopentadienyl)zirconium dichloride
bis(1,2-dimethyl-4-n-butylcyclopentadienyl)zirconium dichloride
bis(1,2-diethylcyclopentadienyl)zirconium dichloride
bis(1,3-diethylcyclopentadienyl)zirconium dichloride
bis(1,2-di-n-propylcyclopentadienyl)zirconium dichloride
bis(1,2-di-n-butylcyclopentadienyl)zirconium dichloride
bis(1-methyl-2,4-diethylcyclopentadienyl)zirconium dichloride
bis(1,2-diethyl-4-n-propylcyclopentadienyl)zirconium dichloride
bis(1,2-diethyl-4-n-butylcyclopentadienyl)zirconium dichloride
bis(1-methyl-3-i-propylcyclopentadienyl)zirconium dichloride
bis(1-ethyl-3-i-propylcyclopentadienyl)zirconium dichloride
(1,2-dimethylcyclopentadienyl)(cyclopentadienyl)zirconium dichloride
(1,3-dimethylcyclopentadienyl)(cyclopentadienyl)zirconium dichloride
(1,2-dimethylcyclopentadienyl)(methylcyclopentadienyl)zirconium dichloride
(1,2-dimethylcyclopentadienyl)(ethylcyclopentadienyl)zirconium dichloride
(1,2-dimethylcyclopentadienyl)(1,2-di-n-butylcyclopentadienyl)zirconium dichloride
(1,3-dimethylcyclopentadienyl)(cyclopentadienyl)zirconium dichloride
(1,3-dimethylcyclopentadienyl)(1,2-dimethylcyclopentadienyl)zirconium dichloride
(1,3-dimethylcyclopentadienyl)(1,3-diethylcyclopentadienyl)zirconium dichloride
bis(indenyl)zirconium dichloride
bis(1-methylindenyl)zirconium dichloride
bis(2-methylindenyl)zirconium dichloride
bis(4-methylindenyl)zirconium dichloride
bis(4,7-dimethylindenyl)zirconium dichloride
bis(4,5,6,7-tetrahydroindenyl)zirconium dichloride bis(4,5,6,7-tetrahydro-2-methylindenyl)zirconium dichloride
bis(4,5,6,7-tetrahydro-4,7-dimethylindenyl)zirconium dichloride
(cyclopentadienyl)(4,5,6,7-tetrahydroindenyl)zirconium dichloride The catalysts also include the zirconium dihalides, di-methyl, di-isobutyl, di-n-octyl or other di-alkyl analogs of the above compounds, and the hafnium dichloride, dihalides, or the hafnium di-methyl or di-alkyl analogs of the above compounds.

Advantageous catalyst compounds also include bis(cyclopentadienyl)zirconium dichloride, bis(methylcyclopentadienyl)zirconium dichloride, bis(n-butylcyclopentadienyl)zirconium dichloride, bis(1,2-dimethylcyclopentadienyl) zirconium dichloride, bis(1,3-dimethylcyclopentadienyl) zirconium dichloride, bis(1,2,3-trimethylcyclopentadienyl) zirconium dichloride, bis(1,2,4-trimethylcyclopentadienyl) zirconium dichloride and bis(tetramethylcyclopentadienyl) zirconium dichloride, bis(1-methyl-2-ethylcyclopentadienyl)zirconium dichloride, bis(1-methyl-3-ethylcyclopentadienyl)zirconium dichloride, bis(1-methyl-3-n-propylcyclopentadienyl)zirconium dichloride, bis(1-methyl-3-n-butylclopentadienyl)zirconium dichloride, bis(4,5,6,7-tetrahydro indenyl)zirconium dichloride, bis(indenyl)zirconium dichloride, bis(1,2-dimethylcyclopentadienyl)zirconium dimethyl, bis(1,3-dimethylcyclopentadienyl) zirconium dimethyl, bis(1,2,3-trimethylcyclopentadienyl) zirconium dimethyl, bis(1,2,4-trimethylcyclopentadienyl) zirconium dimethyl and bis(tetramethylcyclopentadienyl) zirconium dimethyl, bis(1-methyl-2-ethylcyclopentadienyl) zirconium dimethyl, bis(1-methyl-3-ethylcyclopentadienyl) zirconium dimethyl, bis(1-methyl-3-n-propylcyclopentadienyl)zirconium dimethyl, bis(1-methyl-3-n-butylclopentadienyl)zirconium dimethyl, bis(4,5,6,7-tetrahydro indenyl)zirconium dichloride, bis(indenyl) zirconium dimethyl, or their diisobutyl analogs These metallocene dialkyl components maybe present in the catalyst system by using the preformed metallocene as the starting material. Sometimes, they are present as reaction products from metallocene dihalides with trialkylaluminum compounds (co-activators/scavengers)

In an alternate embodiment, the metallocene compound is not racemic. In an alternate embodiment, a wide variety of fluorenyl-containing species that can also produced atactic polyalpha-olefins for this invention include following groups: non-bridged fluorenyl/cyclopentadienyl species, such as (Cp, Fluorenyl)ZrCl2, non-bridged fluorenyl/indenyl species, such as (In, Fluorenyl)ZrCl2, non-bridged fluorenyl/fluorenyl species such as (fluorenyl)$_2$ZrCl2, or bridged bluorenyl/fluorenyl C2v-symmetry species such as Me2Si(Fluoroenyl)ZrCl2, or bridged C1-symmetric species containing one fluorenyl ligand and another bulky ligand, etc. as described in page 38, section 2.1.2 of the book, Stereoselective Polymerization with Single-Site Catalysts, Ed. by L. S. Baugh & J. A. M. Canich, CRC Press, Taylor & Francis Group, Boca Raton, Fla., 2008.

Activators and Catalyst Activation

The catalyst precursors, when activated by an activator such as non-coordinating anion activator, form active catalysts for the polymerization or oligomerization of olefins. Activators that may be used include Lewis acid activators such as triphenylboron, tris-perfluorophenylboron, tris-perfluorophenylaluminum and the like and or ionic activators such as dimethylanilinium tetrakisperfluorophenylborate, triphenylcarboniumtetrakis perfluorophenylborate, dimethylaniliniumtetrakisperfluorophenylaluminate, and the like.

A co-activator is a compound capable of alkylating the transition metal complex, such that when used in combination with an activator, an active catalyst is formed. Co-activators include alumoxanes such as methylalumoxane, modified alumoxanes such as modified methylalumoxane, and aluminum alkyls such trimethylaluminum, tri-isobutylaluminum, triethylaluminum, and tri-isopropylaluminum, tri-n-hexylaluminum, tri-n-octylaluminum, tri-n-decylaluminum or tri-n-dodecylaluminum. Co-activators are typically used in combination with Lewis acid activators and ionic activators when the pre-catalyst is not a dihydrocarbyl or dihydride complex. Sometimes co-activators are also used and added to the feed streams or to the catalyst stream or to the reactor in single or multiple streams as scavengers to deactivate impurities in feed or reactors. In many cases, even when the dialkyl form of the metallocene component is used, small amounts of co-activator is also added to the catalyst system or to the reactor system for a further promoting effect or to scavenge an impurity of the reactor system.

Particularly useful co-activators include alkylaluminum compounds represented by the formula: $R_3Al$, where each R is, independently, a $C_1$ to $C_{18}$ alkyl group, preferably each R is, independently, selected from the group consisting of methyl, ethyl, n-propyl, iso-propyl, iso-butyl, n-butyl, t-butyl, n-pentyl, iso-pentyl, neopentyl, n-hexyl, iso-hexyl, n-heptyl, iso-heptyl, n-octyl, iso-octyl, n-nonyl, n-decyl, n-undecyl, n-dodecyl, n-tridecyl, n-tetradecyl, n-pentadecyl, n-hexadecyl, n-heptadecyl, n-octadecyl, and their iso-analogs.

Ionic activators (at times used in combination with a co-activator) may be used in the practice of this invention. Preferably, discrete ionic activators such as [Me$_2$PhNH][B(C$_6$F$_5$)$_4$], [Ph$_3$C][B(C$_6$F$_5$)$_4$], [Me$_2$PhNH][B((C$_6$H$_3$-3,5-(CF$_3$)$_2$))$_4$], [Ph$_3$C][B((C$_6$H$_3$-3,5-(CF$_3$)$_2$))$_4$], [NH$_4$][B(C$_6$H$_5$)$_4$] or Lewis acidic activators such as B(C$_6$F$_5$)$_3$ or B(C$_6$H$_5$)$_3$ can be used, where Ph is phenyl and Me is methyl. Preferred co-activators, when used, are alumoxanes such as methylalumoxane, modified alumoxanes such as modified methylalumoxane, and aluminum alkyls such as tri-isobutylaluminum, and trimethylaluminum, ° triethylaluminum, and tri-isopropylaluminum, tri-n-hexylaluminum, tri-n-octylaluminum, tri-n-decylaluminum or tri-n-dodecylaluminum.

It is within the scope of this disclosure to use an ionizing or stoichiometric activator, neutral or ionic, such as tri(n-butyl) ammoniumtetrakis(pentafluorophenyl) borate, a trisperfluorophenyl boron metalloid precursor or a trisperfluoronaphthyl boron metalloid precursor, polyhalogenated heteroborane anions (WO 98/43983), boric acid (U.S. Pat. No. 5,942,459) or a combination thereof. WO 98/43983 and U.S. Pat. No. 5,942,459 are incorporated herein by reference.

Examples of neutral stoichiometric activators include tri-substituted boron, tellurium, aluminum, gallium and indium or mixtures thereof. The three substituent groups are each independently selected from alkyls, alkenyls, halogen, substituted alkyls, aryls, arylhalides, alkoxy and halides. Preferably, the three groups are independently selected from halogen, mono or multicyclic (including halosubstituted) aryls, alkyls, and alkenyl compounds and mixtures thereof, preferred are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). More preferably, the three groups are alkyls having 1 to 4 carbon groups, phenyl, naphthyl or mixtures thereof. Even more preferably, the three groups are halogenated, preferably fluorinated, aryl groups. Most preferably, the neutral stoichiometric activator is trisperfluorophenyl boron or trisperfluoronaphthyl boron.

Ionic stoichiometric activator compounds may contain an active proton, or some other cation associated with, but not coordinated to, or only loosely coordinated to, the remaining ion of the ionizing compound. Such compounds and the like are described in European publications EP-A-0 570 982, EP-A-0 520 732, EP-A-0 495 375, EP-B1-0 500 944, EP-A-0 277 003 and EP-A-0 277 004, and U.S. Pat. Nos. 5,153,157, 5,198,401, 5,066,741, 5,206,197, 5,241,025, 5,384,299 and 5,502,124 and U.S. patent application Ser. No. 08/285,380, filed Aug. 3, 1994, all of which are herein fully incorporated by reference.

Ionic catalysts can be prepared by reacting a transition metal compound with an activator, such as $B(C_6F_6)_3$, which upon reaction with the hydrolyzable ligand (X') of the transition metal compound forms an anion, such as $([B(C_6F_5)_3(X')]^-)$, which stabilizes the cationic transition metal species generated by the reaction. The catalysts can be, and preferably are, prepared with activator components which are ionic compounds or compositions. However preparation of activators utilizing neutral compounds is also contemplated by this invention.

Compounds useful as an activator component in the preparation of the ionic catalyst systems used in the process of this invention comprise a cation, which is preferably a Brønsted acid capable of donating a proton, and a compatible non-coordinating anion which anion is relatively large (bulky), capable of stabilizing the active catalyst species which is formed when the two compounds are combined and said anion will be sufficiently labile to be displaced by olefinic, diolefinic, and acetylenically unsaturated substrates or other neutral Lewis bases such as ethers, nitriles, and the like. Two classes of compatible non-coordinating anions have been disclosed in EPA 277,003 and EPA 277,004 published 1988: 1) anionic coordination complexes comprising a plurality of lipophilic radicals covalently coordinated to and shielding a central charge-bearing metal or metalloid core, and 2) anions comprising a plurality of boron atoms such as carboranes, metallacarboranes and boranes. Any of these non-coordinating anions may be used in processes described herein. The disclosures of EPA 277,003 and EPA 277,004 are incorporated herein by reference. In a preferred embodiment, the stoichiometric activators include a cation and an anion component, and may be represented by the following formula:

$$(L^{**}\text{-H})^{d+}(A^{d-})$$

wherein $L^{}$ is a neutral Lewis base; H is hydrogen; $(L^{}\text{-H})^{d+}$ is a Brønsted acid, $A^{d-}$ is a non-coordinating anion having the charge d-, d is an integer from 1 to 3.

The cation component, $(L^{**}\text{-H})^{d+}$ may include Brønsted acids such as protons or protonated Lewis bases or reducible Lewis acids capable of protonating or abstracting a moiety, such as an alkyl or aryl, from the precatalyst after alkylation.

The activating cation $(L^{}\text{-H})$ may be a Brønsted acid, capable of donating a proton to the alkylated transition metal catalytic precursor resulting in a transition metal cation, including ammoniums, oxoniums, phosphoniums, silyliums, and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo-N,N-dimethylaniline, p-nitro-N,N-dimethylaniline, phosphoniums from triethylphosphine, triphenylphosphine, and diphenylphosphine, oxoniums from ethers such as dimethyl ether, diethyl ether, tetrahydrofuran and dioxane, sulfoniums from thioethers, such as diethyl thioethers and tetrahydrothiophene, and mixtures thereof. The activating cation $(L^{}\text{-H})^{d+}$ may also be a moiety such as silver, tropylium, carbeniums, ferroceniums and mixtures, preferably carboniums and ferroceniums; most preferably triphenyl carbonium.

The anion component $A^{d-}$ includes those having the formula $[M^{k+}Q_n]^{d-}$ wherein k is an integer from 1 to 3; n is an integer from 2-6; n−k=d; M is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than one occurrence is Q a halide. Preferably, each Q is a fluorinated hydrocarbyl group having 1 to 20 carbon atoms, more preferably each Q is a fluorinated aryl group, and most preferably each Q is a pentafluoryl aryl group. Examples of suitable $A^{d-}$ also include diboron compounds as disclosed in U.S. Pat. No. 5,447,895, which is fully incorporated herein by reference.

Illustrative, but not limiting, examples of boron compounds which may be used as an activating cocatalyst in combination with a co-activator in the preparation of the catalysts used herein are tri-substituted ammonium salts such as: trimethylammonium tetraphenylborate, triethylammonium tetraphenylborate, tripropylammonium tetraphenylborate, tri(n-butyl)ammonium tetraphenylborate, tri(tert-butyl) ammonium tetraphenylborate, N,N-dimethylanilinium tetraphenylborate, N,N-diethylanilinium tetraphenylborate, N,N-dimethyl-(2,4,6-trimethylanilinium) tetraphenylborate, trimethylammonium tetrakis(pentafluorophenyl)borate, triethylammonium tetrakis(pentafluorophenyl)borate, tripropylammonium tetrakis(pentafluorophenyl)borate, tri(n-butyl)ammonium tetrakis(pentafluorophenyl)borate, tri(sec-butyl)ammonium tetrakis(pentafluorophenyl)borate, N,N-dimethylanilinium tetrakis(pentafluorophenyl)borate, N,N-diethylanilinium tetrakis(pentafluorophenyl)borate, N,N-dimethyl-(2,4,6-trimethylanilinium) tetrakis (pentafluorophenyl)borate, trimethylammonium tetrakis-(2,3,4,6-tetrafluorophenyl) borate, triethylammonium tetrakis-(2,3,4,6-tetrafluorophenyl)borate, tripropylammonium tetrakis-(2,3,4,6-tetrafluorophenyl)borate, tri(n-butyl)ammonium tetrakis-(2,3,4,6-tetrafluorophenyl)borate, dimethyl (tert-butyl)ammonium tetrakis-(2,3,4,6-tetrafluorophenyl) borate, N,N-dimethylanilinium tetrakis-(2,3,4,6-tetrafluorophenyl)borate, N,N-diethylanilinium tetrakis-(2,3,4,6-tetrafluorophenyl)borate, N,N-dimethyl-(2,4,6-trimethylanilinium) tetrakis-(2,3,4,6-tetrafluorophenyl) borate, trimethylammonium tetrakis(perfluoronaphthyl) borate, triethylammonium tetrakis(perfluoronaphthyl) borate, tripropylammonium tetrakis(perfluoronaphthyl) borate, tri(n-butyl)ammonium tetrakis(perfluoronaphthyl) borate, tri(tert-butyl)ammonium tetrakis(perfluoronaphthyl) borate, N,N-dimethylanilinium tetrakis(perfluoronaphthyl) borate, N,N-diethylanilinium tetrakis(perfluoronaphthyl) borate, N,N-dimethyl-(2,4,6-trimethylanilinium) tetrakis (perfluoronaphthyl)borate, trimethylammonium tetrakis (perfluorobiphenyl)borate, triethylammonium tetrakis (perfluorobiphenyl)borate, tripropylammonium tetrakis (perfluorobiphenyl)borate, tri(n-butyl)ammonium tetrakis (perfluorobiphenyl)borate, tri(tert-butyl)ammonium tetrakis (perfluorobiphenyl)borate, N,N-dimethylanilinium tetrakis (perfluorobiphenyl)borate, N,N-diethylanilinium tetrakis (perfluorobiphenyl)borate, N,N-dimethyl-(2,4,6-trimethylanilinium) tetrakis(perfluorobiphenyl)borate, trimethylammonium tetrakis(3,5-bis(trifluoromethyl)phenyl)borate, triethylammonium tetrakis(3,5-bis(trifluoromethyl)phenyl)borate, tripropylammonium tetrakis(3,5-bis (trifluoromethyl)phenyl)borate, tri(n-butyl)ammonium tetrakis(3,5-bis(trifluoromethyl)phenyl)borate, tri(tert-butyl) ammonium tetrakis(3,5-bis(trifluoromethyl)phenyl)borate, N,N-dimethylanilinium tetrakis(3,5-bis(trifluoromethyl) phenyl)borate, N,N-diethylanilinium tetrakis(3,5-bis(trifluoromethyl)phenyl)borate, N,N-dimethyl-(2,4,6-trimethylanilinium) tetrakis(3,5-bis(trifluoromethyl)phenyl)borate, and dialkyl ammonium salts such as: di-(iso-propyl)ammonium tetrakis(pentafluorophenyl)borate, and dicyclohexylammonium tetrakis(pentafluorophenyl)borate; and other salts such as tri(o-tolyl)phosphonium tetrakis(pentafluorophenyl)borate, tri(2,6-dimethylphenyl)phosphonium tetrakis(pentafluorophenyl)borate, tropylium tetraphenylborate, triphenylcarbenium tetraphenylborate, triphenylphosphonium tetraphenylborate, triethylsilylium tetraphenylborate, benzene(diazonium)tetraphenylborate, tropylium tetrakis(pentafluorophenyl)borate, triphenylcarbenium tetrakis(pentafluorophenyl)borate, triphenylphosphonium tetrakis(pentafluorophenyl)borate, triethylsilylium tetrakis(pentafluorophenyl)borate, benzene(diazonium) tetrakis(pentafluorophenyl)borate, tropylium tetrakis-(2,3,4,6-tetrafluorophenyl)borate, triphenylcarbenium tetrakis-(2,3,4,6-tetrafluorophenyl)borate, triphenylphosphonium tetrakis-(2,3,4,6-tetrafluorophenyl)borate, triethylsilylium tetrakis-(2,3,4,6-tetrafluorophenyl)borate, benzene(diazonium) tetrakis-(2,3,4,6-tetrafluorophenyl)borate, tropylium tetrakis (perfluoronaphthyl)borate, triphenylcarbenium tetrakis(perfluoronaphthyl)borate, triphenylphosphonium tetrakis(perfluoronaphthyl)borate, triethylsilylium tetrakis(perfluoronaphthyl)borate, benzene(diazonium) tetrakis(perfluoronaphthyl)borate, tropylium tetrakis(perfluorobiphenyl)borate, triphenylcarbenium tetrakis(perfluorobiphenyl)borate, triphenylphosphonium tetrakis(perfluorobiphenyl)borate, triethylsilylium tetrakis(perfluorobiphenyl)borate, benzene(diazonium) tetrakis(perfluoFrobiphenyl)borate, tropylium tetrakis(3,5-bis(trifluoromethyl)phenyl)borate, triphenylcarbenium tetrakis (3,5-bis(trifluoromethyl)phenyl)borate, triphenylphosphonium tetrakis(3,5-bis(trifluoromethyl)phenyl)borate, triethylsilylium tetrakis(3,5-bis(trifluoromethyl) phenyl)borate, and benzene(diazonium) tetrakis(3,5-bis(trifluoromethyl)phenyl)borate.

Suitable ionic stoichiometric activators $(L^{**}\text{-}H)_d^+ (A^{d-})$ include N,N-dimethylanilinium tetrakis(perfluorophenyl) borate, N,N-dimethylanilinium tetrakis(perfluoronaphthyl) borate, N,N-dimethylanilinium tetrakis(perfluorobiphenyl) borate, N,N-dimethylanilinium tetrakis(3,5-bis (trifluoromethyl)phenyl)borate, triphenylcarbenium tetrakis (perfluoronaphthyl)borate, triphenylcarbenium tetrakis (perfluorobiphenyl)borate, triphenylcarbenium tetrakis(3,5-bis(trifluoromethyl)phenyl)borate, or triphenylcarbenium tetra(perfluorophenyl)borate.

The catalyst precursors can also be activated with cocatalysts or activators that comprise non-coordinating anions containing metalloid-free cyclopentadienide ions. These are described in U.S. Patent Publication 2002/0058765 A1, published on 16 May 2002 (incorporated herein by reference), and for the process described herein, require the addition of a co-activator to the catalyst pre-cursor. "Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Preferred non-coordinating anions useful in accordance with this disclosure are those that are compatible, stabilize the transition metal complex cation in the sense of balancing its ionic charge at +1, yet retain sufficient lability to permit displacement by an ethylenically or acetylenically unsaturated monomer during polymerization. These types of cocatalysts are sometimes used with scavengers such as but not limited to tri-iso-butylaluminum, tri-n-octylaluminum, tri-n-hexylaluminum, triethylaluminum or trimethylaluminum.

The processes described herein also can employ cocatalyst compounds or activator compounds that are initially neutral Lewis acids but form a cationic metal complex and a noncoordinating anion, or a zwitterionic complex upon reaction with the alkylated transition metal compounds. The alkylated metallocene compound is formed from the reaction of the catalyst pre-cursor and the co-activator. For example, tris (pentafluorophenyl) boron or aluminum act to abstract a hydrocarbyl ligand to yield a cationic transition metal complex and stabilizing noncoordinating anion, see EP-A-0 427 697 and EP-A-0 520 732 for illustrations of analogous Group-4 metallocene compounds. Also, see the methods and compounds of EP-A-0 495 375. For formation of zwitterionic complexes using analogous Group 4 compounds, see U.S. Pat. Nos. 5,624,878; 5,486,632; and 5,527,929, which, along with EP-A-0 427 697, EP-A-0 495 375 are incorporated herein by reference.

Additional neutral Lewis-acids are known in the art and are suitable for abstracting formal anionic ligands. See in particular the review article by E. Y.-X. Chen and T. J. Marks, "Cocatalysts for Metal-Catalyzed Olefin Polymerization: Activators, Activation Processes, and Structure-Activity Relationships", *Chem. Rev.,* 100, 1391-1434 (2000).

When the cations of noncoordinating anion precursors are Brønsted acids such as protons or protonated Lewis bases (excluding water), or reducible Lewis acids such as ferrocenium or silver cations, or alkali or alkaline earth metal cations such as those of sodium, magnesium or lithium, the catalyst-precursor-to-activator molar ratio may be any ratio. Combinations of the described activator compounds may also be used for activation.

When an ionic or neutral stoichiometric activator (such as an NCA) is used, the catalyst-precursor-to-activator molar ratio is from 1:10 to 1:1; 1:10 to 10:1; 1:10 to 2:1; 1:10 to 3:1; 1:10 to 5:1; 1:2 to 1.2:1; 1:2 to 10:1; 1:2 to 2:1; 1:2 to 3:1; 1:2 to 5:1; 1:3 to 1.2:1; 1:3 to 10:1; 1:3 to 2:1; 1:3 to 3:1; 1:3 to 5:1; 1:5 to 1:1; 1:5 to 10:1; 1:5 to 2:1; 1:5 to 3:1; 1:5 to 5:1; 1:1 to 1:1.2. The catalyst-precursor-to-co-activator molar ratio is from 1:500 to 1:1, 1:100 to 100:1; 1:75 to 75:1; 1:50 to 50:1; 1:25 to 25:1; 1:15 to 15:1; 1:10 to 10:1; 1:5 to 5:1, 1:2 to 2:1; 1:100 to 1:1; 1:75 to 1:1; 1:50 to 1:1; 1:25 to 1:1; 1:15 to 1:1; 1:10 to 1:1; 1:5 to 1:1; 1:2 to 1:1; 1:10 to 2:1.

Advantageous activators and activator/co-activator combinations include trialkylaluminum including trimethyl, triethyl, tri-n-propyl, tri-n-hexyl, tri-n-butyl, tri-n-octyl, tri-n-dodecyl, tri-isopropyl, tri-isobutyl, or tri-isopentyl, etc. with dimethylanilinium tetrakis(pentafluorophenyl)borate or tris (pentafluorophenyl)boron, and mixtures of trimethyl aluminum with dimethylanilinium tetrakis(pentafluorophenyl)borate or tris(pentafluorophenyl)boron.

In some embodiments, methylalumoxane, modified methylalumoxane, or mixtures of alkylalumoxanes are also used by themselves or as one of the many co-activator components. However, it is often not necessary and less desirable to use alumoxanes because alumoxane compounds are generally more expensive than trialkylaluminum or trialkylboron compounds.

In some embodiments, scavenging compounds are used with stoichiometric activators. Typical aluminum or boron alkyl components useful as scavengers are represented by the general formula $R^xJZ_2$ where J is aluminum or boron, $R^x$ selected from C1 to C20 alkyl radicals and can be the same or different; and each Z is independently R$^x$ or a different univalent anionic ligand such as halogen (Cl, Br, I), alkoxide (OR$^x$) and the like. Desirable aluminum alkyls include triethylaluminum, diethylaluminum chloride, tri-iso-butylaluminum, tri-n-octylaluminum, tri-n-hexylaluminum, trimethylaluminum and the like. Desirable boron alkyls include triethylboron. Scavenging compounds may also be alumoxanes and modified alumoxanes including methylalumoxane and modified methylalumoxane.

In an alternate embodiment, alkylalumoxane compounds (such as methyl alumoxane, and modified methylalumoxane) are present in the reaction zone at less than 3 milligrams (mg) of alumoxane/gram of olefin feed, preferably less than 1 mg of alumoxane/gram of olefin feed, preferably less than 0.5 mg of alumoxane/g of olefin feed.

Supported Catalysts

Supported catalysts and/or supported catalyst systems may be used to prepare PAOs. To prepare uniform supported catalysts, the catalyst precursor preferably dissolves in the chosen solvent. The term "uniform supported catalyst" means that the catalyst precursor, the activator, and/or the activated catalyst approach uniform distribution upon the support's accessible surface area, including the interior pore surfaces of porous supports. Some embodiments of supported catalysts include uniform supported catalysts; other embodiments can use supported or non-supported catalysts.

Useful supported catalyst systems may be prepared by any method effective to support other coordination catalyst systems, "effective" meaning that the catalyst so prepared can be used for oligomerizing or polymerizing olefins in a heterogeneous process. The catalyst precursor, activator, co-activator (if present), suitable solvent, and support may be added in any order or simultaneously.

By one method, the activator, dissolved in an appropriate solvent such as toluene, may be stirred with the support material for 1 minute to 10 hours to prepare the supported catalyst. The total solution volume (of the catalyst solution, the activator solution or both) may be greater than the pore volume of the support, but some embodiments limit the total solution volume below that needed to form a gel or slurry (about 90% to 400%, preferably about 100-200%, of the pore volume). The mixture is optionally heated from 30 to 200° C. during this time. The catalyst precursor may be added to this mixture as a solid, if a suitable solvent is employed in the previous step, or as a solution. Alternatively, the mixture can be filtered, and the resulting solid mixed with a catalyst precursor solution. Similarly, the mixture may be vacuum dried and mixed with a catalyst precursor solution. The resulting catalyst mixture is then stirred for 1 minute to 10 hours, and the supported catalyst is either filtered from the solution and vacuum dried or subjected to evaporation to remove the solvent.

Alternatively, the catalyst precursor and activator may be combined in solvent to form a solution. The support is then added to the solution, and the resulting mixture is stirred, typically for 1 minute to 10 hours. The total activator/catalyst-precursor solution volume may be greater than the pore volume of the support, but some embodiments limit the total solution volume below that needed to form a gel or slurry (about 90% to 400%, preferably about 100-200% of the pore volume). After stirring, the residual solvent is removed under vacuum, typically at ambient temperature and typically over 10-16 hours; however, greater or lesser times and temperatures may be used.

The catalyst precursor may also be supported absent the activator; in this case, the activator (and optionally co-activator) is added to the liquid phase of a slurry process. For example, a solution of catalyst precursor may be mixed with a support material for a period of about 1 minute to 10 hours. The resulting precatalyst mixture may be filtered from the solution and dried under vacuum or treated with evaporation to remove the solvent. The total catalyst-precursor-solution volume may be greater than the support's pore volume, but some embodiments limit the total solution volume below that needed to form a gel or slurry (about 90% to 400%, preferably about 100-200% of the pore volume).

Additionally, two or more different catalyst precursors may be placed on the same support using any of the support methods disclosed above. Likewise, two or more activators or an activator and a co-activator, may be placed on the same support.

Suitable solid particle supports are typically comprised of polymeric or refractory oxide materials, each being preferably porous. Any support material that has an average particle size greater than 10 μm may be used in this invention. Various embodiments select a porous support material, such as for example, talc, inorganic oxides, inorganic chlorides, for example magnesium chloride and resinous support materials such as polystyrene polyolefin or polymeric compounds or any other organic support material and the like. Some embodiments select inorganic oxide materials as the support material including Group-2, -3, -4, -5, -13, or -14 metal or metalloid oxides. Some embodiments select the catalyst support materials to include silica, alumina, silica-alumina, and their mixtures. Other inorganic oxides may serve either alone or in combination with the silica, alumina, or silica-alumina. These are magnesia, titania, zirconia, and the like. Lewis acidic materials such as montmorillonite and similar clays may also serve as a support. In this case, the support can optionally double as an activator component. But additional activator may also be used. In some cases, a special family of solid support commonly known as MCM-41 can also be used. MCM-41 is a new class of unique crystalline support and can be prepared with tunable pore size and tunable acidity when modified with a second component. A detailed description of this class of materials and their modification can be found in U.S. Pat. No. 5,264,203.

The support material may be pretreated by any number of methods. For example, inorganic oxides may be calcined, chemically treated with dehydroxylating agents such as aluminum alkyls or alumoxanes, such as methylalumoxane, and the like, or both.

As stated above, polymeric carriers will also be suitable in accordance with this disclosure, see for example the descriptions in WO 95/15815 and U.S. Pat. No. 5,427,991. The methods disclosed may be used with the catalyst compounds, activators or catalyst systems of this disclosure to adsorb or absorb them on the polymeric supports, particularly if made up of porous particles, or may be chemically bound through functional groups bound to or in the polymer chains.

Useful catalyst carriers may have a surface area of from 10-700 m$^2$/g, and/or a pore volume of 0.1-4.0 cc/g and/or an average particle size of 10-500 μm. Some embodiments select a surface area of 50-500 m$^2$/g, and or a pore volume of 0.5-3.5 cc/g, and or an average particle size of 20-200 μm. Other embodiments select a surface area of 100-400 m$^2$/g, and or a pore volume of 0.8-3.0 cc/g, and or an average particle size of 30-100 μm. Useful carriers typically have a pore size of 10-1000 Angstroms, alternatively 50-500 Angstroms, or 75-350 Angstroms. The metallocenes and or the metallocene/activator combinations are generally deposited on the support at a loading level of 10-100 micromoles of catalyst precursor per gram of solid support; alternatively 20-80 micromoles of catalyst precursor per gram of solid support; or 40-60 micromoles of catalyst precursor per gram of support. But greater or lesser values may be used provided that the total amount of solid catalyst precursor does not exceed the support's pore volume.

The metallocenes and or the metallocene/activator combinations can be supported for bulk, or slurry polymerization, or otherwise as needed. Numerous support methods are known for catalysts in the olefin polymerization art, particularly alumoxane-activated catalysts; all are suitable for use herein. See, for example, U.S. Pat. Nos. 5,057,475 and 5,227,440. An example of supported ionic catalysts appears in WO 94/03056. U.S. Pat. No. 5,643,847 and WO 96/04319A which describe a particularly effective method. Both polymers and inorganic oxides may serve as supports, see U.S. Pat. Nos. 5,422,325, 5,427,991, 5,498,582 and 5,466,649, and international publications WO 93/11172 and WO 94/07928. All of these patent documents are incorporated herein by reference.

In another embodiment, the metallocene and/or activator (with or without a support) are combined with an alkylaluminum compound, preferably a trialkylaluminum compound, prior to entering the reactor. Preferably the alkylaluminum compound is represented by the formula: $R_3Al$, where each R is independently a $C_1$ to $C_{20}$ alkyl group; preferably the R groups are independently selected from the group consisting of methyl, ethyl, propyl, isopropyl, butyl, isobutyl, n-butyl, pentyl, isopentyl, n-pentyl, hexyl, isohexyl, n-hexyl, heptyl, octyl, isooctyl, n-octyl, nonyl, isononyl, n-nonyl, decyl, isodecyl, n-decyl, undecyl, isoundecyl, n-undecyl, dodecyl, isododecyl, and n-dodecyl, preferably isobutyl, n-octyl, n-hexyl, and n-dodecyl. Preferably the alkylaluminum compound is selected from tri-isobutyl aluminum, tri n-octyl aluminum, tri-n-hexyl aluminum, and tri-n-dodecyl aluminum.

Monomers

In one embodiment, the catalyst compounds described herein are used to polymerize or oligomerize propylene, 1-butene or 1-pentene or any combination thereof.

In an embodiment, the polymers and compostions comprising the polymers may include homo-oligomers or co-oligomers (for the purposes of this disclosure and the claims, a co-oligomer may comprise two or three different monomer units), homo-polymers or co-polymers. Preferred oligomers produced herein include homo-oligomers or co-oligomers of any of the monomers of $C_3$ to $C_5$ alpha-olefins. In one embodiment, the oligomer is a homo-oligomer of propylene, 1-butene or 1-pentene. In another embodiment, the oligomer is a co-oligomer comprising two or three monomers selected from $C_3$ to $C_5$ alpha-olefins. For more information on the use of mixed feeds to prepare PAOs please see PCT US2006/027591, particularly page 8, paragraph [0029] to page 16, paragraph [044], incorporated herein by reference.

The alpha-olefins used to make the PAOs include $C_3$ to $C_5$ alpha-olefins.

Useful PAOs are oligomers or polymers with carbon numbers starting from $C_{20}$ and higher made from $C_3$ to $C_5$ alpha-olefins. Suitable olefins for such useful PAOs include propylene, 1-butene and/or 1-pentene. In one embodiment, the olefin is propylene, and the polymer product is a mixture of pentamer and higher oligomers or polymers of propylene. In another embodiment, the olefin is 1-butene, and the PAO is a mixture of pentamers and higher oligomers of 1-butenes. In yet another embodiment, the olefin is 1-pentene, and the PAO is a mixture of tetramers and pentamers and higher of 1-pentene.

In another embodiment, the monomers comprise propylene and/or 1-butene, or a combination of propylene and/or 1-butene with 1-pentene. The copolymers usually have excellent viscosity range, low temperature fluidity, including low pour point, high VI, excellent volatility, excellent thermal and oxidative stability by itself, and other good lubricating properties, such as high degree of shear stability by sonic shear test or by TRB test. These fluids are also superior blending stock. When they are used as blend stocks with other low viscosity base stocks (such as Gr I to VI base stocks or GTL base stocks), the PAOs of this disclosure have much better thickening efficiency to increase the viscosity of other low viscosity fluid, This thickening efficiency is much better than that of the known stocks. For example, the poly-1-butene (POB) produced according to this disclosure has much better thickening efficiency than PIB of comparable viscosity in increasing the viscosities of the blends, and in increasing the VI of the blends. The POB blends, compared to the similar PIB blends, also have much better low temperature viscometrics, especially the Brookfield viscosity measured at $-40°$ C. or $-55°$ C., and better volatility, as measured by the Noack volatility. In many cases, the POB blends also have better shear stability, by Sonic Shear Test or by TRB test. These improvements are illustrated in the examples.

In one embodiment, the PAO comprises, i.e., is made from two or three monomers, for example, propylene and 1-butene, propylene and 1-pentene, 1-butene and 1-pentene, or propylene, 1-butene and 1-pentene, or any mixtures thereof.

The $C_3$ to $C_5$ alpha-olefins used herein can be obtained from any suitable source. Polymer grade or chemical grade propylene or 1-butene or 1-pentene are certainly suitable. Other impure feed streams containing 5 mole % or more of these olefins are also suitable. Examples of the feed streams from refinery streams, are $C_4$ Raffinate 1 or Raffinate 2 stream, which contain mixed n-butane, iso-butane, 1-butene, cis and trans 2-butenes, and isobutenes. Other refinery streams are known to contain propylene and 1-pentenes, e.g., typical refinery PP stream which contains propylene and propane, or pyrolysis gasoline stream which contains a mixture of $C_4$ and $C_5$ components containing 1-butene and 1-pentene. Alternatively, the olefins which are starting materials for the production of the polymers of this disclosure, can be produced from Fischer-Tropsch hydrocarbon synthesis from $CO/H_2$ syngas, or from metathesis of internal olefins with ethylene, or from cracking of petroleum or Fischer-Tropsch synthetic wax at high temperature, or any other alpha-olefin synthesis routes. In one embodiment, a feed for this disclosure includes at least 10 weight % alpha-olefin, such as at least 20 weight % alpha-olefin, at least 50 weight % alpha-olefin, at least 70 weight % alpha-olefin, at least 80 weight % alpha-olefin (such as linear alpha-olefin), at least 90 weight % alpha-olefin (e.g., linear alpha-olefin), or 100% alpha-olefin (such as linear alpha-olefin).

The olefins for the feed can be very dilute. For example, a suitable feed from a wax cracking reaction contains anywhere from 10 to 90 wt % alpha-olefins to make the PAOs described herein. Additionally, a feed stream from a Fischer-Tropsch synthesis process provides an alpha-olefin content that may range from 2 to 50 wt %. These are all suitable as feed olefins. However, alpha-olefin-containing mixtures can also be used as feeds in this invention, even if the other components are internal-olefins, branched olefins, paraffins, cyclic paraffins, aromatics (such as toluene and or xylenes). These components have diluent effects and are believed not to have a substantial detrimental effect on the polymerization of alpha-olefins. In other words, the processes described herein can substantially selectively convert $C_3$-$C_5$ alpha-olefins in a mixture and leave the other components unreacted. When mixed olefin stream or dilute olefin stream is used as feed, adjustments of reaction conditions are needed. The major change usually occurs during the polymerization stage. For example, reaction temperature, residence time and catalyst concentration need to be readjusted to obtain desirable product viscosity compared to pure alpha-olefin feed. Usually, slightly lower reaction temperature or long residence time or slightly higher catalyst concentration is used to produce similar product or conversion level as the pure feed. Sometimes, one or two or several variables are changed at the same time to produce desired product with most economical operation. Appropriate adjustments to achieve desired results discussed herein will be apparent to those skilled in the art. This technology can be used to separate out alpha-olefins from a mixture by selectively reacting them with polymerization or oligomerization catalyst systems, thereby completely eliminating the need to separate alpha-olefins from the remainder of the components in a mixed feedstream. This is economically advantageous, for example, in a process utilizing Raffinate stream or Fischer-Tropsch synthesis olefin product streams containing alpha-olefins, internal-olefins, branched olefins and corresponding alkanes. Such a mixture can be utilized in concordance with the oligomerization technology as described herein and can selectively react with the alpha-olefin. No separate step to isolate the alpha-olefin is needed.

Another example of the utility of this process involves alpha-olefins produced by the metathesis of internal olefins with ethylene, which may contain some internal olefins. This mixed olefin feed can be reacted as is in the polymerization/oligomerization process of this disclosure, which selectively converts the alpha-olefins into lube products. Thus one can use the alpha-olefin for the base stock synthesis without having to separate the alpha-olefin from internal olefin or other types of hydrocarbons. This can bring a significant improvement in process economics. The feed olefins can be a mixture of olefins produced from other linear alpha-olefin processes containing $C_4$ to $C_{20}$ alpha-olefins as described in Chapter 3 "Routes to Alpha-Olefins" of the book Alpha Olefins Applications Handbook, Edited by G. R. Lappin and J. D. Sauer, published by Marcel Dekker, Inc. N.Y. 1989.

In one embodiment, when 1-butene is used as the feed or one of the feed olefins with other alpha-olefins, 1-butene can be pure 1-butene prepared from any of the commercial processes. Alternatively, the 1-butene can be present as one of the components in a mixed $C_4$ stream that is readily available from a petrochemical complex or oil refinery operation. U.S. Pat. No. 5,859,159 A (incorporated herein by reference) has a more detailed discussion of such $C_4$ streams, such as BB streams (butane-butene stream), or Raffinate 1 or Raffinate 2 streams. These mixed $C_4$ streams are available from steam cracking of light naphtha in the ethylene/propylene production processes, from MTBE processes where most of the iso-butene is removed, from the FCC-operation to produce $C_4$ streams, and/or from other petroleum refining processes. When these mixed $C_4$ streams are used as feed, only 1-butene will be reacted by the catalyst system. Other $C_4$ components, cis-, trans-2-butenes, iso-butene, n-butane and iso-butane will only act as diluent, but will not react or interfere with the polymerization catalyst. These mixed $C_4$ streams are of interest and an economical source for 1-butene to produce poly-1-butene, or a copolymer of 1-butene with propylene or 1-pentene.

In another embodiment, when propylene is used as the feed, or as one of the feed olefins with other alpha-olefins, pure propylene from a chemical plant can be used. Alternatively, mixed propylene and propane streams (PP stream) can be used in the same manner. The propylene will selectively polymerize and the propane will act as a diluent and will not participate in the reaction. This PP stream may contain propylene in any amount from 10 wt % to 95 wt %. In another embodiment, mixture of PP and $C_4$ stream can be used as starting olefin or one of the starting olefin feeds.

Polymerization/Oligomerization Process

Many polymerization/oligomerization processes and reactor types used for metallocene-catalyzed polymerizations or oligomerizations such as solution, slurry, and bulk polymerization or oligomerization processes can be used in this disclosure. In some embodiments, if a solid or supported catalyst is used, a slurry or continuous fixed bed or plug flow process is suitable. In one embodiment, the monomers are contacted with the metallocene compound and the activator and/or co-activator/scavenger in the solution phase, bulk phase, or slurry phase, preferably in a continuous stirred tank reactor or a continuous tubular reactor. In one embodiment, the temperature in any reactor used herein is from −10° C. to 250° C., such as from 10° C. to 220° C., from 10° C. to 180° C., or from 10° C. to 170° C. In an embodiment, the pressure in any reactor used herein is from 0.1 to 100 atmospheres, such as from 0.5 to 75 atmospheres or from 1 to 50 atmospheres. In another embodiment, the monomer(s), metallocene and activator are contacted for a residence time of between 1 minutes to 30 hours, such as 5 minutes to 16 hours, or minutes to 10 hours.

In another embodiment, solvent or diluent is present in the reactor and is selected from the group consisting of butanes, pentanes, hexanes, heptanes, octanes, nonanes, decanes, undecanes, dodecanes, tridecanes, tetradecanes, pentadecanes, hexadecanes, toluene, o-xylene, m-xylene, p-xylene, mixed xylenes, ethylbenzene, isopropylbenzene, and n-butylbenzene; toluene and/or xylenes and/or ethylbenzene, normal paraffins (such as Norpar™ solvents available from Exxon-Mobil Chemical Company in Houston, Tex.), or isoparaffin solvents (such as Isopar™ solvents available for ExxonMobil Chemical Company in Houston, Tex.). These solvents or diluents are usually pre-treated (e.g. to remove polar impurities) in the same manner as the feed olefins. These solvents do not generally actively participate in the polymerization reaction. However, they offer diluent effect for polymerization reaction. High concentration of solvent usually has the effect of reducing product viscosity. The concentration of solvent usually ranges from 0 wt % to 80 wt %, alternatively from 10 wt % to 60 wt % and in yet another alternative, from 20 wt % to 40 wt %. For commercial production, it is preferably to use as little solvent as possible. However, if the diluent comes from the feed stock, it is more economical to produce polymer without any prior separation of the diluent in the feed stock.

Typically, in the processes of this invention, one catalyst containing a transition metal compound, discussed herein, one or more activators, co-activators or scavengers, and one or more monomers are contacted to produce a polymer or oligomer. These catalysts may be supported and as such will be particularly useful in the known slurry, solution, or bulk operating modes conducted in single, series, or parallel reactors. If the catalyst, activator or co-activator is a soluble compound, the reaction can be carried out in a solution mode. Even if one of the components is not completely soluble in the reaction medium or in the feed solution, either at the beginning of the reaction or during or at the later stages of the reaction, a solution or slurry type operation is still applicable. In any instance, the catalyst components, dissolved or suspended in solvents, such as toluene or other conveniently available aromatic solvents, or in aliphatic solvent, or in the feed alpha-olefin stream, are fed into the reactor under inert atmosphere (usually nitrogen or argon blanketed atmosphere) to allow the polymerization or oligomerization to take place.

The polymerization or oligomerization can be run in a batch mode, where all the components are added into a reactor and allowed to react to a pre-designed degree of conversion, either to partial conversion or full conversion. Subsequently, the catalyst is deactivated by any possible means, such as exposure to air or water, or by addition of alcohols or solvents containing deactivating agents, or by addition of solid sorbents. The catalyst components can then be separated by conventional aqueous wash or by filtration as in the case when a solid sorbent is used.

The polymerization or oligomerization can also be carried out in a semi-continuous operation, where feeds and catalyst system components are continuously and simultaneously added to the reactor so as to maintain a constant ratio of catalyst system components to feed olefin(s). When all feeds and catalyst components are added, the reaction is allowed to proceed to a pre-determined stage. The reaction is then discontinued by catalyst deactivation in the same manner as described for the batch operation.

The polymerization or oligomerization can also be carried out in a continuous operation, where feeds and catalyst system components are continuously and simultaneously added to the reactor so to maintain a constant ratio of catalyst system and feed olefins. The reaction product is continuously withdrawn from the reactor, as in a typical continuous stirred tank reactor (CSTR) operation. The residence times of the reactants are controlled by a pre-determined degree of conversion and catalyst concentration. The withdrawn product is then typically quenched, e.g., in a separate reactor, and the catalyst is removed in a similar manner as in other operations, i.e., batch or semi-continuous operation as described herein, e.g., in paragraphs [0099] [00100] and [00101].

In one embodiment, any of the processes to prepare PAOs described herein are continuous processes. Preferably, the continuous process comprises the steps of a) continuously introducing a feed stream comprising at least 10 mole % of the one or more $C_3$ to $C_5$ alpha-olefins into a reactor, b) continuously introducing the metallocene compound and the activator into the reactor, and c) continuously withdrawing the polyalpha-olefin from the reactor.

In another embodiment, the continuous process comprises the step of maintaining a partial pressure of hydrogen in the reactor of 0.1 to 300 psi (2068 kPa), based upon the total pressure of the reactor, such as 0.5 to 200 psi (1379 kPa), 1.0 to 150 psi (1034 kPa), 2.0 to 100 psi (690 kPa), 3 to 50 psi (345 kPa) or less, 5 to 25 psi (173 kPa), or 1 to 10 psi (69 kPa). Alternatively the hydrogen, if present, is present in the reactor at 1 to 30,000 ppm by weight, such as at 3,000 ppm or less, 150 ppm or less, 750 ppm or less, 500 ppm or less, 250 ppm or less, 100 ppm or less, 50 ppm or less, 25 ppm or less, 10 ppm or less, or 5 ppm or less. During the oligomerization or polymerization reaction, little or no hydrogen is consumed. Therefore the excess hydrogen gas can be recycled after the reaction is completed.

In another embodiment, if propylene, PP stream, $C_4$ stream, 1-butene, or 1-pentene is present in the reactor, the total partial pressure of these components is usually maintained at below 0.1000 psi, such as below 500 psi, below 200 psi, below 50 psi, below 30 psi, or preferably below 10 psi. As discussed above, the total reactor pressure may be higher than the total partial pressure of the gaseous feeds due to the presence of other inert gas, such as nitrogen or argon.

Reactors range in size from 2 ml and up. Usually, it is preferable to use reactors larger than one liter in volume for commercial production. The production facility may have one single reactor or several reactors arranged in series or in parallel or in both to maximize productivity, product properties and general process efficiency. The reactors and associated equipment are usually pre-treated to ensure good reaction rates and catalyst performance. The reaction is usually conducted under inert atmosphere, where the catalyst system and feed components will not be in contact with any catalyst deactivator or poison which is usually polar oxygen, nitrogen, sulfur or acetylenic compounds.

One or more reactors in series or in parallel may be used in the present invention. The transition metal compound, activator and when required, co-activator, may be delivered as a solution or slurry in a solvent or in the alpha-olefin feed stream, either separately to the reactor, activated in-line just prior to the reactor, or preactivated and pumped as an activated solution or slurry to the reactor. Polymerizations/oligomerizations are carried out in either single reactor operation, in which monomer, or several monomers, catalyst/activator/co-activator, optional scavenger, and optional modifiers are added continuously to a single reactor or in series reactor operation, in which the above components are added to each of two or more reactors connected in series. The catalyst components can be added to the first reactor in the series. The catalyst components may also be added to two or all reactors, with one component being added to a first reactor or reaction and another component to other reactors.

In one embodiment, the precatalyst is activated in the reactor in the presence of an olefin. In another embodiment, the precatalyst, such as the dichloride form of the metallocenes, is pre-treated with alkylaluminum reagents, especially, tri-isobutylaluminum, tri-n-hexylaluminum and/or tri-n-octylaluminum, etc., followed by charging into the reactor containing other catalyst component and the feed olefins, or followed by pre-activation with the other catalyst component to give the fully activated catalyst, which is then fed into the reactor containing feed olefins.

In another alternative, the pre-catalyst metallocene is mixed with the activator and/or the co-activator and this activated catalyst is then charged into the reactor, together with feed olefin stream containing some scavenger or co-activator. In another alternative, the whole or part of the co-activator is pre-mixed with the feed olefins and charged into the reactor at the same time as the other catalyst solution containing metallocene and activators and/or co-activator.

In some embodiments, a small amount of poison scavenger, such as trialkylaluminum (trimethylaluminum, triethylaluminum, triisopropylaluminum, triisobutylaluminum, tri-n-hexylaluminum, tri-n-octylaluminum) or methylalumoxane is added to the feed olefin stream to further improve catalyst activity. In one embodiment, the monomers are contacted with an alkylaluminum compound, preferably a trialkylaluminum compound, prior to being introduced into the reactor. In another preferred embodiment, the metallocene and/or activator are combined with an alkylaluminum compound, preferably a trialkylaluminum compound, prior to entering the reactor. In an embodiment, the alkylaluminum compound is represented by the formula: $R_3Al$, where each R is independently a $C_1$ to $C_{20}$ alkyl group, preferably the R groups are independently, selected from the group consisting of methyl, ethyl, propyl, isopropyl, butyl, isobutyl, n-butyl, pentyl, isopentyl, n-pentyl, hexyl, isohexyl, n-hexyl, heptyl, octyl, isooctyl, n-octyl, nonyl, isononyl, n-nonyl, decyl, isodecyl, n-cecyl, undecyl, isoundecyl, n-undecyl, dodecyl, isododecyl, and n-dodecyl, preferably isobutyl, n-octyl, n-hexyl, and n-dodecyl. In another embodiment, the alkylaluminum compound is selected from tri-isobutylaluminum, tri n-octylaluminum, tri-n-hexylaluminum, and tri-n-dodecylaluminum.

In one embodiment of any of the processes described herein the feed olefins and/or solvents are treated to remove catalyst poisons, such as peroxides, oxygen- or nitrogen-containing organic compounds or acetylenic compounds. The feed olefins, the solvents if used, or the purge gas (usually nitrogen) are purified by typical feed purification techniques. In the case of a liquid feed, the liquid is usually degassed under a vacuum for a period of 1 to 60 minutes to remove any dissolved gases. Alternatively, the feed olefins, solvents or purging gases are purified by passing through an activated molecular sieve (3A, 4A, 5A or 13X molecular sieve) or commercial absorbing beds made of activated alumina, silica or other purifying solids. These purifying solids can remove trace water, alcohols, nitrogen compounds, or any other polar impurities. Alternatively, the feed olefins, solvents or purging gas are purified by passing through an activated oxygenate-removal solid catalyst (de-ox catalyst), which usually contains copper, chromium and/or other metal oxides in reduced oxidation states. U.S. Pat. No. 6,987,152 describes examples of the feed purification. Depending on the feed quality and the desired feed purity, one or two or all methods described above can be used in combination to obtain best results.

Typically, in the embodiments of this disclosure, such treatment will increase catalyst productivity at least 20% to 1000% or more as compared to systems absent such treatment. The improved process also includes special treatment of the feed olefins to remove catalyst poisons, such as peroxides, oxygen-, sulfur- or nitrogen-containing organic compounds or other trace impurities. This treatment can increase catalyst productivity substantially (typically more than 10-fold). In one embodiment, the feed olefins are contacted with a molecular sieve, activated alumina, silica gel, oxygen-removing catalyst, and/or purifying clays to reduce the heteroatom-containing compounds in the feed, below 50 ppm, such as below 10 ppm.

The catalyst compositions can be used individually, or can be mixed with other known polymerization catalysts to prepare polymer or oligomer blends. Monomer and catalyst selection allows polymer or oligomer blend preparation under conditions analogous to those using individual catalysts. Polymers having increased MWD can be made with mixed catalyst systems. Sometimes it is advantageous to produce fluids with increased MWD, which may improve the fluid blending properties. Mixed catalyst can comprise two or more catalyst precursors and two or more activators. When narrow MWD is needed, it is advantageous to use single catalyst component, especially a single type of metallocene.

Generally, when using metallocene catalysts, after pretreatment of feed olefins, solvents, diluents and after precautions to keep the catalyst component stream(s) and reactor free of impurities, the reaction should proceed well. In some embodiments, when using metallocene catalysts, particularly when they are immobilized on a support, the complete catalyst system will additionally comprise one or more scavenging compounds. Here, the term scavenging compound means a compound that removes polar impurities from the reaction environment. These impurities adversely affect catalyst activity and stability. Typically, purifying steps are usually used before introducing reaction components to a reaction vessel. But such steps will rarely allow polymerization or oligomerization without using some scavenging compounds. Normally, the polymerization process will still use at least small amounts of scavenging compounds (such as those described above).

Typically, the scavenging compound will be an organometallic compound, such as the Group-13 organometallic compounds of U.S. Pat. Nos. 5,153,157, 5,241,025 and WO-A-91/09882, WO-A-94/03506, WO-A-93/14132, and that of WO 95/07941, all being incorporated herein by reference. Exemplary compounds include triethylaluminum, triethylborane, tri-iso-butylaluminum, diisobutylaluminum hydride, methylalumoxane, iso-butylalumoxane, and tri-n-octylaluminum. Those scavenging compounds having bulky or $C_6$-$C_{20}$ linear hydrocarbyl substituents connected to the metal or metalloid center usually minimize adverse interaction with the active catalyst. Examples include triethylaluminum, but more preferably, bulky compounds such as tri-iso-butyl aluminum, tri-iso-prenyl aluminum and long-chain linear alkyl-substituted aluminum compounds, such as tri-n-hexyl aluminum, tri-n-octyl aluminum, or tri-n-dodecyl aluminum. Alumoxanes also may be added in scavenging quantities with other activators, e.g., methylalumoxane, $[Me_2HNPh]^+[B(pfp)_4]^-$ or $B(pfp)_3$, where pfp is perfluorophenyl ($C_6F_5$), Me is methyl and Ph is phenyl.

The PAOs described herein can also be produced in homogeneous solution processes. Generally this involves polymerization or oligomerization in a continuous reactor in which the polymer formed and the starting monomer and catalyst materials supplied, are agitated to reduce or avoid concentration or temperature gradients. Temperature control in the reactor is generally obtained by balancing the heat of polymerization and with reactor cooling by reactor jackets or cooling coils or a cooled side-stream of reactant to cool the contents of the reactor, auto refrigeration, pre-chilled feeds, vaporization of liquid medium (diluent, monomers or solvent) or combinations of the above. Adiabatic reactors with pre-chilled feeds may also be used. The reactor temperature depends on the catalyst used and the product desired. Higher temperatures tend to give lower molecular weights and lower temperatures tend to give higher molecular weights. In general, the reactor temperature can vary between −10° C. to 250° C., such as from 10° C. to 220° C., from 10° C. to 180° C., or from 10° C. to 170° C.

Generally, it is of interest to control the reaction temperature as tightly as possible within a pre-determined band. In order to produce fluids with a narrow molecular weight distribution, such as to promote the highest possible shear stability, it is useful to control the reaction temperature to obtain minimum temperature fluctuation throughout the reactor with minimal variation over the course of the reaction time. If multiple reactors are used in series or in parallel, it is useful to keep the temperature constant within a pre-determined value band to minimize any broadening of the molecular weight distribution. In order to produce fluids with a broad molecular weight distribution, one can adjust the reaction temperature, swing profile, or fluctuation; or as in series operation, the second reactor temperature is preferably higher than the first reactor temperature. In parallel reactor operation, the temperatures of the two reactors are independent. Alternatively, the MWD can also be intentionally broadened by using multiple types of metallocene catalysts.

The pressure in any reactor used herein can vary from about 0.1 atmosphere to 100 atmospheres (1.5 psi to 1500 psi), such as from 0.5 bar atm to 75 atm (8 psi-1125 psi), or from 1.0 to 50 atm (15 psi to 750 psi). The reaction can be carried out under an atmosphere of nitrogen, or with some hydrogen or sometimes with a partial pressure from other volatile components, such as propylene, PP stream, 1-butene, $C_4$ streams, 1-pentene, etc. Sometimes a small amount of hydrogen is added to the reactor to improve the catalyst productivity. The amount of hydrogen is preferably kept at a level sufficient to improve catalyst productivity, but not high enough to induce any hydrogenation of olefins, especially the feed alpha-olefins because the conversion of alpha-olefins into saturated paraffins is very detrimental to the efficiency of the process. The amount of hydrogen partial pressure is advantageously kept low, such as less than 300 psi, less than 100 psi, less than 50 psi, less than 25 psi, or less than 10 psi. In one embodiment, in any of the processes described herein, the concentration of hydrogen in the reactor is less than 30,000 ppm, such as less than 5,000 ppm, less than 1,000 ppm, less than 500 ppm, less than 100 ppm, less than 50 ppm, or less than 10 ppm.

The reaction time or reactor residence time is usually dependent on the type of catalyst used, the amount of catalyst used, and the desired conversion level. Different metallocenes have different activities. Usually, a higher degree of alkyl substitution on the cyclopentadienyl ring improves catalyst productivity. The following exemplary catalysts or their dialkyl analogs have desirable high productivity and stability as compared to unsubstituted metallocenes: bis(1,2-dimethylcyclopentadienyl)zirconium dichloride, bis(1,3-dimethylcyclopentadienyl)zirconium dichloride, bis(1-methyl-3-n-butylcyclopentadienyl)zirconium dichloride, bis(1-methyl-3-n-propylcyclopentadienyl)zirconium dichloride, bis(1-ethyl-3-n-butylcyclopentadienyl)zirconium dichloride, bis(1-methyl-3-n-hexylcyclopentadienyl)zirconium dichloride, bis(1,2-diethylcyclopentadienyl)zirconium dichloride, bis(1,3-diethylcyclopentadienyl)zirconium dichloride, bis(1,2,3,4-tetramethylcyclopentadienyl)zirconium dichloride or bis(1,2,4-trimethylcyclopentadienyl)zirconium dichloride, or bis(1,2,3-trimethylcyclopentadienyl)zirconium dichloride, (1,2,3,4-tetramethylcyclopentadienyl)(1,3-dimethylcyclopentadienyl)zirconium dichloride or (1,2,4-trimethylcyclopentadienyl)(1,3-dimethylcyclopentadienyl)zirconium dichloride, or bis(indenyl)zirconium dichloride, or bis(1-methylindenyl)zirconium dichloride, or bis(2-methylindenyl)zirconium dichloride, or bis(1,2-dimethylindenyl)zirconium dichloride, or bis(4-methylindenyl)zirconium dichloride, or bis(4,7-dimethylindenyl)zirconium dichloride or bis(tetrahydroindenyl)zirconium dichloride, bis(2-methyl-tetrahydroindenyl)zirconium dichloride, or bis(1,2-dimethyl-tetrahydroindenyl)zirconium dichloride, or bis(1-methyl-tetrahydroindenyl)zirconium dichloride, or bis(4-methyl-tetrahydroindenyl)zirconium dichloride, bis(4,7-dimethyl-tetrahydroindenyl)zirconium dichloride.

Usually the amount of catalyst components used is determinative. High amounts of catalyst loading tend to give high conversion at short reaction time. However, high amount of catalyst usage makes the production process uneconomical and difficult to manage the reaction heat and to control the reaction temperature. Therefore, it is useful to choose a catalyst with maximum catalyst productivity to minimize the amount of metallocene and the amount of activators needed. When the catalyst system is metallocene plus a Lewis acid or an ionic promoter with NCA component, the metallocene used is typically in the range of 0.01 microgram to 500 micrograms (or 0.5 milligram) of metallocene component/gram of alpha-olefin feed. Usually the preferred range is from 0.1 microgram to 100 microgram of metallocene component per gram of alpha-olefin feed. Furthermore, the molar ratio of the NCA activator to metallocene is in the range from 0.1 to 10, such as 0.5 to 5, or 0.5 to 3. If a co-activator of alkylaluminum compound is used, the molar ratio of the Al to metallocene is in the range from 1 to 1000, such as 2 to 500, or 4 to 400.

Typically one prefers to have the highest possible conversion (close to 100%) of feed alpha-olefin in the shortest possible reaction time. However, in a CSTR operation, it is sometimes beneficial to run the reaction at an optimum conversion, which is less than 100% conversion. There are also occasions, when partial conversion is more desirable or when the narrowest possible MWD of the product is desired, because partial conversion can avoid a broadening of the MWD. If the reaction is conducted to less than 100% conversion of the alpha-olefin, the unreacted starting material after separation from other product and solvents/diluents can be recycled to increase the total process efficiency.

Desirable residence times for any process described herein are in the range between 1 minute to 30 hours, such as from 5 minutes to 16 hours, or from 10 minutes to 10 hours.

Each of these processes may also be employed in a single reactor, parallel, or series reactor configurations. The liquid processes comprise contacting olefin monomers with the above-described catalyst system(s) in a suitable diluent or solvent and allowing said monomers to react for a sufficient time to produce the desired polymers or oligomers. Both aliphatic and aromatic hydrocarbon solvents are suitable. Aromatics such as toluene, xylenes, ethylbenzene, propylbenzene, cumene, and t-butylbenzene are suitable. Alkanes, such as hexane, heptane, pentane, isopentane, and octane, Norpar or Isopar solvents (from ExxonMobil Chemical Company in Houston, Tex.) are also suitable. Generally, toluene is best suited to dissolve the catalyst components. Norpar, Isopar or hexanes are preferred as reaction diluents. Oftentimes, a mixture of toluene and Norpar, or toluene and Isopar, is used as a diluent or solvent. For process simplicity and high reactor efficiency, it is preferred to add as little as possible solvent or diluent into the reactor. Sometimes for high viscosity fluid production at low temperature, a solvent or diluent is added to facilitate reaction heat transfer, stirring, product handling, filtration, etc. Usually, less than 50 wt % extra solvent or diluent is added in the reactor, such as less than 30 wt %, less than 20 wt %, or less than 10 wt %. In one embodiment, no solvent is added to the reactor system. The reaction systems usually have a small amount of solvent or diluent carried over from the catalyst, activator or co-activator/scavenger solutions.

The process can be carried out in a continuous stirred tank reactor or plug flow reactor, or more than one reactor operated in series or parallel. These reactors may have or may not have internal cooling and the monomer feed may or may not be refrigerated. See the general disclosure of U.S. Pat. No. 5,705,577 for general process conditions.

When a solid-supported catalyst is used for the conversion, a slurry polymerization/oligomerization process generally operates in the similar temperature, pressure and residence time range as described previously. In a slurry polymerization or oligomerization, a suspension of solid catalyst, promoters, monomer and comonomers is added. The suspension including diluent is intermittently or continuously removed from the reactor. The catalyst is then separated from the product by filtration, centrifugation or settlement. The fluid is then subsequently distilled to remove solvent, any unreacted components, and light product. A portion of, or all of, the solvent and unreacted component or light components can be recycled for reuse.

If an un-supported solution catalyst is used, upon completion of the reaction or when the product is withdrawn from the reactor (such as in a CSTR), the product may still contain soluble, suspended or mixed catalyst components. These components are preferably deactivated or removed. Any of the usual catalyst deactivation methods or aqueous wash methods can be used to remove the catalyst component. Typically, the reaction is deactivated by addition of stoichiometric amount or excess of air, moisture, alcohol, isopropanol, etc. The mixture is then washed with dilute sodium hydroxide or with water to remove catalyst components. The residual organic layer is then subjected to distillation to remove solvent, which can be recycled for reuse. The distillation can further remove any light reaction products from $C_{18}$ and less. These light components can be used as a diluent for further reaction. Alternatively, they can be used as olefinic raw material for other chemical synthesis, as these light olefin products have vinylidene unsaturation, most suitable for further functionalization and for conversion to high performance fluids. Alternatively, these light olefin products can be hydrogenated for use as high quality paraffinic solvents.

Polymerization or oligomerization in the presence of a very small amount of hydrogen is also advantageous to provide polymers or oligomers with a high degree of unsaturated double bonds. These double bonds can be easily converted into functionalized fluids with multiple performance features. Examples of converting these polymers with MW greater than 300 include the preparation of ashless dispersants, where the polymers are reacted with maleic anhydride to give PAO-succinic anhydride which can then be reacted with amines, alcohols, polyether alcohols and converted, into dispersants. Examples of such conversion can be found in the book "Lubricant Additives: Chemistry and Application," ed. by Leslie R. Rudnick, Marcel Dekker, Inc. 2003, p. 143-170, incorporated herein by reference.

In another embodiment, any of polyalphaolefins produced herein can be hydrogenated. In particular, the polyalpha-olefin is preferably treated as described above to reduce heteroatom containing compounds to less than 600 ppm, and then contacted with hydrogen and a hydrogenation catalyst to produce a polyalpha-olefin having a bromine number less than 2. In one embodiment, the treated polyalpha-olefin comprises 100 ppm of heteroatom containing compounds or less, such as 10 ppm of heteroatom containing compounds or less. (A heteroatom containing compound is a compound containing at least one atom other than carbon and hydrogen.) Preferably the hydrogenation catalyst is selected from the group consisting of supported Group 7, 8, 9, and 10 metals, such as the hydrogenation catalyst selected from the group consisting of one or more of Ni, Pd, Pt, Co, Rh, Fe, Ru, Os, Cr, Mo, and W, supported on silica, alumina, clay, titania, zirconia, or mixed metal oxide supports or a mesoporous material, typically known as MCM-41 material or related material (as described in U.S. Pat. No. 5,264,203). A preferred hydrogenation catalyst is nickel supported on kieselguhr, or platinum or palladium supported on alumina or MCM-41, or cobalt-molydenum supported on alumina. Usually, a high nickel content catalyst, such as 60% Ni on Keiselguhr catalyst is used, or a supported catalyst with a high amount of Co—Mo loading. Alternatively, the hydrogenation catalyst is nickel supported on keisleghur, silica, alumina, clay or silica-alumina. Alternatively, the catalyst is Pd or Pt supported on MCM-41 or a related material.

In one embodiment the polyalpha-olefin is contacted with hydrogen and a hydrogenation catalyst at a temperature from 25° C. to 350° C., preferably 100° C. to 300° C. In another embodiment the polyalpha-olefin is contacted with hydrogen and a hydrogenation catalyst for a time period from 5 minutes to 100 hours, preferably from 5 minutes to 24 hours. In yet another embodiment the polyalpha-olefin is contacted with hydrogen and a hydrogenation catalyst at a hydrogen pressure of from 25 psi to 2500 psi, preferably from 100 to 2000 psi. In another embodiment the hydrogenation process reduces the number of mm triad groups in a polyalpha-olefin by 1 to 80%. For further information on hydrogenation of PAOs, see U.S. Pat. No. 5,573,657 and "Lubricant Base Oil Hydrogen Refining Processes" (pages 119 to 152 of Lubricant Base Oil and Wax Processing, by Avilino Sequeira, Jr., Marcel Dekker, Inc., NY, 1994), incorporated herein by references, which disclose more information on hydrogenation of PAOs.

This hydrogenation process can be accomplished in a slurry reactor in a batch operation, or in a continuous stirred tank reactor (CSTR), where the hydrogenation catalyst is at a level of 0.001 wt % to 20 wt % of the PAO feed, or preferably 0.01 wt % to 10 wt % of the PAO feed. Hydrogen and the polyalpha-olefins are continuously added to the reactor to allow for a certain chosen residence time, usually 5 minutes to 10 hours, to allow for complete hydrogenation of the unsaturated olefins. The amount of catalyst added is usually very small, yet is high enough to compensate for the catalyst deactivation. The catalyst and the hydrogenated PAO are continuously withdrawn from the reactor. The product mixture is then filtered, centrifuged or settled to remove the solid hydrogenation catalyst. The catalyst can be regenerated and reused. The hydrogenated PAO can be used as is, or further distilled or fractionated to a particular component composition if necessary. In some cases, when the hydrogenation catalyst shows no catalyst deactivation over long term operation, a stir tank hydrogenation process can be carried out in a manner where a fixed amount of catalyst is maintained in the reactor, usually 0.1 wt % to 10% of the total reactants, and only hydrogen and PAO feed need to be continuously added at a suitable feed rate and only hydrogenated PAO is withdrawn from the reactor.

The hydrogenation process can also be accomplished by a fixed bed process, in which the solid catalyst is packed inside a tubular reactor and heated to reactor temperature. Hydrogen and PAO feed can be fed through the reactor simultaneously from the top or bottom or countercurrently to maximize the contact between hydrogen, the PAO and the catalyst and to allow best heat management. The feed rates of the PAO and hydrogen are adjusted to give appropriate residence to allow complete hydrogenation of the unsaturated olefins in the feed and/or to allow a desirable conversion of mm triads in the process. The hydrogenated PAO fluid can be used as is or further distilled or fractionated to give the right component, if necessary. Usually, the finished hydrocarbon PAO fluids have bromine number less than 2.

The new poly-alpha-olefins of this disclosure, when used alone or blended with other fluids have unique lubrication properties.

In another embodiment, a novel lubricant of the present disclosure comprises a lubricant blend composition which includes the PAOs produced as described herein, together with one or more other base stocks (which also may be referred to as "second base stock"), including Group I to Group VI base stocks, a lube base stock produced from gas-to-liquid conversion process (GTL lube) or any combination thereof. Suitable combinations of such other base stocks include, without limitation, Group III and Group IV base stocks, Group IV and Group V base stocks, Group II and Group III base stocks, Group III and Group V base stocks, Group I and Group II base stocks, Group I and Group III base stocks, and at least one of Groups I-VI base stocks and the GTL lube. The lubricant blend composition comprises about 0.1 to about 90 wt % of the poly-alpha olefins of this disclosure, which may be substantially atactic POAs, and about 10 to about 99.9% wt % of the second base stock. The lubricant blend composition has unique lubrication properties, including $K_{v\,100}$ of about 3 cSt to about 1000 cSt, $K_{v\,40}$ of about 6 cSt to about 30,000 cSt, VI of about 100 to about 400, such as about 100 or greater than about 100. The lubricant blend composition has pour point of less than about 0° C., such as less than about −10° C., less than about −20° C., less than about −30° C., or less than about −40° C. The Noack volatility of the lubricant blend composition is less than about 30 wt %, such as less than about 20%, less than about 15%, less than about 10%, less than about 5%, or less than about 1%. In an embodiment, the second base stock has $K_{v\,100}$ of about 15 cSt or less. Alternatively, the second base stock has $Kv_{100}$ of about 4 cS or less, as available in Gr I, II, III, IV (PAO) base stocks or GTL lubes. Sometimes, it is desirable to blend with lowest viscosity base stock to achieve maximum increase in VI and/or maximum decrease in pour point for the final blend product. In special applications when very high viscosity is needed, such as in heavy gear lubricants or cylinder oils, it is beneficial to blend a high viscosity PAO made in this invention with another oil of 15 to 100 cS (measured at 100° C.), such as conventional heavy neutral base stocks or bright stock or PAO (such as SpectraSyn 20, SpectraSyn 40 or Spectra Syn 100) to give optimized finished lubricants. In addition, additives of one or more of: thickeners, VI improvers, antioxidants, anti-wear additives, detergent/dispersant/inhibitor (DDI) packages, and/or anti-rust additives may be added. In one embodiment, the PAOs produced herein are combined with one or more of dispersants, detergents, friction modifiers, traction improving additives, demulsifiers, defoamants, chromophores (dyes), and/or haze inhibitors. These fully formulated lubricants can be used in automotive crank case oil (engine oil), industrial oil, grease, hydraulic, gear oils, heat transfer fluids or gas turbine engine oils. These are non-limiting examples of additives used in finished lubricant formulations; Additional information on the use of the PAOs and Gr. I to VI and GTL base stocks of this disclosure in the formulations of full synthetic, semi-synthetic or part synthetic lubricant or functional fluids can be found in "Synthetic Lubricants, Mineral Oils and Bio-Based Lubricants", Ed. by L. R. Rudnick. CRC Press, Taylor & Francis Group, 2006, incorporated herein by reference. Additional information on GTL lube can be found in U.S. Pat. Nos. 6,420,618 and 7,132,042, both being incorporated herein by reference. Additional information on additives used in product formulation can be found in "Lubricants and Lubrications, Ed. by T. Mang and W. Dresel, by Wiley-VCH GmbH, Weinheim 2001, incorporated herein by reference.

EXAMPLES

Test Methods

Fluid properties were measured by following standard methods and their commonly recognized equivalent methods, except when described otherwise: kinematic viscosity at 40 and 100° C. in cSt by ASTM D 445 method; pour point by ASTM D 97 method; and viscosity index (VI) according to ASTM D 2270.

TGA Noack volatility was measured according to the following procedures summarized below:

A HTE volatility test was developed using thermogravimetric analysis (TGA) equipment. The test procedure comprises several stage heating and a final isothermal period at or near 250° C. to mimic Noack volatility test (ASTM D5800). The actual TGA test time per sample is kept at 15 minutes or less. With rapid cooling and equilibrium, the total test run time per sample is less than 33 minutes. The use of autosampler (carousel to handle multiple samples, e.g., from 16 up to 64 samples) is highly desirable. TGA is known to correlate to Noack volatility measurements as described in ASTM method D6375. Using this method, one calculates the Noack value by determining the evaporative weight loss in the TGA at a specified time determined by running a reference oil. In the present disclosure, a different approach was used to generate a set of TGA data to correlate with Noack volatility as described in the procedure below:

The test equipment is a Model Q-5000 available from TA Instruments, U.S.A., although other TGA units (for example, TA's Model Q-500 and 2950, Netzsch 209C and 209F1, etc.) may be used if an autosampler is attached. The gas flow rates are regulated inside the equipment to ensure sufficient amounts of carrier gases (air, oxygen, nitrogen, argon, or other inert gases) used to protect the furnace and microbalance from being contaminated, as well as maintaining constant flow rates for the proper control of evaporation rate, respectively.

Calibration:

The normal calibration procedure as recommended by the manufacturer is utilized. In addition to temperature calibration to ensure the proper furnace temperature control, internal standards can be established to verify run-to-run repeatability and reproducibility. At least one sample per every 15 samples is used as an internal standard. The repeatability of the internal standard is monitored and recorded periodically.

Procedure:

In order to avoid temperature overshoot, multi-stage ramping is used in combination with an isothermal period as described in the example below:
  a. Stage 1: ramp @100° C./minute from ambient temperature to 220° C.
  b. Stage 2: ramp @10° C./minute from 220° C. to 249° C.
  c. Stage 3: maintain an isothermal mode for 10 minutes
  d. Stage 4: cool down to temperature <40° C.

Other temperature ramping profiles can also be utilized.

Autosampler:

An autosampler is used to generate data in a high throughput experimentation mode. The general procedure requires (a) tare the 25 empty pans in sequence, (b) inject and weigh 25 samples into each sample pan, and (c) run 25 samples in sequence.

Sample size can range from 10 mg to 50 mg if 100 μL sample pan is used. For comparison purpose, it is important to maintain as close to a constant sample size as possible and also keep the air flow rates constant. Sample can be injected into sample pans through pipettes. Automated dispensing system may also be used to accelerate dispensing rate. However, the special geometry of sample pans (with V-shape hook on top) makes designing the automation system difficult. There are a number of sample pans available. Platinum or aluminum pans can be used due to their inertness and ease of cleaning.

Data Analysis:

Data can be plotted by measuring weight (loss or retention) of sample versus temperature or time. Since multi-stage heating and isotherm are involved, a plot of % weight loss (by every 5 wt % increment) or 5% weight retention (by every 5 wt % decrement) versus time can be graphed. In other words, the generation of a set of data based on 5 or more data points (X, Y) is sufficient, where X is the % weight retention to the original weight (i.e. 95%, 90%, 85%, 80%, 75% ... ) and Y is the time in minutes. Once the % weight versus time plots are available, possible correlations can be established by analyzing the sample data set against the actual Noack measurements (ASTM D5800-B method). Simple linear equations can be derived based on a group of oils of similar formulation chemistry. The wt % Noack volatility can be calculated from the TGA data according to the following equation:

Wt % Noack volatility=(6.815−TGA time in minutes at 15% weight loss)/0.1621

Clean-Up:

Frequent cleaning is needed to keep the system clean and to avoid condensation/contamination carried from sample to sample. A visual inspection of the hang-down wire and surrounding area is an effective way to determine whether a clean-up is needed. The general clean-up procedure includes a quick ramping to 700 or 750° C. and the maintaining at that temperature for 30-45 minutes to burn off all residues.

The following non-limiting examples are included to illustrate various embodiments of the disclosure.

The 1-butene or $C_4$ mixture used for all of the experiments summarized in the examples was purified by passing the liquefied gas through an activated oxygen-removal catalyst and a 5A molecular sieve, both available from Supelco Chromatograph Co., at a rate of 1 ml to 10 ml liquid per gram of oxygen removal catalyst and molecular sieve per hour.

Preparation of >20 cSt Poly-Alpha-Olefins from 1-Butenes:

100 grams of pure 1-butene or 1-butene in mixed butenes were charged into a 600-ml autoclave at room temperature, followed by hydrogen when hydrogen was present. The reactor was then heated to reaction temperature. At reaction temperature, the catalyst solution containing all catalyst components (metallocene, activator and triisobutylaluminum scavenger) was added in two to three stages to reactors, so that the reaction temperature was maintained as constant as possible. The reaction was quenched after 16 hours. The crude product was then treated with trace water to deactivate the catalyst. The catalyst residual was removed by addition of a small amount of solid absorbing alumina and removal of the solid alumina by filtration.

The crude product with a known amount of n-hexadecane as internal standard was then analyzed by a gas chromatograph HP5890 model equipped with a 30 meter, DB1 column which separates hydrocarbons according to their boiling points. Column conditions; initial temperature 70° C./0 minutes, programmed at 10° C./minute to 300° C. and hold for 30 minutes. The wt % of 1-butene conversion, and wt % selectivities to light fraction (<$C_{28}$ fraction) and lube fractions of $C_{28}$ and higher hydrocarbons, were than calculated from the gas chromatograph data using an internal standard method.

The crude product was then fractionated under vacuum to remove light solvents such as toluene or hexanes and light fractions, and further fractionated under high vacuum of 0.1 millitorr or lower at 150° C. to remove any light fraction. The conversion and selectivities to lube fraction were reported. The 40° C. and 100° C. kinematic viscosities, VI, pour points and GPC of the lube fractions were measured according to standard methods as described earlier. The catalyst productivity was calculated based on the weight of the total product or lube product per gram of metallocene and catalyst used.

The results of poly-1-butene (POB) synthesis are summarized in Table 1. The data demonstrates that the catalyst activities are much greater than 1,200 g product/g of catalyst.

Analytical Methods:

TABLE 1

Typical synthesis conditions and product properties of POB.

| | Example | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Catalyst | A | A | A | A | A | A | A | B | B | B | B | B |
| Reaction Temp., °C. | 100 | 80 | 50 | 80 | 50 | 35 | 25 | 55 | 40 | 30 | 25 | 20 |
| $H_2$ Pressure, PSI | 0 | 0 | 0 | 30 | 30 | 30 | 30 | 0 | 30 | 30 | 30 | 30 |
| microgram metallocene/g 1-$C_4$ | 18.24 | 18.24 | 18.24 | 18.24 | 18.24 | 18.24 | 18.24 | 18.24 | 18.24 | 18.24 | 9.12 | 4.56 |
| Wt % Conversion | 45 | 43 | 60 | 88 | 75 | 27 | 40 | 74 | 100 | 99 | 99 | 86 |
| Wt % Pdt Selectivity | | | | | | | | | | | | |
| light fraction | 0 | 31.1 | 2.0 | 54.1 | 7.2 | 2.3 | 1.4 | 23.9 | 7.8 | 4.3 | 3.4 | 1.6 |
| lube fraction | 100 | 68.9 | 98.0 | 45.9 | 92.8 | 97.7 | 98.6 | 76.1 | 92.2 | 95.7 | 96.6 | 98.4 |
| Lube Properties | | | | | | | | | | | | |
| V100° c., cS | 4865 | 9.64 | 177.9 | 9.68 | 56.9 | 429. | 1002 | 24.84 | 65.89 | 141.2 | 177.0 | 460.5 |
| V40° C., cS | | 93.66 | 8111 | 94.39 | 1528 | 26140 | 78235 | 445.93 | 1773 | 6076 | 8199 | 32760 |
| VI | | 62 | 92 | 62 | 74 | 111 | 138 | 58 | 81 | 86 | 91 | 106 |
| Pour Point, °C. | | −45 | −6 | −32 | −21 | | | −30 | −21 | | | |
| Kg lube/g Zr | 24.4 | 13.2 | 31.8 | 10.8 | 36.5 | 14.6 | 21.0 | 26.1 | 48.2 | 49.7 | 103.6 | 184.1 |
| Kg pdt/g Zr | 51.0 | 50.6 | 52.6 | 53.8 | 51.1 | 49.1 | 52.0 | 52.4 | 53.2 | 53.1 | 107.4 | 181.2 |

Catalyst A = (1-Me, 3-n-PrCp)2ZrMe2,
Catalyst B = (Me4Cp)2ZrCl2,
Activator = N,N-dimethylanilinium tetrakis(perfluorophenyl)borate
Molar ratio of Zr/Activator/Tri-isobutylaluminum = 1/1/160, 100 gram 1-butene feed Catalyst A was (1-methyl, 3-n-propyl cyclopentadienyl)$_2$ Zr (methyl)$_2$ and catalyst B was ((methyl)$_4$ cyclopentadienyl)$_2$ Zr (Cl)$_2$.

In a similar manner, mixed butene streams, which simulate the composition of mixed C4 raffinate streams, such as the $C_4$ Raffinate 1 or Raffinate 2 stream and contain 1-butene, cis- and tran-2-butenes, isobutenes, were used as feed. The synthesis and product properties are summarized in Table 2.

TABLE 2

Synthesis of POB from mixed butene stream.
Mixed C4 Feed (55% 1-C4=, 35% 2-C4=, 10% i-C4=)

|  | 13 | 14 | 15 | 16 | 17 | 18 | 19 |
|---|---|---|---|---|---|---|---|
| Catalyst | A | A | A | B | B | B | B |
| Reaction Temperature, ° C. | 20 | 40 | 30 | 15 | 15 | 20 | 20 |
| H2 Pressure, PSI | 30 | 30 | 30 | 30 | 30 | 30 | 30 |
| microgram metallocene/g 1-C4 | 6.91 | 6.91 | 6.91 | 6.91 | 3.08 | 6.91 | 13.82 |
| Wt % Lube Selectivity | 99 | 95.9 | 96.7 | 96.1 | 98.5 | 95.0 | 89.8 |
| Lube Properties |  |  |  |  |  |  |  |
| V100° c., cS | 852.38 | 107.45 | 146.54 | 203.5 | 364.49 | 136.88 | 112.96 |
| V40° C., cS | 68,043.0 | 3,965.0 | 6,027.6 | 10,277.1 | 22,515.8 | 5,661.0 | 4,263.2 |
| VI | 136 | 89 | 95 | 96 | 109 | 92 | 89 |
| GPC Mw | 7349 | 2620 | 3264 | 3645 | 4633 | 2,992 |  |
| Mn | 3390 | 1588 | 1805 | 1880 | 2283 | 1,632 |  |
| Mw/Mn | 2.168 | 1.650 | 1.808 | 1.939 | 2.029 | 1.833 |  |
| Kg lube/g catalyst | 25.4 | 11.9 | 19.4 | 40.9 | 46.3 | 42.1 | 17.1 |
| Kg total pdt/g catalyst | 28.1 | 14.6 | 22.1 | 43.6 | 48.8 | 44.9 | 19.9 |

Catalyst A = (1-Me, 3-n-PrCp)2ZrMe2,
Catalyst B = (Me4Cp)2ZrCl2,
Activator = N,N-dimethylanilinium tetrakis(perfluorophenyl)borate
Molar ratio of Zr/Activator/Tri-isobutylaluminum = 1/1/160

Catalyst A was (1-methyl, 3-n-propyl cyclopentadienyl)$_2$ Zr (methyl)$_2$ and catalyst B ((methyl)$_4$ cyclopentadienyl)$_2$ Zr (Cl)$_2$.

Samples from Examples 13-19 were used to blend with 4 to 6 cS low viscosity GTL fluids or with other low viscosity Group I to Gr V base stocks. The blend properties and comparison with competitive fluids, bright stock, polyiso-butylene (PIB) or other base stocks are summarized and discussed below. The PIB sample was available commercially from Ineos Company.

Table 3 summarizes the blend compositions and properties made from poly-1-butene (POB) with low viscosity PAO and ester fluids (Blend Examples 20-24) versus blends from PIB (Blend Examples 25-29). Key points are 1. Blend Examples 20 and 21 are made from POB of viscosity >1000 cS and have VI close to or higher than 200. These types of fluids are truly high performance fluids and these high VI properties are unexpected from such a blend composition.
2. Blend Example 22 and Blend Example 29 are made from POB and PIB, respectively, of comparable 100° C. viscosity (623.5 cS vs. 634.3 cS). From comparison of these two blends, we draw the following conclusions:
   a. Blends made from POB have better VI than from PIB. Blend Example 22 has VI of 187, which is significantly higher than the 165 VI of comparative Blend Example 29. Higher VI is a desirable property for lube application. Higher VI can translate into better wear protection and better energy efficiency.
   b. Blends made from POB have better low temperature Brookfield viscosity (BV) than blends from comparable PIB. The low temperature Brookfield viscosities (BV) at −40 and −55° C. for Blend Example 22 is much lower than those for Blend Example 29. Lower BV at low temperature translates into better pumpability, better low-temperature protection and lower energy needed to overcome viscous drag and, thus, potential better energy efficiency.
   c. POB has higher viscosity boosting efficiency than PIB. Lower amount of POB is needed to boost the viscosity of low viscosity base stocks than PIB. In Blend Example 22, 36.8 wt % of POB is needed to blend into a 8.7 cS blend, whereas 41.1 wt % PIB of comparable viscosity is needed to boost viscosity to 8.5 cS, as in Example 29. These data (comparing Example 22 to 29) show that POB is 11.7% more effective than PIB in increasing fluid viscosity. Thus, POB is a more economical base stock option to increase fluid viscosity.
3. Similar conclusion can be drawn from comparing Blend Example 23 made from POB versus Blend Examples 26, 27, or 28 from PIB. The Blend Example 23 has higher VI (169 vs. 137-148), lower BV at −40 and −55° C. at comparable 100° C. blend viscosity, and better viscosity boosting effect (43% POB needed to boost viscosity to 8.24 cS vs. 49.6 wt % PIB needed to achieve the same viscosity).
4. Similar results are observed by comparing viscosity properties of the blend of Example 20, prepared with POB, to those of Example 27, prepared with PIB. Both blends have substantially the same kinematic viscosity at 100° C. (10.67 and 10.29, respectively). Nonetheless, the blend of Example 20 has Brookfield viscosity substantially lower than that of comparative Example 27, i.e., at −40° C., Brookfield viscosity of the blend of Example 20 is 11, 977 cP as compared to Brookfield viscosity of 51,789 cP for the blend of Example 27, and at −55° C. Brookfield viscosity of Example 20 is 102, 178 cP versus 545,884 cP for that of Example 27. As is known to those skilled in the art, it is important for a lubricant to have lower viscosity at such extremely low temperatures to enable it to provide effective lubrication at low temperature. It is also notable that VI of the blend of Example 20 is 207, as compared to 137 VI for Example 27.

TABLE 3

Blends from POB with low vis PAO and ester vs. similar blends from PIB.

| | Inventive Example | | | | | Comparative Example | | | | |
|---|---|---|---|---|---|---|---|---|---|---|
| | 20 POB | 21 POB | 22 POB | 23 POB | 24 POB | 25 PIB H100 | 26 PIB H100 | 27 PIB H100 | 28 PIB H100 | 29 PIB H300 |
| Metallocene Type | B | B | B | B | B | | | | | |
| Reaction Temp., °C. | 55 | 15 | 15 | 15 | 20 | | | | | |
| H₂ Pressure, PSI | 20 | 30 | 30 | 30 | 30 | | | | | |
| microgram metallocene/ g 1-C10 | 7.388 | 4.56 | 4.56 | 4.56 | 13.82 | | | | | |
| Pure Base Stock Properties | | | | | | | | | | |
| V100° C., cS | 1600 | 1006.84 | 623.47 | 269.14 | 113 | 209.46 | 209.46 | 209.46 | 209.46 | 634.31 |
| V40° C., cS | | 88.2 | 47,013.0 | 15,271.0 | 4,263.0 | 7274.09 | 7274.09 | 7274.09 | 7274.09 | 23807.91 |
| VI | | 136 | 121 | 102 | | 112 | 112 | 112 | 112 | 164 |
| POB or PIB in Blends Composition | | | | | | | | | | predicted |
| Wt % mPOB or PIB | 32 | 34 | 36.8 | 43 | 51.6 | 32.3 | 45 | 55 | 49.6 | 41.1 |
| Wt % 2 cS Ester | 20 | 20 | 20 | 20 | 20 | 20 | 20 | 20 | 20 | 20 |
| Wt % 2 cS PAO | 48 | 46 | 43.2 | 37 | 28.4 | 47.7 | 35 | 25 | 46.7 | 38.9 |
| Blend Properties | | | | | | | | | predicted | |
| V100° C., cS | 10.67 | 9.19 | 8.70 | 8.24 | 8.24 | 4.20 | 6.70 | 10.29 | 8.24 | 8.49 |
| V40° C., cS | 50.71 | 44.11 | 42.86 | 43.20 | 47.51 | 17.76 | 35.47 | 68.08 | 48.65 | 45.74 |
| VI | 207 | 197 | 187 | 169 | 148 | 146 | 148 | 137 | 144 | 165 |
| Pour Point, °C. | −60.9 E | −60.8 E | −60.9 E | −60.8 E | −60.9 E | −60.7 E | −60.7 E | −60.7 E | Na | −60.7 E |
| Brookfield Viscosity in cP | | | | | | | | | | |
| at −40° C. | 11,977 | 11,218 | 12,537 | 16,896 | 29,144 | 2,799 | 12,677 | 51,789 | 25,036 | 15,177 |
| at −55° C. | 102,178 | 96,679 | 113,176 | 175,163 | 347,126 | 20,946 | 120,574 | 545,884 | 247,519 | 137,971 |

Table 4 summarizes the blend composition and properties of different amounts of a 630 cS POB in a 4 cS GTL lube and the comparative blend compositions of PIB H300 with 4 cS GTL lube. The base stock, GTL4 had relatively low viscosity, and VI of 138. As indicated In this table the POB and PIB have comparable 100° C. viscosity. The data in this table demonstrate the following un-expected advantages of POB vs. PIB:

1. When the same amount of POB or PIB was blended with the GTL4, the POB blends (blend Examples 30 and 33) consistently have higher kinematic viscosities at both 100° C. and 40° C. than the PIB blends (blend Examples 34 to 37).
2. FIGS. 1 and 2 compare the VI vs. 100° C. viscosity and 40° C. viscosity, respectively, for the POB and PIB blends. These graphs show that the VI values of the POB blends up to 35 cS at 100° C. viscosity or 300 cS viscosity at 40° C. viscosity are higher than the VI values of PIB blends. For instance, the blend made with POB having Kv at 100° C. of 10 cSt has VI about 165, as compared to VI of less than 160 for the blend made with PIB of the same Kv at 100° C. This is very unexpected, as the VI of the pure PIB, 171, is significantly higher than the VI of the pure POB, 117 of comparable 100° C. viscosity.
3. FIGS. 3 and 4 compare the Noack volatility versus 100° C. kinematic viscosity of the blends as predicted from TGA volatility measurement for the POB and PIB blends. These two graphs show that, for blends of same viscosities, the volatilities of POB blends were lower than PIB blends throughout the viscosity range. Lower volatility is more desirable for better performance.

TABLE 4

Blends of GTL4 with POB vs. PIB of comparable 100° C. viscosity

| | Blend Example | | | | |
|---|---|---|---|---|---|
| | Pure GTL4 | 30 | 31 | 32 | 33 | |
| Wt % POB in GTL4 | 0 | 5 | 20 | 40 | 75 | pure POB |
| Blend Property | | | | | | |
| Kv 100° C., cS | 3.67 | 4.54 | 8.15 | 19.19 | 110.12 | 623.47 |
| Kv 40° C., cS | 14.79 | 19.35 | 43.38 | 150.77 | 2473.14 | 47013 |
| VI | 138 | 156 | 165 | 145 | 120 | 117 |
| Wt % Noack Volatility | 16.57 | 15.33 | 15.15 | 12.99 | 3.30 | 0 |

| | Blend Example | | | | |
|---|---|---|---|---|---|
| | Pure GTL4 | 34 | 35 | 36 | 37 | |
| Wt % PIB in GTL4 | 0 | 5 | 20 | 40 | 75 | pure PIB |
| Blend Property | | | | | | |
| Kv 100° C., cS | 3.67 | 4.31 | 7.24 | 15.89 | 100.61 | 634.31 |
| Kv 40° C., cS | 14.79 | 18.39 | 37.91 | 119.98 | 1888.34 | 23807.91 |
| VI | 138 | 147 | 158 | 141 | 130 | 171 |
| Wt % Noack Volatility | 16.57 | 15.89 | 15.33 | 14.47 | 9.35 | 0 |

Table 5 summarizes properties of the blends of a high quality 4 cS Group III base stock with POB and PIB of comparable viscosity at 100° C. Consistent with previous examples, the blend with POB has higher blend viscosity, indicating higher viscosity boosting efficiency or thickening efficiency, slightly higher VI and better pour point than the blend with PIB. When these two blends were subjected to sonic shear stability test, as in ASTM D2603 method, with different test lengths, the blend with POB had lower viscosity loss than the blend with PIB for both 100° C. and 40° C. viscosity and at 30 or 120 minute test duration. This test data demonstrated that for both fluids made from $C_4$ olefins, the blend containing POB of comparable viscosity as PIB has better shear stability.

TABLE 5

| Blend Example | 38 | Blend Example | 39 |
|---|---|---|---|
| Gr III base stock + POB - 25206-43 (636 cS at 100° C.) | | Gr III base stock + PIB H300 (634.32 cS at 100° C.) | |
| Wt % of POB | 40 | Wt % of PIB | 40 |
| Wt % of 4 cS Gr III base stock | 60 | Wt % of 4 cS Gr III base stock | 60 |
| Blend Property | | Blend Property | |
| Kv 100° C., cS | 19.64 | Kv 100° C., cS | 16.77 |
| Kv 40° C., cS | 161.30 | Kv 40° C., cS | 132.80 |
| VI | 140 | VI | 137 |
| Pour point, ° C. | −33 | Pour point, ° C. | −30 |
| Sonic Shear Stability 30 minutes | | Sonic Shear Stability 30 minutes | |
| % Vis Loss @100° C. | 0.153 | % Vis Loss @100° C. | 4.23 |
| % Vis Loss@40° C. | 1.82 | % Vis Loss@40° C. | 6.39 |
| Sonic Shear Stability 120 minutes | | Sonic Shear Stability 120 minutes | |
| % Vis Loss @100° C. | 0.71 | % Vis Loss @100° C. | 4.53 |
| % Vis Loss@40° C. | 3.45 | % Vis Loss@40° C. | 6.36 |

The samples prepared in Examples 1 to 19 all have substantial amount of atactic stereo-sequence of monomers in the polymer structure. This is confirmed by C13 NMR of the sample as compared to an iso-tactic poly-1-butene. A typical C13 NMR of Example No. 11 is shown in FIG. 5a. This spectra is significantly different from a C13 NMR spectra in FIG. 5b of an isotactic poly-1-butene, prepared in Comparative Example A as reported below. This C13 NMR of an isotactic poly-1-butene is also similar to the spectra reported in literature [page 4500, FIG. 2c of the paper, "Syntheses of Multi-stereoblock Polybuntene-1 Using Novel Monocyclopentadienyl Titanium and Modified Methylaluminoxane Catalysts" Journal of Polymer Science: Part A: Polymer Chemistry Vol. 37, page 4497-4501 (1999)]. The sharp peaks in FIG. 5b are due to the high degree of isotacticity. The broad peaks of FIG. 5a, especially the Carbon 3 peak clearly indicate that they are high in % of mr stereo-sequence (>30%) and low in mm and rr sequence.

In particular, it is notable that the broad peak for Carbon-3 in FIG. 5a indicates the high degree of atactic composition in the polymer. For an isotactic poly-1-butene or poly-1-butene of any high degree of tacticity, this Carbon-3 peak is a very sharp and narrow peak, as shown in 5b.

Comparative Example A

In this experiment, a poly-1-butene with substantial amount of isotactic stereo-sequence was prepared by polymerizing 270 gram of pure 1-butene with a catalyst solution containing 5.274 gram of methylaluminoxane (MAO) solution (10 wt % MAO in toluene), 20 gram toluene and 0.00834 gram of a metallocene racemic-dimethylsilyl(tetrahydroindenyl)zirconium dichloride. The catalyst system was similar to the catalyst system used in prior art. The reaction was carried out at 35° C. for 16 hours. The product was isolated by stripping off solvent. When cooled down to room temperature, a solid poly-1-butene was obtained. This poly-1-butene contained a substantial amount of mm diad in the molecular structure. It is not suitable for a lube base stock application. This example clearly demonstrated that poly-1-butenes with substantially isotactic stereo sequence are not suitable as a lubricant base stock.

Applicants have attempted to disclose all embodiments and applications of the disclosed subject matter that could be reasonably foreseen. However, there may be unforeseeable, insubstantial modifications that remain as equivalents. While the present invention has been described in conjunction with specific, exemplary embodiments thereof, it is evident that many alterations, modifications, and variations will be apparent to those skilled in the art in light of the foregoing description without departing from the spirit or scope of the present disclosure. Accordingly, the present disclosure is intended to embrace all such alterations, modifications, and variations of the above detailed description.

All patents, test procedures, and other documents cited herein, including priority documents, are fully incorporated by reference to the extent such disclosure is not inconsistent with this invention and for all jurisdictions in which such incorporation is permitted.

When numerical lower limits and numerical upper limits are listed herein, ranges from any lower limit to any upper limit are contemplated.

What is claimed is:

1. A substantially atactic poly-alpha-olefin polymer made of at least one of propylene, 1-butene or 1-pentene monomer, the polymer having viscosity index (VI) of 50 to 250, $Kv_{100}$ of 8 to 5,000 cSt, $Kv_{40}$ of 60 to 80,000 cSt and pour point of less than 10° C., wherein the substantially atactic poly-alpha-olefin polymer includes at least 70 mole % mr triads in the polymer.

2. A substantially atactic polymer of claim 1, which is a polymer of 1-butene.

3. A substantially atactic polymer of claim 1, which is a polymer of propylene.

4. A substantially atactic polymer of claim 1, which is a polymer of 1-pentene.

5. A substantially atactic polymer of claim 1, which is a copolymer of propylene and 1-butene.

6. A substantially atactic polymer of claim 1, which is a copolymer of propylene and 1-pentene.

7. A substantially atactic polymer of claim 1, which is a copolymer of 1-butene and 1-pentene.

8. A substantially atactic polymer of claim 1, which is a copolymer of propylene, 1-butene and 1-pentene.

9. A blend composition comprising: (a) a substantially atactic poly-alpha-olefin polymer made of at least one of propylene, 1-butene or 1-pentene monomer, having viscosity index (VI) of 50 to 250, $Kv_{100}$ of 8 to 5,000 cSt, and $Kv_{40}$ of 60 to 80,000 cSt, pour point of less than 10° C., and (b) a second base stock which has $Kv_{100}$ of less than 20 cSt, wherein the substantially atactic poly-alpha-olefin polymer has an atactic component of at least 70 mole % mr triads.

10. A blend composition of claim 9, wherein the substantially atactic polymer is a polymer of 1-butene.

11. A blend composition of claim 9, wherein the second base stock has $Kv_{100}$ of 15 cSt or less.

12. A blend composition of claim 9, which includes 0.1 to 90% by weight of the substantially atactic polymer.

13. A blend composition of claim 9, which has Noack volatility of less than 30 wt%.

14. A blend composition of claim 9, wherein the substantially atactic polymer is a polymer of propylene.

15. A blend composition of claim 9, wherein the substantially atactic polymer is a polymer of 1-pentene.

16. A blend composition of claim 9, wherein the substantially atactic polymer is a copolymer of propylene and 1-butene.

17. A blend composition of claim 9, wherein the substantially atactic polymer is a copolymer of propylene and 1-pentene.

18. A blend composition of claim 9, wherein the substantially atactic polymer is a copolymer of 1-butene and 1-pentene.

19. A blend composition of claim 9, wherein the substantially atactic polymer is a copolymer of propylene, 1-butene and 1-pentene.

20. A lubricant blend composition of claim 9 comprising 10 to 99.9% wt % of the second base stock.

21. A lubricant blend composition of claim 9 which has $Kv_{100}$ of 3 cSt to 1000 cSt.

22. A lubricant blend composition of claim 9 which has $Kv_{40}$ of 6 cSt to 30,000 cSt.

23. A lubricant blend composition of claim 9, which has VI of 100 to 400.

24. A lubricant blend composition of claim 9, which has VI of 100 or greater than 100.

25. A lubricant blend composition of claim 9, which has pour point of less than 0° C.

26. A lubricant blend composition of claim 9, which has pour point of less than −10° C.

27. A lubricant blend composition of claim 9, which has pour point of less than −20° C.

28. A lubricant blend composition of claim 9, which has pour point of less than −30° C.

29. A lubricant blend composition of claim 9, which has pour point of less than −40° C.

30. A lubricant blend composition of claim 9, which has Noack volatility of less than 20 wt %.

31. A lubricant blend composition of claim 9, which has Noack volatility of less than 15 wt %.

32. A lubricant blend composition of claim 9, which has Noack volatility of less than 10 wt %.

33. A lubricant blend composition of claim 9, which has Noack volatility of less than 5 wt %.

34. A lubricant blend composition of claim 9, which has Noack volatility of less than 1 wt %.

35. A lubricant blend composition of claim 9, wherein the second base stock has $Kv_{100}$ of 4 cSt or less.

36. A lubricant blend composition of claim 9, wherein the second base stock comprises at least one of Group I to VI base stocks or a lube base stock produced from gas-to-liquid conversion process (GTL lube) or any combination thereof.

* * * * *